United States Patent [19]

Cohen et al.

[11] Patent Number: 5,481,609
[45] Date of Patent: Jan. 2, 1996

[54] SYSTEM FOR CONTROLLING ACCESS TO BROADCAST TRANSMISSIONS

[75] Inventors: Michael Cohen; Jonathan Hashkes, both of Jerusalem, Israel

[73] Assignee: News Data Security Products Ltd., Quarry Bay, Hong Kong

[21] Appl. No.: 119,734

[22] Filed: Sep. 10, 1993

Related U.S. Application Data

[63] Continuation of Ser. No. 993,823, Dec. 18, 1992, Pat. No. 5,282,249, which is a continuation of Ser. No. 611,960, Nov. 9, 1990, abandoned.

[51] Int. Cl.$^6$ ................... H04L 9/32; H04L 9/08; H04N 7/167
[52] U.S. Cl. ................... 380/16; 380/10; 380/21; 380/22; 380/23; 380/44; 235/380; 235/382
[58] Field of Search ................... 235/379–382; 380/9, 10, 16, 21–23, 30, 44; 340/825.31, 825.34

[56] References Cited

U.S. PATENT DOCUMENTS

| | | | |
|---|---|---|---|
| 2,977,434 | 3/1961 | Shanahan et al. | 380/16 X |
| 3,890,461 | 6/1975 | Vogelman et al. | 380/16 |
| 4,012,583 | 3/1977 | Kramer | 380/16 X |
| 4,494,143 | 1/1985 | Lovick et al. | 380/16 |
| 4,748,668 | 5/1988 | Shamir et al. | 380/30 |
| 4,811,377 | 3/1989 | Krolopp et al. | 380/23 X |
| 4,993,066 | 2/1991 | Jenkins | 380/16 |
| 5,282,249 | 1/1994 | Cohen et al. | 380/23 |

FOREIGN PATENT DOCUMENTS

| | | | |
|---|---|---|---|
| 5917486 | 1/1988 | Australia | H04N 7/16 |
| 0200310 | 1/1986 | European Pat. Off. | H04N 7/20 |
| 0252680 | 1/1988 | European Pat. Off. | H04M 1/66 |
| 1083311 | 6/1960 | Germany | H04N 7/16 |
| 3640680 | 6/1988 | Germany | H04N 7/14 |
| 8802899 | 4/1988 | WIPO | H04N 7/167 |

OTHER PUBLICATIONS

Gale, B. et al. "Satellite and Cable TV . . . " Baylin Gayle Productions; Boulder Colorado, 1986.
Svigals, J. "The Smart Card . . . " Macmillan Publishing Co. N.Y., 1985.
Knuth, D. "The Art of Computer . . . " Seminumercial Algorithms, vol. 2, pp. 268–278 (with related materials).
"The Art of Computer Programming" vol. 31 Sorting and Searching pp. 506–549 Mass.

*Primary Examiner*—Bernarr E. Gregory
*Attorney, Agent, or Firm*—Ladas & Parry

[57] ABSTRACT

A system for controlling access to broadcast transmissions including a transmitter having a transmission encoder for scrambling the broadcast, a multiplicity of subscriber receivers, each having an identical receiving decoder, containing no secret cryptographic keys, for descrambling the broadcast and a plurality of selectable and portable executing apparatus each being operatively associatable with a receiving decoder at a partially different given time and each executing generally identical operations to generate a seed for use by the associated receiving decoder to enable the receiving decoder to descramble the broadcast.

4 Claims, 7 Drawing Sheets

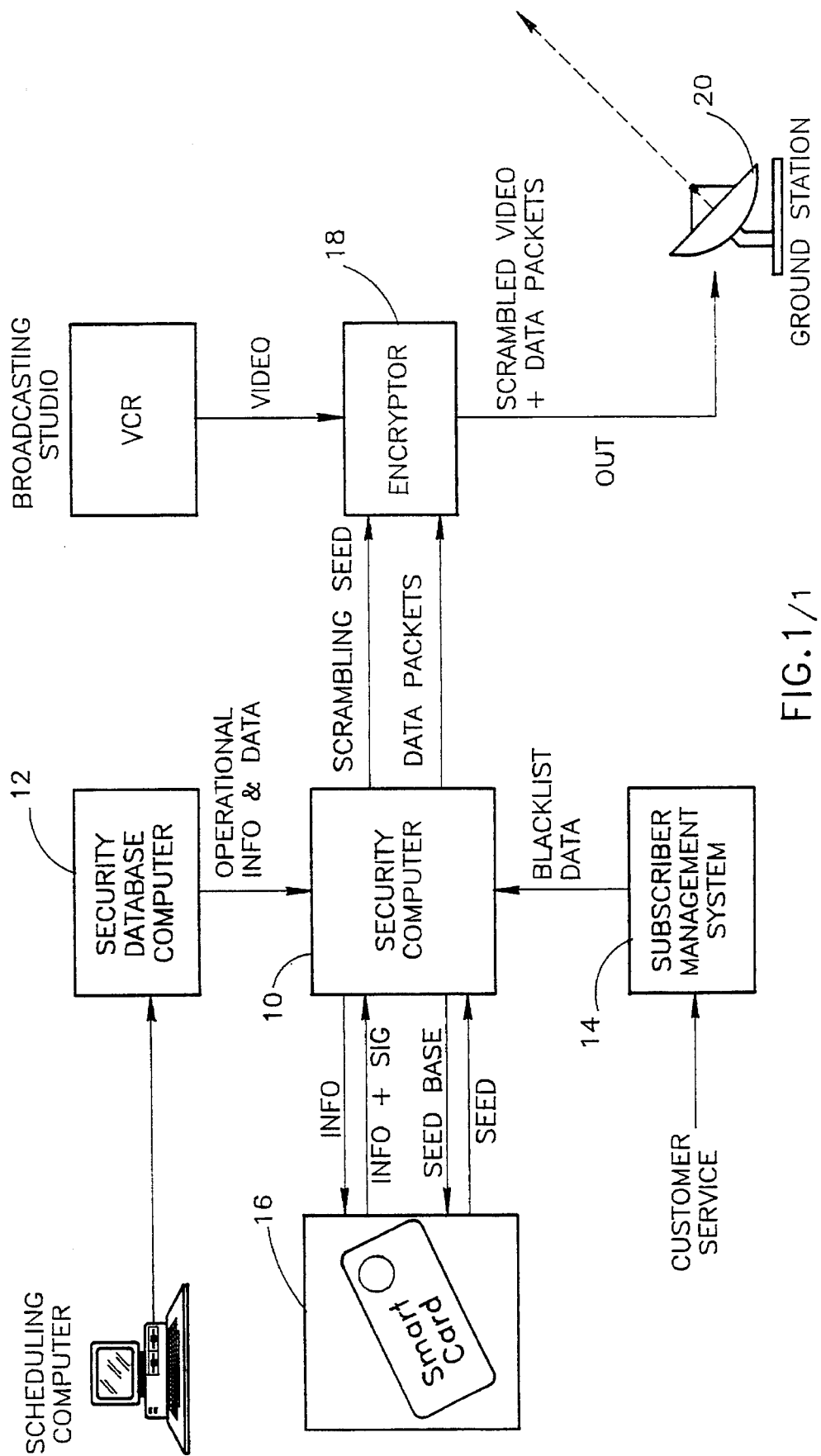
FIG.1/1

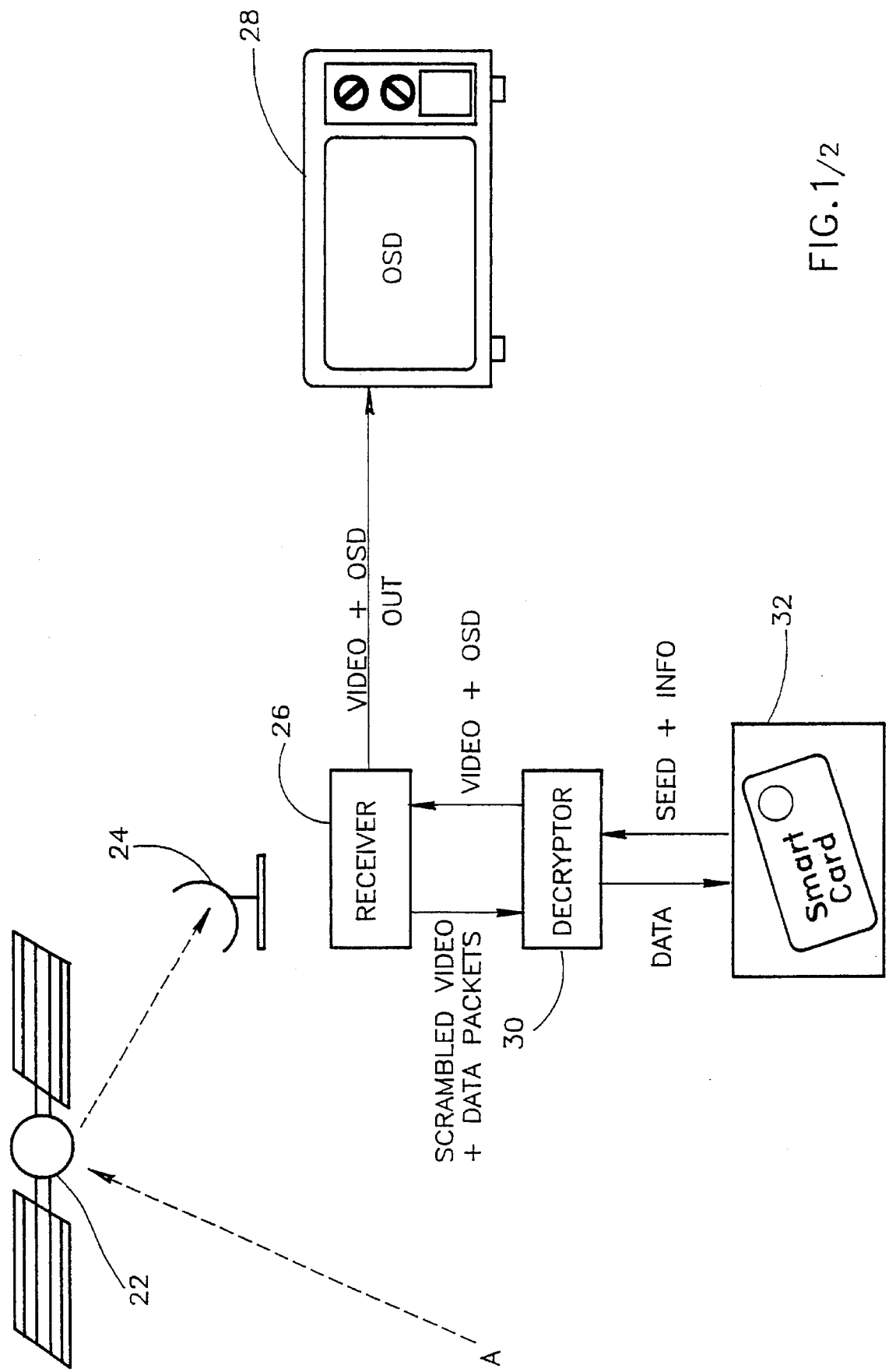
FIG. 1/2

SYSTEM FOR CONTROLLING ACCESS TO BROADCAST TRANSMISSIONS

This is a continuation of application Ser. No. 07/993,823 filed Dec. 18, 1992, now U.S. Pat. No. 5,282,249, which is a continuation of application Ser, No. 07/611,960 filed Nov. 9, 1990, now abandoned.

FIELD OF THE INVENTION

The present invention relates to broadcast transmission systems and techniques.

BACKGROUND OF THE INVENTION

There is known in the patent literature a great variety of systems and techniques for broadcast transmission. More particularly systems for controlling access to broadcast transmissions are described in the following publication:

*Satellite and Cable TV Scrambling and Descrambling,* by Brent Gale and Frank Baylin, published by Baylin/Gale Productions, Boulder, Colo., 1986.

Smart cards, plastic cards resembling credit cards with microprocessor inside of them, are known in the art. They are described in the book, *Smart Cards, The New Bank Cards,* by Jerome Svigals and published by Macmillan Publishing Company, N.Y., 1987.

SUMMARY OF THE INVENTION

The present invention seeks to provide improved apparatus and techniques for controlling access to broadcast transmissions. For the purposes of the present specification and claims, broadcast transmissions are deemed to include both audio and video, combined and separately, whether transmitted by wire or by wireless techniques.

There is thus provided in accordance with a preferred embodiment of the present invention a system for controlling access to broadcast transmissions including a transmitter having a transmission encoder for scrambling the broadcast, a multiplicity of subscriber receivers, each having an identical receiving decoder, containing no secret cryptographic keys, for descrambling the broadcast and a plurality of selectable and portable executing apparatus each being operatively associatable with a receiving decoder at a partially different given time and each executing generally identical operations to generate a seed for use by the associated receiving decoder to enable the receiving decoder to descramble the broadcast.

In accordance with a preferred embodiment of the present invention, the executing apparatus includes apparatus for actively executing an algorithm.

In accordance with another embodiment of the present invention, the executing apparatus includes apparatus for providing instructions and data for an algorithm executed in the decoder.

In accordance with one embodiment of the present invention, the executing apparatus includes provides all of the instructions required to descramble the transmission. In accordance with another embodiment of the present invention, the executing apparatus provides only part of the instructions required to descramble the transmission.

In accordance with a preferred embodiment of the present invention, the executing apparatus comprises apparatus for providing proof of authenticity to the receiving decoder. The proof of authenticity is preferably a public key proof of authenticity and preferably a Fiat-Shamir public key proof of authenticity.

In accordance with a preferred embodiment of the present invention, each executing apparatus contains a separate identification element which is sensible by a decoder.

Further, in accordance with a preferred embodiment of the present invention, each executing apparatus comprises an element which indicates programming entitlements to the decoder.

In accordance with a preferred embodiment of the present invention, the element which indicates programming entitlements to the decoder is modified by information contained in the transmitted broadcast.

In accordance with a preferred embodiment of the present invention, the decoder comprises a mailbox for receiving data from broadcast transmissions and from the a first of the plurality of selectable executing apparatus. Further, in accordance with a preferred embodiment of the present invention, the executing apparatus is operative to access the mailbox. Such data may include, for example, activation data for enabling operation of the executing apparatus and entitlement information.

In accordance with a preferred embodiment of the present invention, the executing apparatus may contain information which can be accessed by the decoder for modifying software thereof.

In accordance with a preferred embodiment of the present invention, the executing apparatus comprises apparatus for generating displayed messages via the decoder.

In accordance with a preferred embodiment of the present invention, the decoder is operative to generate displayed messages originating from any of the following sources: the broadcast, the decoder and the executing apparatus.

Further, in accordance with a preferred embodiment of the present invention, the displayed messages may be assigned designated priorities.

There is provided, in accordance with the present invention, a system for transferring information comprising a plurality of portable card apparatus each comprising microprocessor apparatus for generating and transmitting data to be stored and fixed storage apparatus for receiving the data from a first of the plurality of card apparatus, for storing the data, and for enabling a second of the plurality of card apparatus to remove the data therefrom.

There is additionally provided, in accordance with the present invention, a system for transferring information comprising computing apparatus for generating and transmitting a first set of data to be stored, a plurality of portable card apparatus each comprising microprocessor apparatus for generating and transmitting a second set of data to be stored and fixed storage apparatus for receiving at least one of the first and second data from the computing apparatus and a first of the plurality of card apparatus, for storing the information, and for enabling a second of the plurality of card apparatus to remove the at least one of the first and second data therefrom.

BRIEF DESCRIPTION OF THE DRAWING

The present invention will be understood and appreciated more fully from the following detailed description, taken in conjunction with the drawings in which:

FIGS. 1/1 and 1/2 are generalized block diagram illustrations of a broadcast system constructed and operative in accordance with a preferred embodiment of the present invention;

DETAILED DESCRIPTION OF A PREFERRED EMBODIMENT

Figure 2:
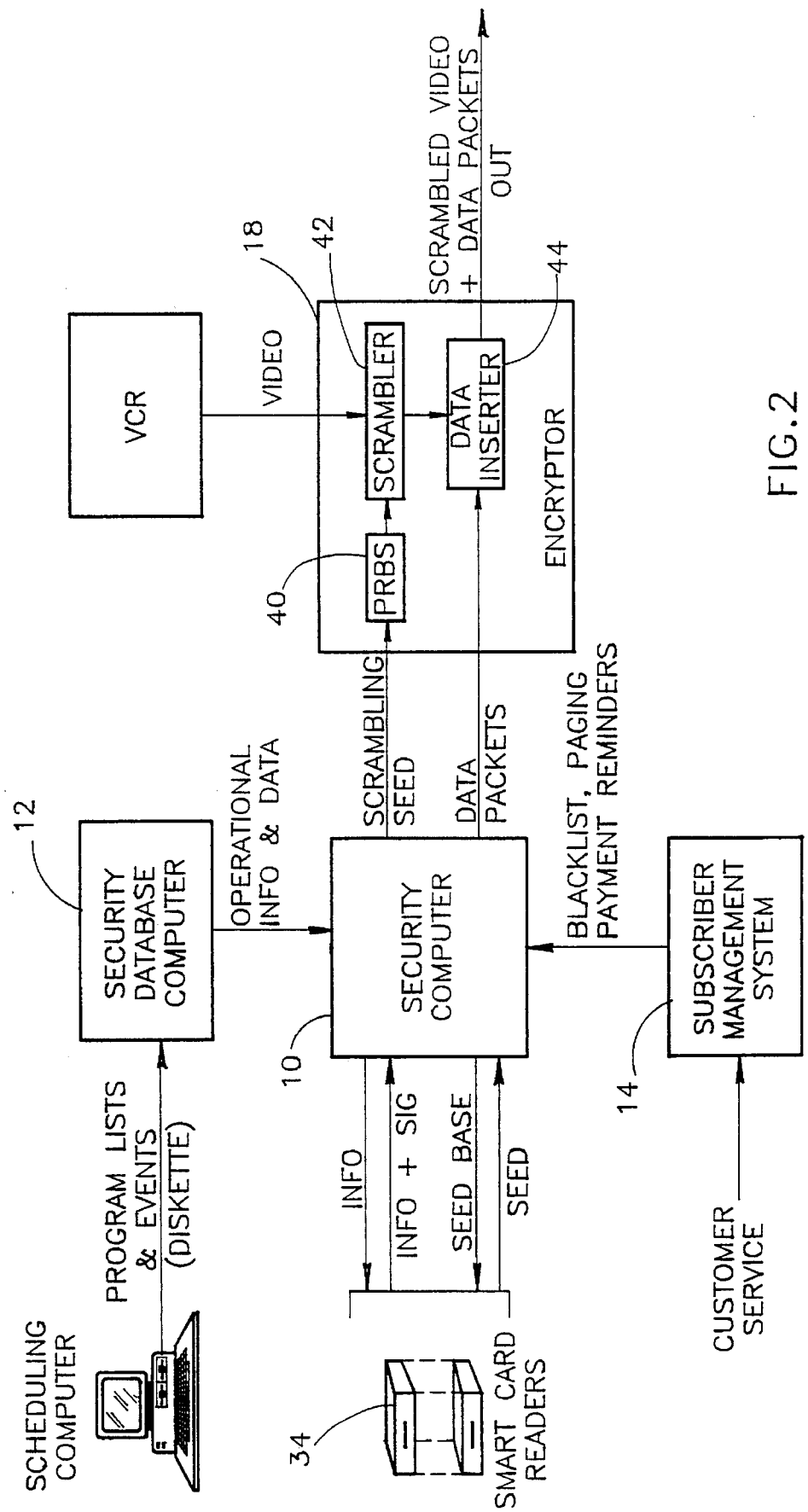
FIG. 2 is a more detailed block diagram illustration of the transmission end of the system of FIG. 1.
Figure 3:
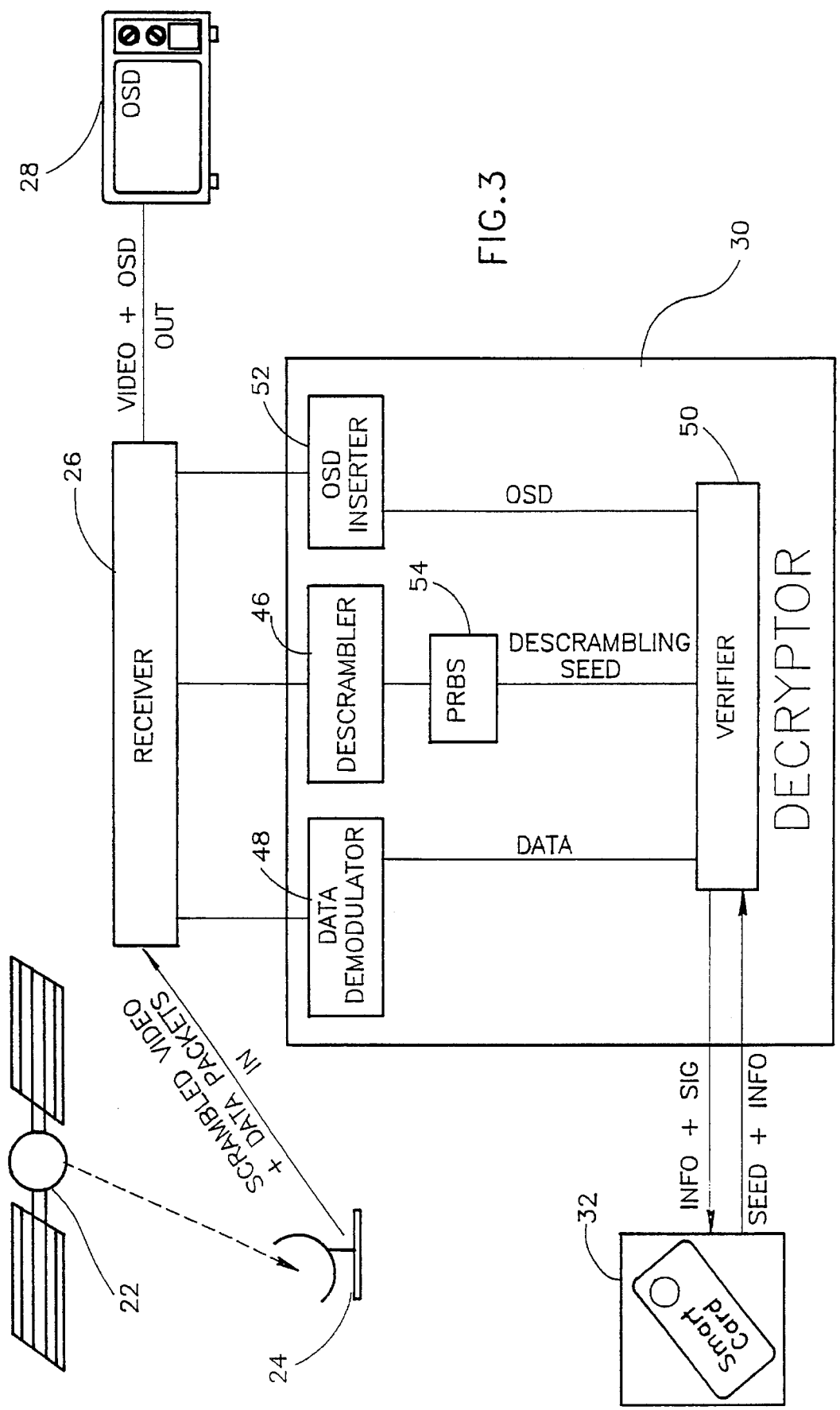
FIG. 3 is a more detailed block diagram illustration of the reception end of the system of FIG. 1.

Reference is now made to FIGS. 1–3, which illustrate the broadcast system constructed and operative in accordance with a preferred embodiment of the present invention. The broadcast system preferably comprises a security computer 10, such as an IBM AT having multiple serial communications links. The security computer 10 receives inputs from a security database computer 12, such as an IBM AT, which stores programming information as well as information relating to urgent or periodic subscriber actions. Typically an urgent subscriber action could consist of immediate, on-line activation, deactivation or re-activation of viewing entitlements. Typically a periodic subscriber action is a blacklisting order or a message to be transmitted periodically so that when the subscriber is tuned to the system, the order or message will be received and suitably processed.

The security computer 10 also receives an input from a subscriber management system 14, typically embodied in a large mainframe computer, commercially available from IBM or other major manufacturers. The subscriber management system stores details of all subscribers, their payment status and their entitlements.

In accordance with a preferred embodiment of the invention, the security computer 10 interfaces with one or more smart cards 16. Such smart cards are well known and are described in *Smart Cards, The New Bank Cards,* by Jerome Svigals. The smart cards preferably contain two computer programs. The first computer program contains a seed generating algorithm for producing a seed which is used in signal scrambling and descrambling at both ends of the system. The second program contains a signature protocol which appends a suitably hashed signature to all information regarding entitlements when transmitted over the system.

The security computer 10 supplies data, including, inter alia, unscrambled data, data bearing a signature and a seed to an encoder 18, which typically is located on the premises of a broadcasting station.

The operation of the apparatus of elements 10, 12, 14 and 16 may be emulated by a computer program whose object code is attached hereto as Annex A.

The encoder 18 is typically an encoder which is commercially available from Thomson CSF Laboratoires Electroniques de Rennes, Cesson-Sevigne, France. The encoder 18 is operative, using the seed received via the security computer 10, to scramble all or part of an audio-video TV program received from any suitable program source, such as a VCR. The encoder 18 is also operative to modulate the data which is received from the security computer so as to enable both the scrambled program and the data to be transmitted together. It will be appreciated that the seed is not modulated and thus, is not transmitted.

The modulation technique may be selected at will from known techniques provided that it is suitable for use with the encoder 18. In accordance with a preferred embodiment of the invention, the data is inserted on unused video lines.

The output of the encoder 18 is broadcast by any suitable technique, either by wire or wireless apparatus. In the illustrated embodiment, the encoder outputs to a ground station 20, which communicates via a satellite 22 in geosynchronous orbit of the earth with a multiplicity of receiving ground stations 24, each representing a subscriber.

The signals received by each receiving ground station 24 are supplied to a receiver 26, typically commercially available from Amstrad of the U.K. The receiver 26 is operative to convert the signals received thereby, which are selected by the subscriber, to baseband video. If the baseband video does not require descrambling, the receiver 26 remodulates the baseband video typically on a pre-selected channel for reception and display on a conventional television display 28.

Scrambled signals are supplied by the receiver 26 to a decoder 30, typically commercially available from Ferguson Limited, Enfield, Middlesex, England or from Thomson L.E.R.E.A. Illkirch, France.

In accordance with a preferred embodiment of the present invention, the decoder is operative together with a smart card 32, which contains a seed generation algorithm. It is a particular feature of the present invention, that the decoders contain no cryptographic secrets and that each of the smart cards 32 associated with the multiplicity of receivers 26 execute the identical seed generation algorithm on the data sent from the security computer 10 and thus, produce the identical seed used by encoder 18 to scramble the broadcast signal. It is an additional feature of the present invention that the receivers 26 are identical and the smart card 32 from one subscriber can operate in the receiver 26 of a second subscriber, thereby allowing the second subscriber to view, in his home, the programs received by the first subscriber.

In accordance with an alternative embodiment of the invention, the use of either or both of smart cards 16 and 32 may be eliminated in favor of simpler, but less secure memory cards. In such a case, the memory card contains data but not the seed generating algorithm. In such a case, the security computer transmits instructions to the decoder 30 enabling it to use the data in the memory card to reproduce the seed.

In the embodiment wherein cards 16 and 32 or at least card 32 is a smart card, the smart card 32 includes a first program which verifies the genuineness of the hashed signature produced by card 16 and transmitted through the system, thus rejecting entitlement data bearing no signature or a non-genuine signature. The smart card 32 also contains a program for generating the seed for enabling the decoder to descramble the video TV program. The object code for a smart card 32 manufactured by News Gem Smartcard International Ltd. of Livingston, Scotland, is attached hereto as Annex B.

Reference is now made to FIG. 2 which illustrates the transmission apparatus of the present invention. As mentioned hereinabove, security computer 10 receives subscriber and programming data from subscriber management system 14 and security database 12. Security computer 10 sends a portion of the data relating to operations to be performed by smart card 32 to the smart card 16, via a smart card coupler 34, such as those commercially available from GemPlus of Gemenos, France. Smart card 16 appends a digital signature to the data for smart card 32 whereby the digital signature is generated by the second algorithm stored within the smart card 16. The smart card 16 additionally generates the scrambling seed to be used by the encoder 18.

The two algorithms stored in smart cards 16 and 32 are typically hashing functions operating on the data for smart card 32. The hashing function of the second algorithm, that for digital signature generation, typically is iterated a few times. The hashing function of the first algorithm, that for seed generation, typically is iterated a multiplicity of times. Hashing functions are described in *The Art of Computer Programming, Vol 2:Seminumerical Algorithms* by Donald E. Knuth.

The data for smart card 32 and the scrambling seed are sent from the smart card 16 through the security computer 10 to the encoder 18. The scrambling seed in loaded into a Pseudo-random Bit Sequencer (PRBS) 40 which produces from it a pseudo-Random sequence of bits. The sequence of bits is sent to a scrambler 42 which utilizes it to scramble the broadcast signal, which may come from a VCR.

The programming and security data as well as the data for smart card 32 is appended to the scrambled broadcast signal, by means of a data inserter 44, and the combined signal is sent to the ground station 20 to be modulated and transmitted.

Reference is now made to FIG. 3 which illustrates the reception end of the system of FIG. 1. As mentioned hereinabove, the combined signal is received by receiving ground station 24 and is sent to receiver 26 which demodulates it into video baseband. The video baseband is then sent in parallel to both a descrambler 46 and a data demodulator 48 of decoder 30.

Data demodulator 48 extracts the data from the combined signal and sends it to a verifier 50. Verifier 50 then sends a portion of the data to the smart card 32 for verification of entitlements and for seed generation. The portion of the data which is sent is that dealing with entitlements and seed generation.

Smart card 32 receives the data portion and, if the entitlement information enclosed therein indicates that the subscriber is entitled to view the selected program, it utilizes the data portion to generate a decoding seed which is generally equivalent to the scrambling seed. If the subscriber is not entitled to receive the video signal, the decoding seed will not match the scrambling seed. Smart card 32 also generates on-screen displays based on the received data portion. For example, the received data portion typically includes a channel identification number and the current date. If the subscriber is not entitled to view the currently selected channel, an on-screen display message such as THIS CHANNEL IS BLOCKED, is generated. If the current date is beyond an expiration date stored in smart card 32, an on-screen display message such as YOUR CARD HAS EXPIRED is generated. It will be appreciated that typically only one on-screen display message can be displayed at one time.

The generated seed and on-screen displays, if any, are sent to the verifier 50. The verifier 50 sends the on-screen displays to an on-screen display inserter 52 which inserts the display into the baseband video after it has left the descrambler 46. The decoding seed is sent to a PRBS 54 which generates a pseudo-random bit sequence, generally identical to the scrambling seed, which is utilized by the descrambler 46 for descrambling the baseband video signal.

The verifier 50 performs the following six additional functions:

1. An authentication operation, as described hereinbelow and with reference to FIG. 6, for verifying that the smart card is authentic;

2. Generation of the decoding seed, in conjunction with the security computer 10, and management of pay-per-view programs, in the embodiment where the smart card 32 comprises a memory card. The algorithm used for seed generation is a hashing function operating on data from the security computer 10. The result is used as the decoding seed if the results of instructions such as comparisons between data stored in the memory card and data sent from the security computer 10 are positive;

3. comparison of priority levels of on-screen display messages, such as between those generated by smart card 32 and those sent from the security computer 10, for determining which message should be displayed and sending of the message to the on-screen display inserter 52;

4. display of the smart card 32 identification number upon request from the security computer 10;

5. blacklisting of smart cards 32 which contain an illegal identification number, as directed by the security computer 10; and 6. maintenance of a mailbox used to store messages from an old to a new smart card and from the security computer 10 to the smart card 32. Such messages may include enabling of the new card based on the message left by the old card. For pay-per-view systems where the smart card 32 stores the amount of money initially paid by the subscriber and deletes a predetermined amount of money for each program viewed, at the end of the subscription period, the old smart card 32 leaves in the mailbox an amount of money left to the subscriber (if any). The new smart card 32 adds to the amount stored within it the amount left in the mailbox.

Executable code for a verifier 50 incorporated into an 8052 processor from Intel is attached hereto as Annex C.

The on-screen display inserter 52 inserts the on-screen display messages into the baseband video output of the descrambler 46 and the combined signal is sent to the receiver 26 for remodulation and for transmission to the TV set 28.

Figure 4:
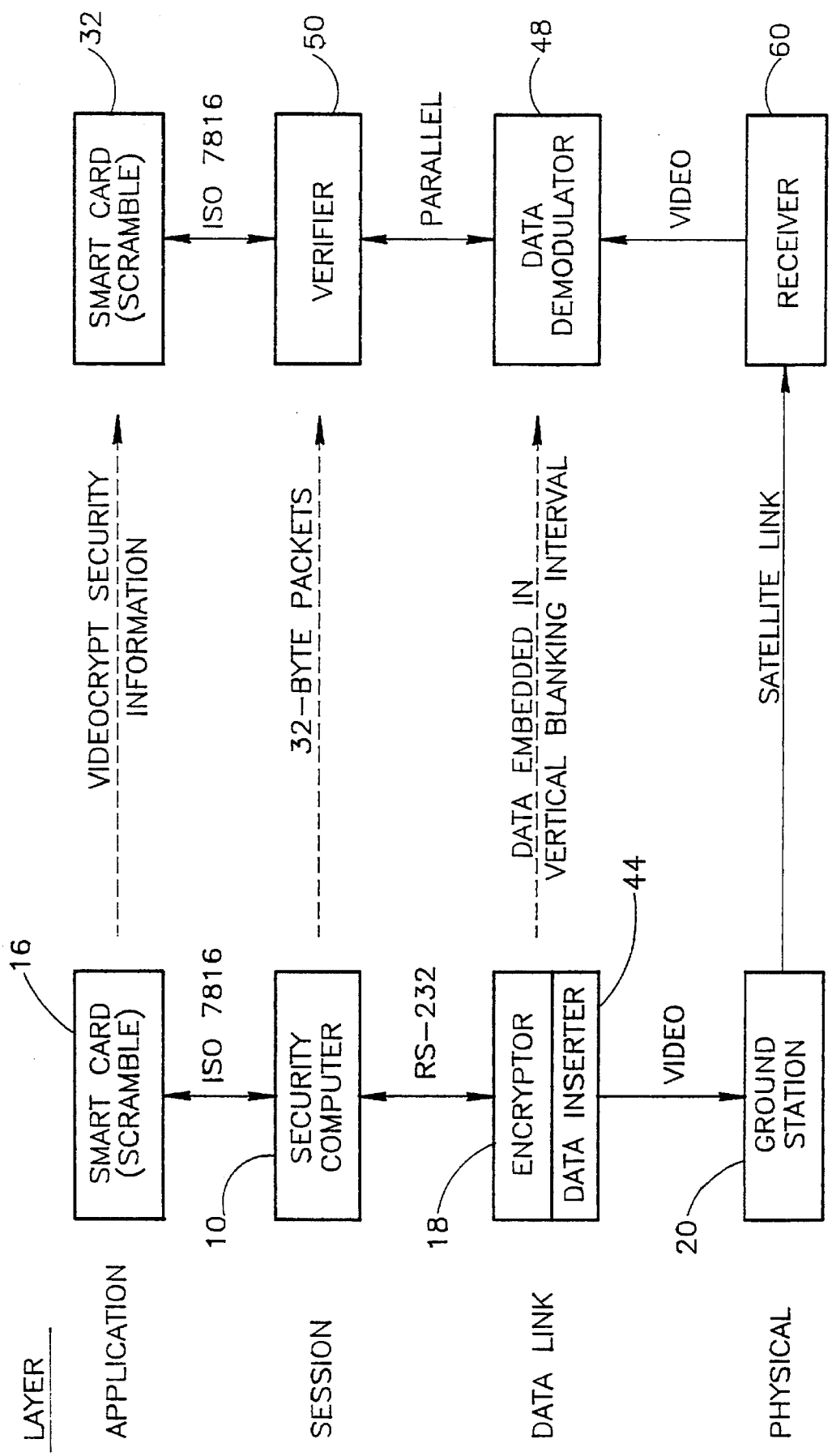
FIG. 4 is a generalized illustration of a communications protocol employed in accordance with a preferred embodiment of the invention.

Reference is now made to FIG. 4 which illustrates a communications protocol typically used in the system of the present invention. Beginning at the lowest level, the physical level, the ground station transmitter 20 transmits a broadcast signal via a satellite link to a receiver apparatus 60 which comprises ground station receiver 24 and receiver 26.

At the data level, the data is inserted into the vertical blanking interval of the broadcast signal via the data inserter 44 of the encoder 18 and removed via the data demodulator 48 of decoder 30. The encoder 18 and decoder 39 may communicate between themselves without affecting the operation of the system of the present invention.

At the session level, the security computer 10 communicates with the verifier 50 of decoder 30 via data packets of the data. In the preferred embodiment of the present invention, the data packets are 32-byte packets. The information passed is system and subscriber information, authorization to perform the authentication operation and/or to display the smart card identification number, as described hereinabove. The session level communicates with the data level via an RS-232 protocol between the security computer 10 and the encoder 18 and via a parallel communication protocol, described in Annex D, between the verifier 50 and the data demodulator 48.

Finally, the application level is a communication level between the smart card 16 attached to the security computer 10 and the smart card 32 attached to the decoder 30. The information passed relates to seed and signature generation, and channel and date information.

Figure 5:
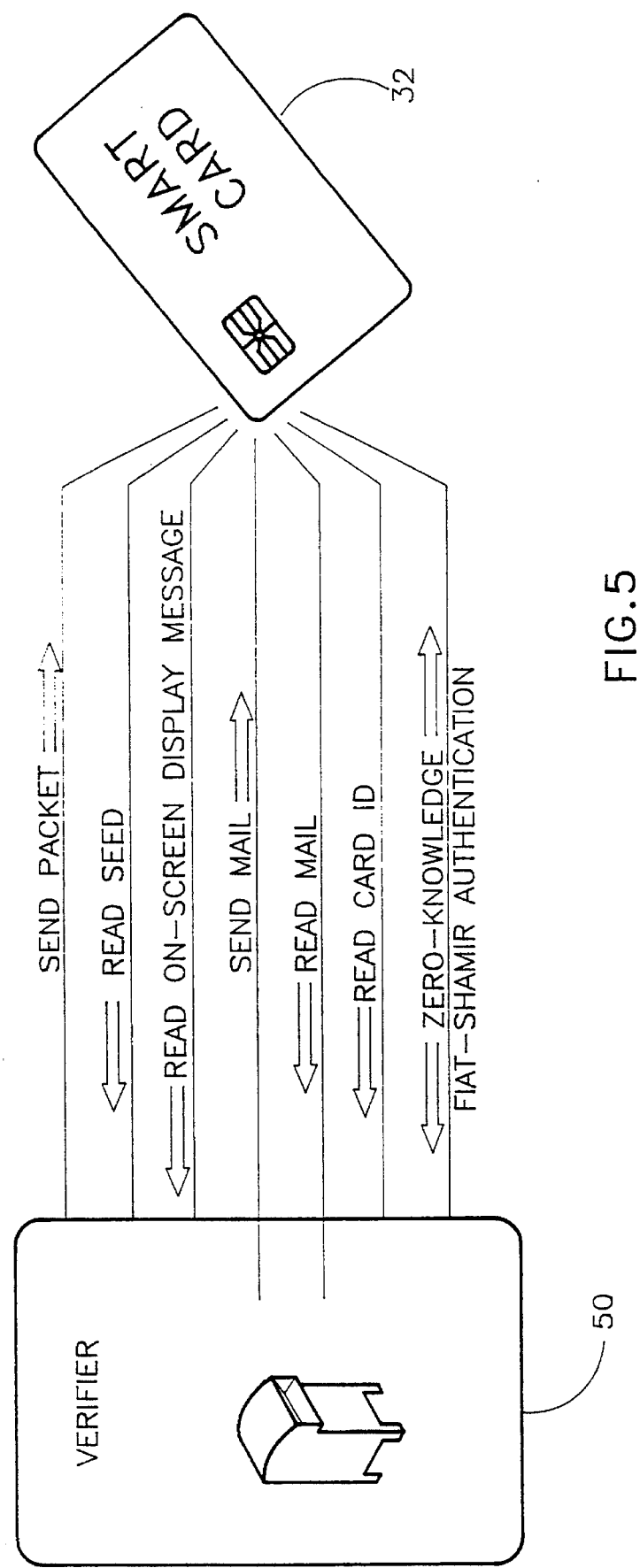
FIG. 5 is an illustration of a information exchange protocol for use with a verifier and a smart card in accordance with a preferred embodiment of the present invention.

Reference is now made to FIG. 5 which illustrates a communications protocol between smart card 32 and verifier 50. Verifier 50 sends a data packet to the smart card 32 and the smart card 32 operates on the data packet to generate a decoding seed and on-screen display messages. Additionally, the smart card 32 receives mail from the mailbox of verifier 50 as well as sends mail to the mailbox.

In accordance with a preferred embodiment of the present invention, the verifier 50 reads the card identification number of the smart card 32 which is stored in the memory of the smart card. Moreover, upon instruction from the security computer 10, as transmitted in the data packet, the verifier 50 and smart card 32 perform an authentication process.

Figure 6:
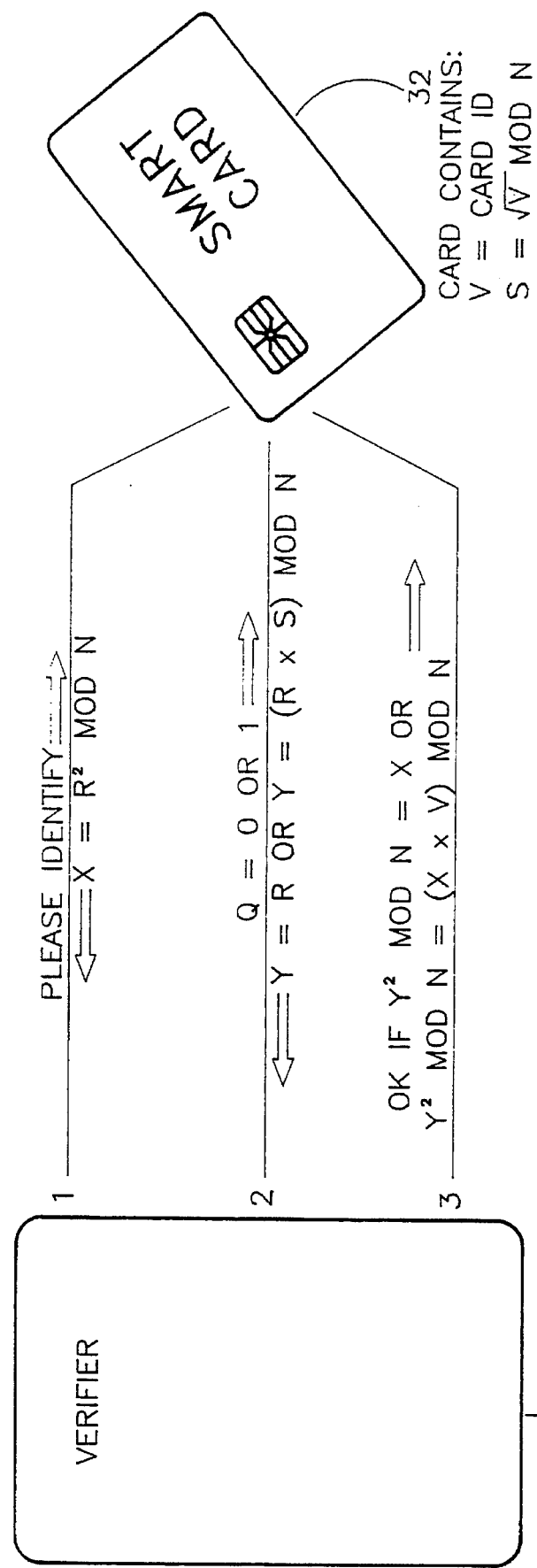
FIG. 6 is an illustration of a Fiat-Shamir authentication protocol useful in the present invention.

The authentication process is illustrated in FIG. 6 and discussed in detail in U.S. Pat. No. 4,748,668 to Shamir which is incorporated herein by reference. Smart card 32 has stored in it a card identification number, denoted V in FIG. 6, a second number, denoted S, and a modulus N, which is also stored in verifier 50. N is a public modulus which is a multiple of two values P and Q where P and Q ape two prime numbers, typically of many digits, known only to the system which generates the smart cards. S is defined as:

$$S = (\sqrt{V}) * \text{Mod } N \qquad (1)$$

where the square root is performed as a modular square root. Modular arithmetic is discussed on pages 268–278 of *The Art of Computer Programming, Vol. 2:Seminumerical Algorithms,* written by Donald E. Knuth and published by Addison-Wesley Publishing Company, Reading, Mass.

The authentication process operates as follows. Verifier 50 requests a number X from smart card 32 where X is defined as:

$$X = R^2 * \text{Mod } N \qquad (2)$$

where R is an arbitrary number. The verifier 50 then responds with a query bit Q, received from the security computer 10, whose value is randomly either 0 or 1. The smart card 32 then responds with a value Y where Y is defined as:

$$Y = R \text{ if } Q = 0 \qquad (3)$$

$$Y = (R*S) * \text{Mod } N \text{ if } Q = 1 \qquad (4)$$

The smart card 32 is authenticated if the verifier 50 calculates the following values for $Y^2$.

$$Y^2 = X * \text{Mod } N \text{ if } Q = 0 \qquad (5)$$

$$Y^2 = (X*V) * \text{Mod } N \text{ if } Q = 1 \qquad (6)$$

where the verifier 50 received V from the smart card 32 prior to the authentication process.

It will be appreciated by persons skilled in the art that the present inventions is not limited by what has been particularly shown and described hereinabove. Rather the scope of the present invention is defined only by the claims which follow:

ANNEX A

```
0000    4D5A 5D00 4000 0A00    2000 4901 FFFF 8E08
0010    0008 BF07 AA2B 0000    1E00 0000 0100 A300
0020    0000 650C 0000 380C    0000 220C 0000 5825
0030    0000 8C2A 0000 D81B    C805 B52B 0000 3F2C
0040    0000 6C1C C805 0000    0000 0000 0000 0000
0050    0000 0000 0000 0000    0000 0000 0000 0000
0060    0000 0000 0000 0000    0000 0000 0000 0000
0070    0000 0000 0000 0000    0000 0000 0000 0000
0080    0000 0000 0000 0000    0000 0000 0000 0000
0090    0000 0000 0000 0000    0000 0000 0000 0000
00A0    0000 0000 0000 0000    0000 0000 0000 0000
00B0    0000 0000 0000 0000    0000 0000 0000 0000
00C0    0000 0000 0000 0000    0000 0000 0000 0000
00D0    0000 0000 0000 0000    0000 0000 0000 0000
00E0    0000 0000 0000 0000    0000 0000 0000 0000
00F0    0000 0000 0000 0000    0000 0000 0000 0000
0100    0000 0000 0000 0000    0000 0000 0000 0000
0110    0000 0000 0000 0000    0000 0000 0000 0000
0120    0000 0000 0000 0000    0000 0000 0000 0000
0130    0000 0000 0000 0000    0000 0000 0000 0000
0140    0000 0000 0000 0000    0000 0000 0000 0000
0150    0000 0000 0000 0000    0000 0000 0000 0000
0160    0000 0000 0000 0000    0000 0000 0000 0000
0170    0000 0000 0000 0000    0000 0000 0000 0000
0180    0000 0000 0000 0000    0000 0000 0000 0000
0190    0000 0000 0000 0000    0000 0000 0000 0000
01A0    0000 0000 0000 0000    0000 0000 0000 0000
01B0    0000 0000 0000 0000    0000 0000 0000 0000
01C0    0000 0000 0000 0000    0000 0000 0000 0000
01D0    0000 0000 0000 0000    0000 0000 0000 0000
01E0    0000 0000 0000 0000    0000 0000 0000 0000
01F0    0000 0000 0000 0000    0000 0000 0000 0000
0200    0000 0000 0000 0000    0000 0000 0000 0000
0210    558B EC83 EC54 E8D7    0F83 7E04 0176 5B8D
0220    46AE 50B8 E400 508B    5E06 FF77 02E8 5254
0230    83C4 0689 46AC 0BC0    740C 807E AE02 7706
0240    807E AE01 732C 8B5E    06FF 7702 B8E7 0050
0250    8D46 B050 E8D5 5383    C406 8D46 B050 E8F1
0260    2783 C402 E807 102B    C050 E8B3 2C83 C402
0270    EB08 8A46 AEFE C8A2    1101 E8D9 16E8 1C0F
0280    E8A5 05E8 320D E897    24B8 1201 50B8 CE03
0290    50E8 1C00 83C4 04E8    CC16 A011 012A E450
02A0    9A33 0563 0583 C402    E8C3 0F8B E55D C390
02B0    558B EC83 EC22 5756    2AC0 A281 28A2 2E24
02C0    E93E 0190 7603 E97B    033D 0100 7503 E9D5
02D0    003D 1C00 7424 3D3B    0075 03E9 F200 3D3C
02E0    0075 03E9 F000 3D3E    0075 03E9 F600 3D3F
02F0    0075 03E9 FC00 E908    0190 A02E 242A E440
0300    2BD2 8B5E 04F7 37E9    9500 C746 F2FF FFB0
0310    6EF6 262E 248B F083    BC1A 0101 761E 8B84
0320    1801 8946 F08B 841A    0103 46F0 0346 F22B
0330    D2F7 B41A 0189 9418    01E9 C500 B06E F626
0340    2E24 8B4E 0603 C851    E831 0383 C402 8846
0350    FC3C 1C75 2380 3E2E    2405 751C B06E F626
0360    2E24 8B4E 0603 C883    C10A 51E8 C450 83C4
```

```
0370  0250 E837 1783 C402   8A46 FC2A E43D 4800
0380  740C 3D50 0075 7AA0   2E24 E972 FF90 8B5E
0390  048B 37A0 2E24 2AE4   03C6 482B D2F7 F688
03A0  162E 24EB 5C90 A1D0   0389 46FA C706 D003
03B0  0000 B87E 0450 E8BF   2783 C402 0BC0 7503
03C0  E978 02C7 06D4 0301   005E 5F8B E55D C390
03D0  E83D 29EB 2C90 833E   D203 011B C0F7 D8A3
03E0  D203 EB1A 833E D403   011B C0F7 D8A3 D403
03F0  EB0C 833E D603 011B   C0F7 D8A3 D603 E813
0400  0CB8 0100 50B0 6EF6   2681 288B 4E06 03C8
0410  51E8 6E0C 83C4 04B8   0200 50B0 6EF6 262E
0420  248B 4E06 03C8 51E8   580C 83C4 04A0 2E24
0430  A281 28E8 3028 8946   F88A 46F8 8846 FE8A
0440  46F9 8846 FCC7 46F2   0100 2AE4 3D40 0074
0450  03E9 70FE A1D0 0389   46FA C706 D003 0000
0460  B82E 0450 E867 2483   C402 8946 F40B C074
0470  6CB8 8C04 50B8 2E04   50E8 802F 83C4 04A3
0480  2C24 0BC0 750C B88E   0450 E8C5 2583 C402
0490  EB4B B89D 041E 50B8   0600 50B8 0F00 50B8
04A0  0900 50E8 5611 83C4   0AA0 3A04 8846 EEC6
04B0  063A 0400 B82E 041E   50B8 0600 50B8 1B00
04C0  50B8 0900 50E8 3411   83C4 0A8A 46EE A23A
04D0  04C7 062C 0401 00C7   0682 2A00 008B 46FA
04E0  A3D0 03E9 9300 833E   2C04 0075 03E9 11FF
04F0  C606 2E24 00C7 062C   0400 00FF 362C 24E8
0500  0E2E 83C4 02B8 AA04   1E50 2BC0 50B8 0F00
0510  50B8 0900 50E8 E410   83C4 0AB8 B704 1E50
0520  2BC0 50B8 1B00 50B8   0900 50E8 CE10 83C4
0530  0AB8 C404 1E50 2BC0   50B8 2D00 50B8 0900
0540  50E8 B810 83C4 0AE9   B7FE B8DC 0350 E87D
0550  2383 C402 8946 F40B   C074 1EB8 DE04 50B8
0560  DC03 50E8 962E 83C4   0489 46EE 50E8 A02D
0570  83C4 02C7 06DA 0301   00C6 062E 2400 E980
0580  FE90 833E DA03 0075   03E9 75FE 7406 A1D0
0590  0389 46F6 C706 D003   0000 8D46 DE50 E8BF
05A0  2283 C402 8B46 F6A3   D003 B8E0 0450 B8DC
05B0  0350 E847 2E83 C404   8946 EEBF E204 8D76
05C0  DE8C D88E C0B9 FFFF   33C0 F2AE F7D1 2BF9
05D0  8BD9 87FE B9FF FFF2   AE4F 8BCB D1E9 F2A5
05E0  13C9 F2A4 FF76 EE8D   46DE 50E8 5422 83C4
05F0  04C7 46F6 0000 FF76   EEB8 6300 F766 F605
0600  B020 50E8 3C22 83C4   04FF 46F6 837E F609
0610  72E4 FF76 EEE8 F82C   83C4 02E9 E3FD A1D0
0620  0389 46FA C706 D003   0000 B8E8 0450 E847
0630  2583 C402 0BC0 7403   E8ED 018B 46FA A3D0
0640  03E9 BDFD 2D41 003D   0F00 7603 E9B2 FD03
0650  C093 2EFF A758 0490   E602 4A03 8203 1E04
0660  0102 0102 0102 8E01   0102 0102 0A01 0102
0670  0F01 0102 0102 FA00   E986 FD90 558B EC83
0680  EC3E 57E8 E012 8B5E   048D 7F0A 8CD8 8EC0
0690  B9FF FF33 C0F2 AEF7   D151 8B46 0405 0A00
06A0  508D 46D6 50E8 284D   83C4 06B8 F804 1E50
06B0  B801 0050 8B5E 048A   4704 2AE4 0508 0050
06C0  8A07 2AE4 50E8 340F   83C4 0A8D 46D6 1650
06D0  B801 0050 8B5E 048A   4704 2AE4 051E 0050
```

```
06E0    8A07 2AE4 50E8 840F    83C4 0A88 46FA 8D7E
06F0    D68C D08E C0B9 FFFF    33C0 F2AE F7D1 4983
0700    C114 894E FE8B D9C6    871A 0500 B81A 051E
0710    50B8 0100 508B 5E04    8A47 042A E405 0A00
0720    508A 072A E450 E8D3    0E83 C40A 8B5E FEC6
0730    871A 0520 807E FA01    7503 E982 008B 5E04
0740    837F 0801 7556 8D46    D650 E8E5 4C83 C402
0750    8946 FE8B 5E04 8D7F    0A8C D88E C0B9 FFFF
0760    33C0 F2AE F7D1 4989    4EFC 83F9 0175 13FF
0770    76FE B80F 0550 8B46    0405 0A00 50E8 AC4E
0780    EB3A FF76 FCB8 1205    508D 46C2 50E8 9C4E
0790    83C4 06FF 76FE 8D46    C2EB DA90 8D7E D68C
07A0    D08E C0B9 FFFF 33C0    F2AE F7D1 4951 8D46
07B0    D650 8B46 0405 0A00    50E8 144C 83C4 06E8
07C0    9411 8A46 FA2A E45F    8BE5 5DC3 558B EC83
07D0    EC04 56C6 46FE 00C6    46FC 00B0 21F6 66FE
07E0    8BF0 8A5E FC2A FF8A    802F 242A E450 B86A
07F0    0550 8AC3 2AE4 8BC8    D1E0 03C1 8BC8 B063
0800    F666 FE03 C881 C1B0    2051 E81F 4E83 C406
0810    FE46 FC80 7EFC 2072    C2FE 46FE 807E FE09
0820    72B5 5E8B E55D C390    558B EC83 EC28 5756
0830    C746 E201 00B8 F801    50E8 F64B 83C4 0288
0840    46E8 C646 E601 EB77    B021 F666 E689 46DE
0850    8BD8 80A7 5827 F78B    5EDE 8A87 7327 8846
0860    E48A 8774 2788 46E5    833E D002 0074 34B0
0870    21F6 66E6 8BD8 808F    5827 08B9 0800 BF58
0880    278C D88E C02B C0F2    AA8A 46E4 A258 278A
0890    46E5 A259 27B8 0800    50B8 5827 50E8 5802
08A0    83C4 04B0 21F6 66E6    8946 D805 5827 50E8
08B0    D606 83C4 028B 5ED8    8887 7727 FE46 E68A
08C0    46E8 3846 E676 03E9    5401 B021 F666 E68B
08D0    D880 A758 27DF 803E    8601 0275 0CB0 21F6
08E0    66E6 8BD8 808F 5827    20B0 21F6 66E6 8BD8
08F0    8A87 5827 2AE4 B106    D3E8 2503 0075 03E9
0900    46FF 3D01 0074 9C3D    0200 740A 3D03 0075
0910    03E9 8C00 EB8D B021    F666 E689 46DC 8BD8
0920    8A46 E488 876D 278B    5EDC 8A46 E588 876E
0930    278B 5EDC 80A7 5827    F783 3ED0 0200 7403
0940    E960 FFB0 21F6 66E6    8946 DA8B D880 8F58
0950    2708 C746 E200 008B    46DA 0559 2789 46E0
0960    B916 008D 7EEA 8BF0    1607 D1E9 F2A5 13C9
0970    F2A4 8076 EA55 8076    EBAA B816 0050 8D46
0980    EA50 E873 0183 C404    B908 00BF 5827 8D76
0990    EA8C D88E C0D1 E9F2    A513 C9F2 A4E9 03FF
09A0    B021 F666 E68B D880    A758 27F7 833E D002
09B0    0075 0CB0 21F6 66E6    8BD8 808F 5827 08B8
09C0    1C01 50E8 6C4A 83C4    028B C8B0 21F6 66E6
09D0    8BD8 888F 5B27 837E    E200 7429 C746 E200
09E0    0083 3ED0 0200 751D    B021 F666 E605 5C27
09F0    8946 E0B9 0800 BF58    278B F01E 07D1 E9F2
0A00    A513 C9F2 A4C7 46E0    5827 B021 F666 E68B
0A10    D8B9 0800 8DBF 5C27    BE58 27E9 73FF C606
0A20    D803 01E8 0600 5E5F    8BE5 5DC3 558B EC83
0A30    EC08 5756 B8F8 0150    E8F7 4983 C402 2AE4
0A40    8946 FA3D 0800 7610    B870 0550 E803 2083
```

```
0A50   C402 5E5F 8BE5 5DC3   B81C 0150 E8D3 4983
0A60   C402 2AE4 8946 FC3D   0F00 7606 B894 05EB
0A70   DA90 837E FA00 7408   C606 6027 08EB 0790
0A80   8A46 FAA2 6027 A086   01A2 6127 A062 02FE
0A90   C0A2 6227 8A46 FCA2   6327 C746 FE0C 002B
0AA0   C0B9 0A00 BF64 271E   07F2 AB83 46FE 1439
0AB0   46FA 743D 8B46 FA40   8946 FEEB 2E90 B821
0AC0   00F7 66FA 0558 2789   46F8 B821 00F7 66FE
0AD0   8BD8 8B46 F8B9 2100   8DBF 5827 8BF0 1E07
0AE0   D1E9 F2A5 13C9 F2A4   FF46 FE83 7EFE 0876
0AF0   CD5E 5F8B E55D C390   558B EC83 EC0A 56C7
0B00   46FE B605 C746 F800   00C7 46FA 0100 EB36
0B10   8B46 FA03 4604 8946   F68B 5EF8 8A9F B606
0B20   8BF0 025C FF2A FF8B   76FE 8A00 8B5E F632
0B30   0788 46FC 2AE4 B107   D3E8 8A4E FCD0 E102
0B40   C188 07FF 46FA 8B46   0639 46FA 72C2 8BF0
0B50   8B5E 048A 40FF 3007   FF46 F883 7EF8 0872
0B60   A85E 8BE5 5DC3 558B   EC83 EC06 5756 A037
0B70   2404 30A2 F801 A038   242A E4A3 8601 A039
0B80   2448 A362 02C7 06D0   0200 00BA 0100 BE50
0B90   248B FEF6 04C0 7534   8A04 2AE4 2508 00B1
0BA0   03D3 E8A3 D002 8956   FEA0 3A24 2AE4 50B8
0BB0   BE06 50B8 1C01 50E8   724A 83C4 0683 3ED0
0BC0   0300 746F C746 FE00   00EB 4C90 8A05 2AE4
0BD0   B106 D3E8 2403 3C03   7318 8A05 2AE4 2508
0BE0   00B1 03D3 E83D 0100   1BC9 F7D9 890E D002
0BF0   EBB4 83C6 2183 C721   4283 FA07 7DA8 EB93
0C00   B801 0050 B86E 00F7   6EFE 0512 0150 E871
0C10   0483 C404 FF46 FEA1   CE03 3946 FE72 E1B8
0C20   0200 50B0 6EF6 262E   2405 1201 50E8 5204
0C30   83C4 045E 5F8B E55D   C390 558B EC81 EC06
0C40   0157 56B8 822A 50B8   C306 50FF 362C 24E8
0C50   D227 83C4 0689 46FC   3DFF FF75 30FF 362C
0C60   24E8 AC26 83C4 02B8   C606 50B8 2E04 50E8
0C70   8A27 83C4 04A3 2C24   B882 2A50 B8C8 0650
0C80   FF36 2C24 E89D 2783   C406 8946 FC8D 86FC
0C90   FE50 B8CB 0650 FF36   2C24 E887 2783 C406
0CA0   8946 FCFF 362C 24B8   5000 508D 86FC FE50
0CB0   E8D3 4883 C406 833E   D003 0074 538D 86FC
0CC0   FE89 46FE EB03 FF46   FE8B 5EFE 803F 207D
0CD0   F5FF 46FE C607 208B   5EFE C607 00C6 8615
0CE0   FF00 B8CF 061E 502B   C050 B82D 0050 B809
0CF0   0050 E807 0983 C40A   8D86 FCFE 1650 B80A
0D00   0050 B82D 0050 B809   0050 E8EF 0883 C40A
0D10   C746 FC00 00C7 86FA   FE00 00B8 2100 F76E
0D20   FC03 86FA FE05 5827   50B8 E906 50FF 362C
0D30   24E8 F026 83C4 06FF   86FA FE83 BEFA FE20
0D40   7CD9 FF46 FC83 7EFC   097C CAB9 2901 BF2F
0D50   24BE 5827 8CD8 8EC0   D1E9 F2A5 13C9 F2A4
0D60   E869 FAE8 00FE 5E5F   8BE5 5DC3 558B EC83
0D70   EC54 5756 833E D003   0074 228A 4604 2AE4
0D80   50B8 EC06 508D 46AC   50E8 A048 83C4 068D
0D90   46AC 50B8 B603 50E8   420C 83C4 0483 3ED2
0DA0   0300 740E 8D46 AC50   B8F2 0650 E8D5 1B83
0DB0   C404 807E 0430 7206   807E 0438 7610 833E
```

```
0DC0  D003 0075 03E9 5201  B8BE 03E9 4501 8A46
0DD0  042C 3088 46FC 0AC0  753C 833E 2C04 0074
0DE0  1183 3E82 2A00 7503  E84F FEFF 0E82 2AEB
0DF0  2590 803E D803 0074  1DB9 2901 BF2F 24BE
0E00  5827 8CD8 8EC0 D1E9  F2A5 13C9 F2A4 E8BB
0E10  F9C6 06D8 0300 B801  0050 8D46 0416 509A
0E20  5905 6305 83C4 06B8  2000 50B0 21F6 66FC
0E30  052F 241E 509A 5905  6305 83C4 06B8 2000
0E40  50B0 21F6 66FC 052F  2450 8A46 042A E450
0E50  E8CD 0083 C406 8846  FEB8 0100 508D 46FE
0E60  1650 9A59 0563 0583  C406 833E D003 0075
0E70  03E9 A600 8A46 042A  E450 B8FF 0650 8D46
0E80  AC50 E8A7 4783 C406  B82F 0050 B063 F666
0E90  FC05 B020 508D 46AC  50E8 FE44 83C4 0683
0EA0  3ED2 0300 740E 8D46  AC50 B805 0750 E8D3
0EB0  1A83 C404 8D46 AC50  B8BE 0350 E81D 0B83
0EC0  C404 B82F 0050 B063  F666 FC05 E020 508D
0ED0  46AC 50E8 FA44 83C4  068A 46FE 2AE4 50B8
0EE0  1007 508D 46DC 50E8  4247 83C4 0683 3ED2
0EF0  0300 740E 8D46 AC50  B816 0750 E885 1A83
0F00  C404 8D46 AC50 B8BE  0350 E8CF 0A83 C404
0F10  B8B6 0350 E8FD 0A83  C402 5E5F 8BE5 5DC3
0F20  558B EC83 EC04 568A  4604 2AE4 8946 FCC7
0F30  46FE 0000 EB10 8B5E  FE8B 7606 8A00 2AE4
0F40  0146 FCFF 46FE 8B46  0839 46FE 7313 EBE6
0F50  8A46 FC2A E48B 56FC  B108 D3EA 03C2 8946
0F60  FC81 7EFC FF00 77E8  8076 FCFF 833E D603
0F70  0074 0A83 46FC 05C7  06D6 0300 008A 46FC
0F80  2AE4 5E8B E55D C390  558B EC83 EC04 56C6
0F90  46FC 00C7 46FE 0000  8B5E FE8B 7604 8A00
0FA0  0046 FCFF 46FE 837E  FE1F 7CEC 8A46 FC2A
0FB0  E4F7 D85E 8BE5 5DC3  558B EC83 EC02 B8A6
0FC0  0350 E8B3 0983 C402  B8AE 0350 E8A9 0983
0FD0  C402 B8B6 0350 E89F  0983 C402 B8BE 0350
0FE0  E895 0983 C402 C746  FE00 00EB 1890 B801
0FF0  0050 B86E 00F7 66FE  0512 0150 E883 0083
1000  C404 FF46 FEA1 CE03  3946 FE72 E1E8 0400
1010  8BE5 5DC3 833E D203  0074 11B8 0200 50B8
1020  0500 50B8 0100 50B8  1707 EB0F B802 0050
1030  B805 0050 B801 0050  B867 0750 B802 0050
1040  B816 0050 E82B 1783  C40C 833E D403 0074
1050  11B8 0200 50B8 0500  50B8 0100 50B8 B707
1060  EB0F B802 0050 B805  0050 B801 0050 B814
1070  0850 B802 0050 B817  0050 E8F5 1683 C40C
1080  C390 558B EC83 EC02  8B5E 0483 7F06 FF75
1090  0FB8 7608 1E50 B801  0050 8A47 01E9 EC00
10A0  8B46 063D 0100 7408  3D02 0074 51EB 3B90
10B0  B871 081E 50B8 0200  508B 5E04 8A47 012A
10C0  E450 8A07 50E8 3405  83C4 0A8B 5E04 1EFF
10D0  7702 B802 0050 8A47  012A E405 0200 508A
10E0  072A E450 E815 0583  C40A 8B5E 0483 7F08
10F0  0177 03E9 8800 C746  FE00 00EB 5F90 B873
1100  081E 50B8 0500 508B  5E04 8A47 012A E450
1110  8A07 50E8 E604 83C4  0A8B 5E04 1EFF 7702
1120  B805 00EB B090 B819  00F7 66FE 03C3 050A
```

| | | | | | | | |
|---|---|---|---|---|---|---|---|
| 1130 | 001E | 50B8 | 0100 | 508A | 4704 | 2AE4 | 8B4E | FE8B |
| 1140 | D1D1 | E1D1 | E1D1 | E1D1 | E12B | CA03 | C150 | 8A07 |
| 1150 | 2AE4 | 50E8 | A604 | 83C4 | 0AFF | 46FE | 8B5E | 048B |
| 1160 | 46FE | 3947 | 0876 | 3139 | 4706 | 75BA | B819 | 00F7 |
| 1170 | 66FE | 03C3 | 050A | 001E | 50B8 | 0500 | EBB8 | 8BC3 |
| 1180 | 050A | 001E | 50B8 | 0100 | 508A | 4704 | 2AE4 | 508A |
| 1190 | 0750 | E867 | 0483 | C40A | 8BE5 | 5DC3 | 558B | EC83 |
| 11A0 | EC08 | 5756 | C746 | FE00 | 00C7 | 46FC | 0000 | B821 |
| 11B0 | 00F7 | 66FE | 8946 | FA8B | D82B | C0B9 | 1000 | 8DBF |
| 11C0 | 5827 | 1E07 | F2AB | AA83 | 46FC | 21FF | 46FE | 837E |
| 11D0 | FE09 | 72D5 | B929 | 01BF | 2F24 | BE58 | 278C | D8D1 |
| 11E0 | E9F2 | A513 | C9F2 | A4E8 | E2F5 | 5E5F | 8BE5 | 5DC3 |
| 11F0 | 558B | EC83 | EC0E | 8D46 | F250 | 8D46 | F250 | B811 |
| 1200 | 0050 | E803 | 4383 | C406 | 8A46 | F224 | 303C | 3075 |
| 1210 | 0FC7 | 068E | 2A00 | B0C7 | 0690 | 2CC6 | 08EB | 2990 |
| 1220 | C706 | 8E2A | 00B8 | C646 | F30F | 8D46 | F250 | 8D46 |
| 1230 | F250 | B810 | 0050 | E8CF | 4283 | C406 | 807E | F202 |
| 1240 | 74D5 | C706 | 902C | D208 | B81E | 2050 | B81F | 2050 |
| 1250 | E873 | 0683 | C404 | B85E | 2050 | B85F | 2050 | E8E7 |
| 1260 | 0783 | C404 | C706 | 5C20 | 0000 | 8BE5 | 5DC3 | EB03 |
| 1270 | E87F | 0283 | 3E5C | 2000 | 75F6 | A01E | 202A | E450 |
| 1280 | A01F | 2050 | E873 | 0683 | C404 | A05E | 202A | E450 |
| 1290 | A05F | 2050 | E8E5 | 0783 | C404 | C390 | 558B | EC83 |
| 12A0 | EC12 | 578A | 4604 | 0246 | 08FE | C888 | 46F2 | 8A46 |
| 12B0 | 0602 | 460A | FEC8 | 8846 | FAFF | 065C | 20A1 | 5C20 |
| 12C0 | 8BC8 | D1E0 | 03C1 | D1E0 | 051A | 2089 | 46F0 | 8BD8 |
| 12D0 | 8A46 | 0488 | 078B | 5EF0 | 8A46 | 0688 | 4701 | 8B5E |
| 12E0 | F08A | 4608 | 8847 | 028B | 5EF0 | 8A46 | 0A88 | 4703 |
| 12F0 | 8A46 | 08F6 | 660A | D1E0 | 50E8 | A43D | 83C4 | 028B |
| 1300 | 5EF0 | 8947 | 04A1 | 8E2A | 8946 | F6B0 | 50F6 | 6604 |
| 1310 | 8A4E | 062A | ED03 | C1D1 | E089 | 46F4 | 8B5E | F08B |
| 1320 | 4704 | 8946 | FC8C | 5EFE | C746 | F800 | 00EB | 2D90 |
| 1330 | 8A46 | 0A2A | E4D1 | E050 | FF76 | FCFF | 76FE | FF76 |
| 1340 | F4FF | 76F6 | E879 | 4383 | C40A | 8146 | F4A0 | 008A |
| 1350 | 460A | 2AE4 | D1E0 | 0146 | FCFF | 46F8 | 8A46 | 082A |
| 1360 | E43B | 46F8 | 77CA | B820 | 0050 | 8A46 | 0C2A | E450 |
| 1370 | 8A46 | 0A50 | 8A46 | 0850 | 8A46 | 0650 | 8A46 | 0450 |
| 1380 | E8F9 | 0183 | C40C | 8A46 | 0E2A | E43D | 4400 | 740C |
| 1390 | 3D53 | 0075 | 0FC7 | 46EE | F608 | EB0D | C746 | EE02 |
| 13A0 | 09EB | 0690 | C746 | EE00 | 0083 | 7EEE | 0075 | 03E9 |
| 13B0 | 0701 | 8B5E | EE8B | 5F08 | 8A07 | 2AE4 | 508A | 4610 |
| 13C0 | 50B8 | 0100 | 508A | 4608 | 2AE4 | 508A | 4606 | 508A |
| 13D0 | 4604 | 50E8 | A601 | 83C4 | 0C8B | 5EEE | 8B5F | 088A |
| 13E0 | 072A | E450 | 8A46 | 1050 | B801 | 0050 | 8A46 | 082A |
| 13F0 | E450 | 8A46 | FA50 | 8A46 | 0450 | E87F | 0183 | C40C |
| 1400 | 8B5E | EE8B | 5F0A | 8A07 | 2AE4 | 508A | 4610 | 508A |
| 1410 | 460A | 50B8 | 0100 | 508A | 4606 | 2AE4 | 508A | 4604 |
| 1420 | 50E8 | 5801 | 83C4 | 0C8B | 5EEE | 8B5F | 0A8A | 072A |
| 1430 | E450 | 8A46 | 1050 | 8A46 | 0A50 | B801 | 0050 | 8A46 |
| 1440 | 062A | E450 | 8A46 | F250 | E831 | 0183 | C40C | 8B5E |
| 1450 | EE1E | FF37 | 8A46 | 102A | E450 | 8A46 | 0650 | 8A46 |
| 1460 | 0450 | E897 | 0183 | C40A | 8B5E | EE1E | FF77 | 028A |
| 1470 | 4610 | 2AE4 | 508A | 46FA | 508A | 4604 | 50E8 | 7C01 |
| 1480 | 83C4 | 0A8B | 5EEE | 1EFF | 7704 | 8A46 | 102A | E450 |
| 1490 | 8A46 | 0650 | 8A46 | F250 | E861 | 0183 | C40A | 8B5E |

```
14A0    EE1E FF77 068A 4610    2AE4 508A 46FA 508A
14B0    46F2 50E8 4601 83C4    0A1E FF76 128A 4614
14C0    2AE4 508A 460A 8BD0    1E07 8B7E 12B9 FFFF
14D0    33C0 F2AE F7D1 492B    D1D1 EA8A 4606 2AE4
14E0    03D0 528A 4604 50E8    1201 83C4 0A5F 8BE5
14F0    5DC3 558B EC83 EC0C    A15C 208B C8D1 E003
1500    C1D1 E005 1A20 8946    F4A1 8E2A 8946 F88B
1510    5EF4 B050 F627 8A4F    012A ED03 C8D1 E189
1520    4EF6 8B47 0489 46FC    8C5E FEC7 46FA 0000
1530    EB2F 8A47 032A E4D1    E050 FF76 F6FF 76F8
1540    FF76 FCFF 76FE E877    4183 C40A 8146 F6A0
1550    008B 5EF4 8A47 032A    E4D1 E001 46FC FF46
1560    FA8A 4702 2AE4 3B46    FA77 C7FF 7704 E81D
1570    3B83 C402 FF0E 5C20    8BE5 5DC3 558B EC83
1580    EC0E 568A 5E0C 2AFF    8B36 902C 8A20 2AC0
1590    8A4E 0E2A ED0B C189    46FE A18E 2A89 46FA
15A0    B050 F666 048A 4E06    03C1 D1E0 8946 F8C7
15B0    46FC 0000 EB22 C45E    F48B 46FE 2689 0783
15C0    46F4 02FF 46F2 8A46    0A2A E43B 46F2 77E6
15D0    8146 F8A0 00FF 46FC    8A46 082A E43B 46FC
15E0    7614 8B46 F88B 56FA    8946 F489 56F6 C746
15F0    F200 00EB D190 5E8B    E55D C390 558B EC83
1600    EC0E 568A 5E08 2AFF    8B36 902C 8A00 8846
1610    F2A1 8E2A 8946 FAB0    50F6 6604 8A4E 062A
1620    ED03 C1D1 E089 46F8    8B56 FA89 46F4 8956
1630    F68B 460A 8B56 0C89    46FC 8956 FEEB 1F90
1640    C45E FC26 8A07 C45E    F426 8807 FF46 FCFF
1650    46F4 C45E F48A 46F2    2688 07FF 46F4 C45E
1660    FC26 803F 0075 D95E    8BE5 5DC3 558B EC83
1670    EC0E 56C7 46F6 0000    F746 0800 0175 198B
1680    4EF6 8C5E F4C5 760A    EB01 418B D980 3800
1690    75F8 8E5E F489 4EF6    C746 FA00 0083 7E08
16A0    0074 1AFF 760C FF76    0A8A 4608 2AE4 508A
16B0    4606 508A 4604 50E8    42FF 83C4 0A8A 4606
16C0    2AE4 0346 FA50 8A46    042A E450 E82B 0283
16D0    C404 E891 1589 46FC    8A46 FC88 46F8 8A46
16E0    FD88 46FE 2AE4 3D37    0074 1776 03E9 9200
16F0    3D01 0074 0D3D 0F00    7412 3D1C 0074 03E9
1700    9F00 8A46 FE2A E45E    8BE5 5DC3 807E F800
1710    7408 B84D 005E 8BE5    5DC3 B84B 005E 8BE5
1720    5DC3 837E FA00 74F2    FF4E FAE9 6FFF 8B46
1730    F639 46FA 74DC FF46    FAF7 4608 0002 7503
1740    E95A FF39 46FA 7403    E952 FFEB C590 8B46
1750    0A03 46FA 8946 F48B    46F6 2B46 FA48 50FF
1760    76F4 FF76 0C8B 46F4    4050 FF76 0CE8 503F
1770    83C4 0A8B 76F6 C45E    0A26 C640 FF20 E91C
1780    FF90 3D4A 0075 03E9    78FF 3D4B 0074 933D
1790    4D00 749A 3D4E 0075    03E9 66FF 3D53 0074
17A0    AD8A 46F8 2AE4 0BC0    7503 E955 FF3D 0800
17B0    7438 8B46 F639 46FA    7203 E9E0 FE8B 5EFA
17C0    C476 0A8A 46F8 2688    00FF 46FA F746 0800
17D0    0275 03E9 C7FE 8B46    F639 46FA 7403 E9BC
17E0    FEB8 1C00 5E8B E55D    C390 837E FA00 7503
17F0    E9AA FEFF 4EFA 8B46    0A03 46FA 8946 F28B
1800    46F6 2B46 FA48 50FF    76F2 FF76 0C8B 46F2
```

```
1810    E955 FF90 558B EC83    EC0E 8A46 0C88 46F5
1820    8A46 0488 46F7 8A46    0688 46F6 8A46 0402
1830    4608 FEC8 8846 F98A    4606 0246 0AFE C888
1840    46F8 837E 0E00 7C0A    C646 F306 8A46 0EEB
1850    0A90 C646 F307 8B46    0EF7 D888 46F2 8D46
1860    F250 8D46 F250 B810    0050 E89B 3C83 C406
1870    8BE5 5DC3 558B EC83    EC0E C646 F30E C646
1880    F207 C646 F400 8D46    F250 8D46 F250 B810
1890    0050 E873 3C83 C406    8BE5 5DC3 558B EC8B
18A0    5E04 8A1F 2AFF F687    311E 0274 098B 5E04
18B0    8A07 2C20 EB05 8B5E    048A 07FF 4604 8807
18C0    0AC0 75DB 5DC3 558B    EC83 EC0E C646 F303
18D0    C646 F500 8D46 F250    8D46 F250 B810 0050
18E0    E825 3C83 C406 8B5E    048A 46F9 8807 8B5E
18F0    068A 46F8 8807 8BE5    5DC3 558B EC83 EC0E
1900    C646 F302 8A46 0488    46F9 8A46 0688 46F8
1910    C646 F500 8D46 F250    8D46 F250 B810 0050
1920    E8E5 3B83 C406 8BE5    5DC3 558B EC83 EC0E
1930    C646 F301 8A66 042A    C003 4606 8946 F68D
1940    46F2 508D 46F2 50B8    1000 50E8 BA3B 83C4
1950    068B E55D C390 B851    0050 B819 0050 E899
1960    FF83 C404 C390 A05E    202A E450 A05F 2050
1970    E8B7 FF83 C404 C390    558B EC83 EC06 8B5E
1980    048A 4704 2AE4 3D01    0074 053D 0200 740E
1990    C646 FC01 C646 FA03    C646 FE04 EB0C C646
19A0    FC06 C646 FA08 C646    FE09 8A46 FE2A E450
19B0    8B5E 04FF 7706 8A46    FA50 8A47 0550 8A46
19C0    FC50 8A47 0350 8A47    0250 8A47 0150 8A07
19D0    50E8 C8F8 83C4 128B    E55D C390 558B ECFF
19E0    7604 E82F 0083 C402    1EFF 7606 B801 0050
19F0    8B5E 048A 4701 2AE4    0502 0050 8A47 022A
1A00    E48A 0F2A ED03 C12D    0200 50E8 EEFB 83C4
1A10    0A5D C390 558B ECB8    0100 502B C050 8B5E
1A20    048A 4703 2AE4 2D02    0050 8A47 022A E42D
1A30    0200 508A 4701 2AE4    4050 8A07 2AE4 4050
1A40    E8D1 FD83 C40C 5DC3    558B EC83 EC0E C646
1A50    F302 C646 F500 8D46    F250 8D46 F250 B810
1A60    0050 E8A3 3A83 C406    8B5E 048A 46F7 8807
1A70    8B5E 068A 46F6 8807    8BE5 5DC3 558B EC83
1A80    EC0E C646 F301 8A46    0488 46F7 8A46 0688
1A90    46F6 C646 F500 8D46    F250 8D46 F250 B810
1AA0    0050 E863 3A83 C406    8BE5 5DC3 558B EC83
1AB0    EC06 57FF 7604 B869    0B50 FF36 3E0C E86B
1AC0    3B83 C406 C706 D003    0000 B838 0C50 E8A7
1AD0    FE83 C402 B821 00F7    6604 8BD8 8A87 5827
1AE0    2AE4 B106 D3E8 2503    00A3 D00B 8846 FCB8
1AF0    0100 50B8 CA0B 50E8    88F5 83C4 04B8 CA0B
1B00    50E8 2E07 83C4 0289    46FE 3D01 0075 4BE8
1B10    E0F9 C706 D003 0100    C746 FA00 00EB 1890
1B20    B801 0050 B86E 00F7    66FA 0512 0150 E851
1B30    F583 C404 FF46 FAA1    CE03 3946 FA72 E1B8
1B40    0200 50B0 6EF6 262E    2405 1201 50E8 32F5
1B50    83C4 042B C05F 8BE5    5DC3 8A46 FC2A E43B
1B60    06D0 0B74 17B8 2100    F766 048B D8B9 2100
1B70    8DBF 5827 8CD8 8EC0    2BC0 F2AA A1D0 0BB1
```

```
1B80    03D3 E005 480C 50E8    EEFD 83C4 02B8 0200
1B90    50B8 0500 50B8 0100    50B8 840B 50B8 0200
1BA0    50B8 1600 50E8 CA0B    83C4 0CB8 0200 50B8
1BB0    0500 50B8 0100 50B8    C80B 50B8 0200 50B8
1BC0    1700 50E8 AC0B 83C4    0CA1 D00B 0BC0 7412
1BD0    3D01 0074 293D 0200    742C 3D03 0074 2FEB
1BE0    0A90 FF76 04E8 6C00    83C4 02E8 04F9 E801
1BF0    F9C7 06D0 0301 00C7    46FA 0000 EB2F FF76
1C00    04E8 8202 EBE2 FF76    04E8 6603 EBDA FF76
1C10    04E8 4C05 EBD2 B801    0050 B86E 00F7 66FA
1C20    0512 0150 E85B F483    C404 FF46 FAA1 CE03
1C30    3946 FA72 E1B8 0200    50B0 6EF6 262E 2405
1C40    1201 50E8 3CF4 83C4    04E8 C8F3 B801 005F
1C50    8BE5 5DC3 558B EC83    EC06 5756 B821 00F7
1C60    6604 8BF0 8A84 5827    2404 3C01 1BC9 F7D9
1C70    890E 760C 8A84 5927    8846 FE2A E425 C000
1C80    B106 D3E8 0430 A2E8    0C8A 46FE 2420 3C01
1C90    1BC9 F7D9 890E 520D    8A46 FE24 103C 011B
1CA0    C9F7 D989 0EC0 0D8A    46FE 2408 3C01 1BC9
1CB0    F7D9 890E 2E0E 8A46    FE24 043C 011B C9F7
1CC0    D989 0E9C 0EB8 0200    508B C605 7327 50B8
1CD0    0E0F 50E8 040A 83C4    06B8 2100 F766 048B
1CE0    D88A 875A 2788 46FE    2AE4 B105 D3E8 2507
1CF0    0050 B83A 1A50 B87C    0F50 E82F 3983 C406
1D00    8A46 FE2A E425 1F00    50B8 3D1A 50B8 EA0F
1D10    50E8 1839 83C4 06B8    2100 F766 0405 5B27
1D20    8946 FAB9 1800 56BF    5810 8BF0 1E07 D1E9
1D30    F2A5 13C9 F2A4 5EC6    06DE 1000 BF58 108C
1D40    D8B9 FFFF 33C0 F2AE    F7D1 4989 4EFC 83F9
1D50    1873 108B D9B9 1800    2BCB 8DBF 5810 B820
1D60    00F2 AAC7 46FC 0000    EB17 B801 0050 B86E
1D70    00F7 66FC 0570 0C50    E807 F383 C404 FF46
1D80    FCA1 2A11 3946 FC72    E1B8 700C 50B8 2A11
1D90    50E8 0C05 83C4 0489    46FC 3D01 0075 03E9
1DA0    DE00 833E 760C 0075    05B0 04EB 0390 2AC0
1DB0    8BC8 B821 00F7 6604    8BD8 888F 5827 B8E8
1DC0    0C50 E86D 3683 C402    B106 D2E0 8846 FE83
1DD0    3E52 0D00 7504 804E    FE20 833E C00D 0075
1DE0    0480 4EFE 1083 3E2E    0E00 7504 804E FE08
1DF0    833E 9C0E 0075 0480    4EFE 04B8 2100 F766
1E00    048B D88A 46FE 8887    5927 B87C 0F50 E821
1E10    3683 C402 B105 D2E0    8846 FEB8 EA0F 50E8
1E20    1036 83C4 0224 1F08    46FE B821 00F7 6604
1E30    8BD8 8A46 FE88 875A    27C7 46FC 0000 8B5E
1E40    FC8A 8758 102A E450    E865 3683 C402 8BC8
1E50    B821 00F7 6604 8BF0    8B5E FC88 885B 27FF
1E60    46FC 837E FC18 72D6    B802 0050 B80E 0F50
1E70    B821 00F7 6604 0573    2750 E805 0883 C406
1E80    5E5F 8BE5 5DC3 558B    EC83 EC02 B821 00F7
1E90    6604 8BD8 8A87 5827    2410 3C01 1BC9 F7D9
1EA0    890E 3211 C746 FE00    00B8 0500 50B8 2100
1EB0    F766 048B 4EFE 8BD1    D1E1 D1E1 03CA 03C8
1EC0    81C1 5927 51B8 6E00    F7E2 05A4 1150 E809
1ED0    0883 C406 FF46 FE83    7EFE 0672 CCC7 46FE
1EE0    0000 EB17 B801 0050    B86E 00F7 66FE 052C
```

9

```
1EF0   1150 E88D F183 C404   FF46 FEA1 2E14 3946
1F00   FE72 E1B8 2C11 50B8   2E14 50E8 9203 83C4
1F10   0489 46FE 3D01 0074   5583 3E32 1100 7504
1F20   B050 EB02 B040 8BC8   B821 00F7 6604 8BD8
1F30   888F 5827 C746 FE00   00B8 0500 50B8 6E00
1F40   F766 FE05 A411 50B8   2100 F766 048B 4EFE
1F50   8BD1 D1E1 D1E1 03CA   03C8 81C1 5927 51E8
1F60   2007 83C4 06FF 46FE   837E FE06 72CB 8BE5
1F70   5DC3 558B EC83 EC08   5756 B821 00F7 6604
1F80   8BD8 8A87 5927 2AE4   25F0 00B1 04D3 E850
1F90   B842 1A50 B83A 1450   E891 3683 C406 B821
1FA0   00F7 6604 8946 F88B   D88A 8759 2724 083C
1FB0   011B C9F7 D989 0EA4   148A 8759 2724 043C
1FC0   011B C9F7 D989 0E12   15B8 0500 508B C305
1FD0   5A27 50B8 8415 50E8   0007 83C4 06B8 2100
1FE0   F766 0405 5F27 8946   FAB9 0A00 BF84 2A8B
1FF0   F01E 07D1 E9F2 A513   C9F2 A4B8 2100 F766
2000   048B D88B 8769 2789   46FE 50B8 471A 50B8
2010   6016 50E8 1636 83C4   06B8 2100 F766 048B
2020   D88A 876B 272A E450   B84C 1A50 B8CE 1650
2030   E8F9 3583 C406 B821   00F7 6604 8BD8 8A87
2040   6C27 2AE4 50B8 511A   50B8 3C17 50E8 DC35
2050   83C4 06C7 46FC 0000   EB17 B801 0050 B86E
2060   00F7 66FC 0530 1450   E817 F083 C404 FF46
2070   FCA1 A017 3946 FC72   E1B8 3014 50B8 A017
2080   50E8 BE03 83C4 0489   46FC 3D01 0075 03E9
2090   C800 B821 00F7 6604   8BF0 C684 5827 80B8
20A0   3A14 50E8 8C33 83C4   02B1 04D2 E088 8459
20B0   2783 3EA4 1400 750D   B821 00F7 6604 8BD8
20C0   808F 5927 0883 3E12   1500 750D B821 00F7
20D0   6604 8BD8 808F 5927   04B8 0500 50B8 8415
20E0   50B8 2100 F766 0405   5A27 50E8 9405 83C4
20F0   06B8 2100 F766 048B   D8B9 0A00 568D BF5F
2100   27BE 842A 8CD8 8EC0   D1E9 F2A5 13C9 F2A4
2110   5EB8 6016 50E8 1A33   83C4 0289 46FE B821
2120   00F7 6604 8BF0 8A46   FF88 846A 278A 46FE
2130   8884 6927 B8CE 1650   E8F7 3283 C402 8884
2140   6B27 B83C 1750 E8E9   3283 C402 8BC8 B821
2150   00F7 6604 8BD8 888F   6C27 5E5F 8BE5 5DC3
2160   558B EC83 EC06 56B8   2100 F766 0489 46FA
2170   8BD8 8A87 5927 2AE4   8946 FE8A A75A 272A
2180   C001 46FE FF76 FEB8   561A 50B8 6619 50E8
2190   9A34 83C4 06B8 0800   50B8 2100 F766 0405
21A0   5C27 50B8 D419 50E8   3005 83C4 06C7 46FC
21B0   0000 EB17 B801 0050   B86E 00F7 66FC 055C
21C0   1950 E8BD EE83 C404   FF46 FCA1 381A 3946
21D0   FC72 E1B8 5C19 50B8   381A 50E8 C200 83C4
21E0   0489 46FC 3D01 0074   44B8 2100 F766 048B
21F0   D8C6 8758 27C0 B866   1950 E835 3283 C402
2200   8946 FEB8 2100 F766   048B F08A 46FE 8884
2210   5927 8A46 FF88 845A   27B8 0800 50B8 D419
2220   508B C605 5C27 50E8   5804 83C4 065E 8BE5
2230   5DC3 558B EC83 ECOA   EB31 3D1C 0074 573D
2240   4B00 7408 3D4D 0074   08EB 2090 C746 F8FF
2250   FF8B 5E04 8347 0689   46F6 8B47 0603 4708
```

```
2260   0346 F82B D2F7 7708   8957 06B8 0100 50FF
2270   7604 E80D EE83 C404   E8EB 0989 46FA 8A46
2280   FA88 46FE 8A46 FB88   46FC C746 F801 002A
2290   E43D 0100 75A4 8A46   FC2A E48B E55D C390
22A0   558B EC83 EC0E 5756   2AC0 8846 FE88 46F8
22B0   B801 0050 B06E F666   FE03 4606 50E8 C2ED
22C0   83C4 04B8 0200 50B0   6EF6 66F8 0346 0650
22D0   E8AF ED83 C404 8A46   F888 46FE E887 0989
22E0   46F6 8A46 F688 46FC   8A46 F788 46FA C746
22F0   F401 002A E43D 0100   7503 E939 013D 4400
2300   7503 E931 013D 4800   7420 3D4B 0074 2F3D
2310   4D00 742F 3D50 0075   978A 46F8 402B D28B
2320   5E04 F737 8856 F8EB   8790 8B5E 048B 378A
2330   46F8 2AE4 03C6 482B   D2F7 F6EB E790 C746
2340   F4FF FFB0 6EF6 66F8   8BF0 0376 0683 7C08
2350   0177 03E9 C000 8B44   0689 46F2 8B44 0603
2360   4408 0346 F42B D2F7   7408 8954 0680 7EF8
2370   0174 03E9 3AFF B803   0050 B81A 1850 8B46
2380   0605 7800 50E8 7030   83C4 060B C074 03E9
2390   1EFF B06E F666 F88B   F88B 5E06 8379 0600
23A0   7432 B903 0056 8DBF   E600 BE5B 1A8C D88E
23B0   C0D1 E9F2 A513 C9F2   A45E 8B5E 06B9 0300
23C0   568D BFFF 00BE 5E1A   D1E9 F2A5 13C9 F2A4
23D0   5EEB 2F90 8B5E 06B9   0300 8DBF E600 BE61
23E0   1A8C D88E C0D1 E9F2   A513 C9F2 A48B 5E06
23F0   B903 008D BFFF 00BE   641A D1E9 F2A5 13C9
2400   F2A4 B801 0050 8B46   0605 DC00 50E8 72EC
2410   83C4 04E9 9AFE B06E   F666 F803 4606 50E8
2420   5AE2 83C4 0288 46FA   2AE4 3D48 0075 03E9
2430   F8FE E9DF FE90 8A46   FA2A E45E 5F8B E55D
2440   C390 558B EC83 EC14   562A C088 46FE 8846
2450   F8B8 0100 50B0 6EF6   66FE 0346 0650 E821
2460   EC83 C404 B802 0050   B06E F666 F803 4606
2470   50E8 0EEC 83C4 048A   46F8 8846 FEE8 E607
2480   8946 F68A 46F6 8846   FC8A 46F7 8846 FAC7
2490   46F4 0100 2AE4 3D01   0075 03E9 DC00 3D44
24A0   0075 03E9 D400 3D48   0074 1F3D 4B00 7432
24B0   3D4D 0074 323D 5000   7597 8A46 F840 2BD2
24C0   8B5E 04F7 3788 56F8   EB87 8B5E 048B 0789
24D0   46F0 8A46 F82A E403   46F0 482B D2F7 76F0
24E0   EBE3 C746 F4FF FFB0   6EF6 66F8 8BF0 8B5E
24F0   0683 7808 0176 27B0   6EF6 66F8 03C3 8946
2500   EE8B D88B 4706 8946   F28B 4706 0347 0803
2510   46F4 2BD2 F777 0889   5706 E934 FF90 B06E
2520   F666 F803 4606 50E8   52E1 83C4 0288 46FA
2530   807E F804 751D 3C1C   7519 B06E F666 F803
2540   4606 050A 0050 E8E9   2E83 C402 50E8 3400
2550   83C4 028A 46FA 2AE4   3D48 0074 03E9 55FF
2560   8B5E 048B 0789 46EC   8A46 F82A E403 46EC
2570   482B D2F7 76EC E94C   FF90 8A46 FA2A E45E
2580   8BE5 5DC3 558B EC83   EC04 FF76 04B8 671A
2590   50FF 3646 0CE8 9430   83C4 06B8 400C 50E8
25A0   D6F3 83C4 028B 5E04   8A87 842A 8846 FE2A
25B0   E4B1 04D3 E825 0F00   4050 B881 1A50 B8AC
25C0   1750 E867 3083 C406   8A46 FE24 083C 011B
```

| | | | | | | | |
|---|---|---|---|---|---|---|---|
| 25D0 | C9F7 | D989 | 0E16 | 188A | 46FE | 2404 | 3C01 | 1BC9 |
| 25E0 | F7D9 | 890E | 8418 | 8A46 | FE2A | E425 | 0300 | 50B8 |
| 25F0 | 861A | 50B8 | F618 | 50E8 | 3230 | 83C4 | 06C7 | 46FC |
| 2600 | 0000 | EB17 | B801 | 0050 | B86E | 00F7 | 66FC | 05A2 |
| 2610 | 1750 | E86D | EA83 | C404 | FF46 | FCA1 | 5A19 | 3946 |
| 2620 | FC72 | E1B8 | A217 | 50B8 | 5A19 | 50E8 | 72FC | 83C4 |
| 2630 | 0489 | 46FC | E8BB | EE83 | 7EFC | 0174 | 40B8 | AC17 |
| 2640 | 50E8 | EE2D | 83C4 | 02FE | C8B1 | 04D2 | E088 | 46FE |
| 2650 | 833E | 1618 | 0075 | 0480 | 46FE | 0883 | 3E84 | 1800 |
| 2660 | 7504 | 8046 | FE04 | B8F6 | 1850 | E8C5 | 2D83 | C402 |
| 2670 | 0046 | FE8B | 5E04 | 8A46 | FE88 | 8784 | 2A8B | E55D |
| 2680 | C390 | 558B | EC83 | EC0A | 56C6 | 46FC | 00C7 | 46F8 |
| 2690 | 0000 | EB38 | 8B46 | F8D1 | E003 | 4606 | 8946 | F68B |
| 26A0 | D88A | 0788 | 46FA | 8A47 | 0188 | 46FB | 8D46 | FE50 |
| 26B0 | B889 | 1A50 | 8D46 | FA50 | E8C7 | 2F83 | C406 | 8B5E |
| 26C0 | F88B | 7604 | 8A46 | FE88 | 00FF | 46F8 | 8B46 | 0839 |
| 26D0 | 46F8 | 72C0 | 5E8B | E55D | C390 | 558B | EC83 | EC02 |
| 26E0 | 56C7 | 46FE | 0000 | EB20 | 8B5E | FE8B | 7606 | 8A00 |
| 26F0 | 2AE4 | 50B8 | 8C1A | 508B | C3D1 | E003 | 4604 | 50E8 |
| 2700 | 2A2F | 83C4 | 06FF | 46FE | 8B46 | 0839 | 46FE | 72D8 |
| 2710 | 8BD8 | D1E3 | 8B76 | 04C6 | 0000 | 5E8B | E55D | C390 |
| 2720 | 558B | EC83 | EC02 | A00D | 012A | E48A | 0E0E | 012A |
| 2730 | ED0B | C18A | 0E0F | 010B | C18A | 0E10 | 010B | C150 |
| 2740 | A011 | 012A | E450 | 2BC0 | 50E8 | AC30 | 83C4 | 06A0 |
| 2750 | 1101 | 2AE4 | 509A | C004 | 6305 | 83C4 | 0289 | 46FE |
| 2760 | 0BC0 | 750A | B892 | 1A50 | E8E7 | 0283 | C402 | 8BE5 |
| 2770 | 5DC3 | 558B | EC83 | EC12 | 568A | 460A | 988B | D88B |
| 2780 | 3690 | 2C8A | 0088 | 46EE | 8A46 | 0C98 | 8BD8 | 8A00 |
| 2790 | 8846 | EF8A | 460E | 988B | D88A | 0088 | 46F0 | B8B0 |
| 27A0 | 1A1E | 502B | C050 | B801 | 0050 | 8A46 | 042A | E450 |
| 27B0 | E849 | EE83 | C40A | A18E | 2A89 | 46F8 | B850 | 00F7 |
| 27C0 | 6E04 | 0346 | 06D1 | E089 | 46F6 | 8B56 | F889 | 46F2 |
| 27D0 | 8956 | F48B | 4608 | 8946 | FC8C | 5EFE | C646 | FA00 |
| 27E0 | EB44 | C45E | FC26 | 803F | 5B75 | 07C6 | 46FA | 02EB |
| 27F0 | 3290 | 2680 | 3F3E | 7406 | 2680 | 3F5D | 7506 | C646 |
| 2800 | FA00 | EB1F | 268A | 07C4 | 5EF2 | 2688 | 07FF | 46F2 |
| 2810 | 8B76 | FA81 | E6FF | 008A | 42EE | C45E | F226 | 8807 |
| 2820 | FF46 | F2FF | 46FC | C45E | FC26 | 803F | 0074 | 0D26 |
| 2830 | 803F | 3C75 | ADC6 | 46FA | 01EB | E890 | 5E8B | E55D |
| 2840 | C390 | 558B | ECFF | 7606 | FF76 | 04E8 | 8E2D | 83C4 |
| 2850 | 04FF | 7606 | B802 | 1B50 | E881 | 2D83 | C404 | 5DC3 |
| 2860 | 558B | EC83 | EC02 | 57B9 | 0300 | 1E07 | 8B7E | 04B8 |
| 2870 | 2000 | F2AA | 8B5E | 04C6 | 0731 | 8B5E | 04C6 | 4703 |
| 2880 | 00B8 | 0200 | 50B8 | 041B | 50B8 | 0200 | 50B8 | 5300 |
| 2890 | 50B8 | 0200 | 50B8 | 1E00 | 50B8 | 0300 | 50B8 | 1E00 |
| 28A0 | 50B8 | 0B00 | 50E8 | F4E9 | 83C4 | 121E | FF76 | 04B8 |
| 28B0 | 0500 | 50B8 | 2000 | 50B8 | 0C00 | 50E8 | AEED | 83C4 |
| 28C0 | 0A2A | E489 | 46FE | E829 | EC5F | 8BE5 | 5DC3 | 558B |
| 28D0 | EC83 | EC52 | 57B9 | 4600 | 8D7E | B08C | D08E | C0B8 |
| 28E0 | 2000 | F2AA | C646 | F600 | 1E07 | 8B7E | 04B9 | FFFF |
| 28F0 | 33C0 | F2AE | F7D1 | 4951 | FF76 | 048D | 46B0 | 50E8 |
| 2900 | CE2A | 83C4 | 06B8 | 0200 | 50B8 | 101B | 50B8 | 0200 |
| 2910 | 50B8 | 5300 | 50B8 | 0200 | 50B8 | 4D00 | 50B8 | 0300 |
| 2920 | 50B8 | 0200 | 50B8 | 1500 | 50E8 | 70E9 | 83C4 | 128D |
| 2930 | 46B0 | 1650 | B805 | 0050 | B804 | 0050 | B816 | 0050 |

```
2940  E829 ED83 C40A 2AE4  8946 AEE8 A4EB 837E
2950  AE01 7428 8D7E B08C  D08E C0B9 FFFF 33C0
2960  F2AE F7D1 4951 8D46  B050 FF76 04E8 602A
2970  83C4 06B8 0100 5F8B  E55D C390 2BC0 5F8B
2980  E55D C390 558B EC83  EC02 572B C050 50B8
2990  0200 50E8 4E2E 83C4  0689 46FE 3D90 0074
29A0  3FF6 46FE 0174 0FB8  1F1B 50E8 A400 83C4
29B0  025F 8BE5 5DC3 F646  FE20 7406 B832 1BEB
29C0  E990 F646 FE08 7406  B840 1BEB DD90 F646
29D0  FE40 7406 B852 1BEB  D190 B86E 1BEB CB90
29E0  1E07 8B7E 04B9 FFFF  33C0 F2AE F7D1 4974
29F0  2D8B 7E04 B9FF FF33  C0F2 AEF7 D149 51FF
2A00  7604 B804 0050 E84B  2583 C406 B802 0050
2A10  B87D 1B50 B804 0050  E839 2583 C406 1E07
2A20  8B7E 06B9 FFFF 33C0  F2AE F7D1 4951 FF76
2A30  06B8 0400 50E8 1C25  83C4 06B8 0200 50B8
2A40  801B 50B8 0400 50E8  0A25 83C4 065F 8BE5
2A50  5DC3 558B EC83 EC02  57B8 0900 50B8 831B
2A60  50B8 0800 50B8 5300  50B8 0600 50B8 3200
2A70  50B8 0600 50B8 1900  50B8 1300 50E8 1CE8
2A80  83C4 121E 078B 7E04  B9FF FF33 C0F2 AEF7
2A90  D149 83E9 32F7 D9D1  E980 C119 884E FE1E
2AA0  FF76 04B8 0A00 508A  C12A E450 B815 0050
2AB0  E849 EB83 C40A B88B  1B1E 50B8 0600 50B8
2AC0  2400 50B8 1700 50E8  32EB 83C4 0AE8 A4ED
2AD0  B8A3 1B1E 502B C050  B83B 0050 B817 0050
2AE0  E889 EB83 C40A E809  EA5F 8BE5 5DC3 558B
2AF0  EC83 EC02 57B8 0400  50B8 A41B 50B8 0300
2B00  50B8 5300 50B8 0100  50B8 3200 50B8 0600
2B10  50B8 1900 50B8 1300  50E8 80E7 83C4 121E
2B20  078B 7E04 B9FF FF33  C0F2 AEF7 D149 83E9
2B30  32F7 D9D1 E980 C119  884E FE1E FF76 04B8
2B40  0A00 508A C12A E450  B815 0050 E8AD EA83
2B50  C40A B8AE 1B1E 50B8  0600 50B8 2400 50B8
2B60  1700 50E8 96EA 83C4  0AE8 08ED E8F7 00E8
2B70  80E9 5F8B E55D C390  558B EC83 EC06 57B8
2B80  0900 50B8 CA1B 50B8  0800 50B8 4400 50B8
2B90  0600 50B8 3200 50B8  0600 50B8 0F00 50B8
2BA0  0E00 50E8 F6E6 83C4  121E 078B 7E04 B9FF
2BB0  FF33 C0F2 AEF7 D149  83E9 32F7 D9D1 E980
2BC0  C10F 884E FA1E FF76  04B8 0A00 508A C12A
2BD0  E450 B810 0050 E823  EA83 C40A B8D4 1B1E
2BE0  50B8 0600 50B8 1B00  50B8 1200 50E8 0CEA
2BF0  83C4 0AC6 46FE 59C6  46FF 008D 46FE 1650
2C00  B807 0250 B830 0050  B812 0050 E85D EA83
2C10  C40A 8846 FC3C 1C74  043C 0175 DE8A 46FE
2C20  2AE4 50E8 8A28 83C4  0288 46FE 807E FC01
2C30  7408 3C59 7404 3C4E  7518 E8B5 E880 7EFC
2C40  0174 1B80 7EFE 5975  15B8 0100 5F8B E55D
2C50  C390 B8EA 1B50 E8F9  FD83 C402 EB9D 2BC0
2C60  5F8B E55D C390 558B  EC83 EC14 C646 FE20
2C70  B801 0050 E859 2B83  C402 8946 EC83 3ED4
2C80  0300 7576 8D46 EE16  509A D405 6305 83C4
2C90  0489 46FC 0BC0 7556  2BC0 50A0 1101 2AE4
2CA0  50B8 0300 50E8 502B  83C4 0689 46FC 8A46
```

```
2CB0   FE2A E450 FF76 FCB8   001C 508D 46F0 50E8
2CC0   6A29 83C4 088D 46F0   1650 B801 0050 B846
2CD0   0050 B815 0050 E823   E983 C40A 807E FE20
2CE0   7504 B02A EB02 B020   8846 FEEB 0D90 8A46
2CF0   EE2A E450 E875 E083   C402 837E EC00 7503
2D00   E96D FF2B C050 E8C7   2A83 C402 8BE5 5DC3
2D10   558B EC83 EC54 B8C6   0350 E85B EC83 C402
2D20   B805 1C50 B807 1C50   E8D1 0683 C404 8946
2D30   FCEB 4390 B80A 0050   8D46 AC50 E89F 2983
2D40   C404 8946 FE0B C074   058B D8C6 0700 B80D
2D50   0050 8D46 AC50 E885   2983 C404 8946 FE0B
2D60   C074 058B D8C6 0700   8D46 AC50 B8C6 0350
2D70   E869 EC83 C404 FF76   FCB8 5000 508D 46AC
2D80   50E8 0228 83C4 060B   C075 A983 7EFC 0074
2D90   09FF 76FC E879 0583   C402 E853 273D 1B00
2DA0   75F8 E84D E78B E55D   C390 B430 CD21 3C02
2DB0   7302 CD20 BFC4 058B   3602 002B F781 FE00
2DC0   1072 03BE 0010 FA8E   D781 C49E 2CFB 7310
2DD0   161F E8F7 0133 C050   E876 04B8 FF4C CD21
2DE0   83E4 FE36 8926 161C   3689 2612 1C8B C6B1
2DF0   04D3 E048 36A3 101C   03F7 8936 0200 8CC3
2E00   2BDE F7DB B44A CD21   368C 1E87 1C16 07FC
2E10   BF1E 20B9 A02C 2BCF   33C0 F3AA 161F E83B
2E20   0016 1FE8 9203 E801   0233 EDFF 36A8 1CFF
2E30   36A6 1CFF 36A4 1CE8   D6D3 50E8 E200 B8C4
2E40   058E D8B8 0300 36C7   0614 1C20 2D50 E87B
2E50   01E8 FD03 B8FF 0050   FF16 141C B430 CD21
2E60   A389 1CB8 0035 CD21   891E 751C 8C06 771C
2E70   0E1F B800 25BA 3E2C   CD21 161F 8B0E 381F
2E80   E32E 8E06 871C 268B   362C 00C5 063A 1F8C
2E90   DA33 DB36 FF1E 361F   7305 161F E94D 0136
2EA0   C506 3E1F 8CDA BB03   0036 FF1E 361F 161F
2EB0   8E06 871C 268B 0E2C   00E3 368E C133 FF26
2EC0   803D 0074 2CB9 0C00   BE68 1CF3 A674 0BB9
2ED0   FF7F 33C0 F2AE 7519   EBE5 061E 071F 8BF7
2EE0   BF90 1CAC 9891 ACFE   C074 0148 AAE2 F716
2EF0   1FBB 0400 80A7 901C   BFB8 0044 CD21 720A
2F00   F6C2 8074 0580 8F90   1C40 4B79 E7BE 421F
2F10   BF42 1FE8 A200 BE42   1FBF 421F E88A 00C3
2F20   558B ECBE A620 BFA6   20E8 7D00 BE42 1FBF
2F30   441F E874 00EB 0355   8BEC BE44 1FBF 441F
2F40   E866 00BE 441F BF44   1FE8 6C00 E8B9 000B
2F50   C074 0B83 7E04 0075   05C7 4604 FF00 B90F
2F60   00BB 0500 F687 901C   0174 04B4 3ECD 2143
2F70   E2F2 E807 008B 4604   B44C CD21 8B0E 381F
2F80   E307 BB02 00FF 1E36   1F1E C516 751C B800
2F90   25CD 211F 803E B21C   0074 0D1E A0B3 1CC5
2FA0   16B4 1CB4 25CD 211F   C33B F773 0A4F 4F8B
2FB0   0DE3 F6FF D1EB F2C3   3BF7 730E 83EF 048B
2FC0   050B 4502 74F2 FF1D   EBEE C300 558B ECB8
2FD0   FC00 50E8 7B02 833E   B81C 0074 04FF 16B8
2FE0   1CB8 FF00 50E8 6902   8BE5 5DC3 B802 00E9
2FF0   5BFE 598B DC2B D872   0A3B 1EBA 1C72 048B
3000   E3FF E133 C0E9 45FE   5633 F6B9 4200 32E4
3010   FCAC 32E0 E2FB 80F4   5574 0DE8 AEFF B801
```

```
3020    0050 E82C 02B8 0100    5EC3 8F06 BC1C BA02
3030    0038 1689 1C74 298E    0687 1C26 8E06 2C00
3040    8C06 AC1C 33C0 99B9    0080 33FF F2AE AE75
3050    FB47 4789 3EAA 1CB9    FFFF F2AE F7D1 8BD1
3060    BF01 00BE 8100 8E1E    871C AC3C 2074 FB3C
3070    0974 F73C 0D74 6F0A    C074 6B47 4EAC 3C20
3080    74E8 3C09 74E4 3C0D    745C 0AC0 7458 3C22
3090    7424 3C5C 7403 42EB    E433 C941 AC3C 5C74
30A0    FA3C 2274 0403 D1EB    D38B C1D1 E913 D1A8
30B0    0175 CAEB 014E AC3C    0D74 2B0A C074 273C
30C0    2274 BA3C 5C74 0342    EBEC 33C9 41AC 3C5C
30D0    74FA 3C22 7404 03D1    EBDB 8BC1 D1E9 13D1
30E0    A801 75D2 EB97 161F    893E A41C 03D7 47D1
30F0    E703 D780 E2FE 2BE2    8BC4 A3A6 1C8B D803
3100    FB16 0736 893F 4343    C536 AA1C ACAA 0AC0
3110    75FA BE81 0036 8E1E    871C EB03 33C0 AAAC
3120    3C20 74FB 3C09 74F7    3C0D 7503 E97F 000A
3130    C075 03EB 7990 3689    3F43 434E AC3C 2074
3140    DB3C 0974 D73C 0D74    620A C074 5E3C 2274
3150    273C 5C74 03AA EBE4    33C9 41AC 3C5C 74FA
3160    3C22 7406 B05C F3AA    EBD1 B05C D1E9 F3AA
3170    7306 B022 AAEB C54E    AC3C 0D74 2E0A C074
3180    2A3C 2274 B73C 5C74    03AA EBEC 33C9 41AC
3190    3C5C 74FA 3C22 7406    B05C F3AA EBD9 B05C
31A0    D1E9 F3AA 7396 B022    AAEB CD33 C0AA 161F
31B0    C707 0000 FF26 BC1C    558B EC55 8E1E 871C
31C0    33C9 8BC1 8BE9 8BF9    498B 362C 000B F674
31D0    108E C626 803E 0000    0074 06F2 AE45 AE75
31E0    FA45 9740 24FE 8BFD    D1E5 03C5 161F 57BF
31F0    0900 E885 005F 8BCF    8BFD 03F8 892E A81C
3200    1E07 8EDE 33F6 49E3    1381 3C3B 4374 0589
3210    7E00 4545 ACAA 0AC0    75FA E2ED 894E 0016
3220    1F5D 8BE5 5DC3 558B    EC56 571E 078B 5604
3230    BE4C 1FAD 3BC2 7410    4096 740C 9733 C0B9
3240    FFFF F2AE 8BF7 EBEB    965F 5E8B E55D C202
3250    0055 8BEC 57FF 7604    E8CB FF0B C074 1492
3260    8BFA 33C0 B9FF FFF2    AEF7 D149 BB02 00B4
3270    40CD 215F 8BE5 5DC2    0200 8BD0 0306 161C
3280    7235 3906 101C 7325    050F 0050 D1D8 B103
3290    D3E8 8CD9 8B1E 871C    2BCB 03C1 8EC3 8BD8
32A0    B44A CD21 5872 1024    F048 A310 1C95 8B2E
32B0    161C 0116 161C C38B    C7E9 91FB 7213 33C0
32C0    8BE5 5DC3 73F8 50E8    1800 588B E55D C373
32D0    07E8 0E00 B8FF FF99    8BE5 5DC3 32E4 E801
32E0    00C3 A28C 1C0A E475    2380 3E89 1C03 720D
32F0    3C22 730D 3C20 7205    B005 EB07 903C 1376
3300    02B0 13BB BE1C D798    A381 1CC3 8AC4 EBF7
3310    558B EC83 EC10 5756    8B76 04BF FFFF F644
3320    0683 7503 E997 00F6    4406 4074 03E9 8E00
3330    56E8 0C07 83C4 028B    F88B DE81 EBD8 1CB1
3340    03D3 FB8B C3D1 E303    D8D1 E38B 877C 1D89
3350    46FC 56E8 3E04 83C4    028A 4407 9850 E8D7
3360    1883 C402 0BC0 7C53    837E FC00 7450 B8D2
3370    1C50 8D46 F250 E8D3    1F83 C404 8D46 F489
3380    46FE 8BD8 807F FE5C    7410 B8D4 1C50 8D46
```

```
3390  F250 E877 1F83 C404  EB03 FF4E FEB8 0A00
33A0  50FF 76FE FF76 FCE8  E020 83C4 068D 46F2
33B0  50E8 0E24 83C4 020B  C074 03BF FFFF C644
33C0  0600 8BC7 5E5F 8BE5  5DC3 558B EC83 EC04
33D0  5756 BED8 1C2B FFEB  1590 F644 0683 740B
33E0  56E8 5C06 83C4 0240  7401 4783 C608 3936
33F0  F01D 73E6 8BC7 5E5F  8BE5 5DC3 558B EC83
3400  EC02 56E8 8C17 8BF0  0BF6 7410 56FF 7606
3410  FF76 04E8 1804 83C4  06EB 0390 2BC0 5E8B
3420  E55D C390 558B EC83  EC02 8D46 0889 46FE
3430  8D46 0850 FF76 06FF  7604 E871 068B E55D
3440  C390 558B EC83 EC08  5756 8B76 048B 7E0A
3450  8B46 06F7 6608 8946  FE89 46FC 837E 0600
3460  7406 837E 0800 7506  2BC0 E90B 0190 F645
3470  060C 7565 8BDF 81EB  D81C B103 D3FB 8BC3
3480  D1E3 03D8 D1E3 F687  781D 0175 4CF7 46FC
3490  FF01 7520 FF76 FC56  8A45 0798 50E8 B41A
34A0  83C4 0689 46F8 3DFF  FF74 BD2B D2F7 7606
34B0  E9C5 0090 FF4D 0278  0B8A 048B 1DFF 0588
34C0  07EB 0C90 578A 0498  50E8 7201 83C4 04F6
34D0  4506 2075 9346 FF4E  FCF6 4506 0875 408B
34E0  DF81 EBD8 1CB1 03D3  FB8B C3D1 E303 D8D1
34F0  E3F6 8778 1D01 745C  EB25 FF4D 0278 0B8A
3500  048B 1DFF 0588 07EB  0C90 578A 0498 50E8
3510  2C01 83C4 04F6 4506  2075 5346 FF4E FC83
3520  7EFC 0074 4983 7D02  0074 CF8B 4502 2B46
3530  FC1B C923 C103 46FC  8946 FA50 56FF 35E8
3540  C621 83C4 068B 46FA  0105 03F0 2946 FC29
3550  4502 EBCB FF76 FC56  8A45 0798 50E8 F419
3560  83C4 0689 46F8 3DFF  FF74 0329 46FC 8B46
3570  FE2B 46FC E934 FF90  5E5F 8BE5 5DC3 558B
3580  EC83 EC02 568B 7604  8BC6 2DD8 1CB1 03D3
3590  F88B C8D1 E003 C1D1  E005 781D 8946 FEF6
35A0  4406 8374 06F6 4406  4074 07B8 FFFF E988
35B0  0090 F644 0602 7406  804C 0620 EBED 804C
35C0  0601 8B5E FE80 27FB  F644 060C 7522 8BDE
35D0  81EB D81C B103 D3FB  8BC3 D1E3 03D8 D1E3
35E0  F687 781D 0175 0956  E8D7 0183 C402 EB05
35F0  8B44 0489 048B 5EFE  FF77 02FF 7404 8A44
3600  0798 50E8 7018 83C4  0689 4402 0BC0 7405
3610  3DFF FF75 1983 7C02  0074 05B0 20EB 0390
3620  B010 0844 06C7 4402  0000 E97E FF90 FF4C
3630  028B 1CFF 048A 072A  E45E 8BE5 5DC3 558B
3640  EC83 EC08 5756 8B76  068A 4407 9889 46FA
3650  8BC6 2DD8 1CB1 03D3  F88B C8D1 E003 C1D1
3660  E005 781D 8946 F8F6  4406 8374 06F6 4406
3670  4074 0B80 4C06 20B8  FFFF E910 0190 F644
3680  0601 75EF 804C 0602  8064 06EF 2BC0 8944
3690  028B F889 7EFC F644  060C 755F 8BDE 81EB
36A0  D81C B103 D3FB 8BC3  D1E3 03D8 D1E3 F687
36B0  781D 0175 4681 FEE0  1C74 0681 FEE8 1C75
36C0  33FF 76FA E801 1E83  C402 0BC0 752D FF06
36D0  D61C 81FE E01C 7506  B858 25EB 0490 B890
36E0  2A89 4404 8904 8B5E  F8C7 4702 0002 C607
36F0  01EB 0890 56E8 CA00  83C4 02F6 4406 0875
```

| | | | | | | | | |
|---|---|---|---|---|---|---|---|---|
| 3700 | 198B | DE81 | E3D8 | 1CB1 | 03D3 | FB8B | C3D1 | E303 |
| 3710 | D8D1 | E3F6 | 8778 | 1D01 | 7450 | 8B3C | 2B7C | 048B |
| 3720 | 4404 | 4089 | 048B | 5EF8 | 8B47 | 0248 | 8944 | 020B |
| 3730 | FF7E | 1357 | FF74 | 04FF | 76FA | E817 | 1883 | C406 |
| 3740 | 8946 | FCEB | 1A90 | 8B5E | FAF6 | 8790 | 1C20 | 740F |
| 3750 | B802 | 0050 | 2BC0 | 5050 | 53E8 | FC14 | 83C4 | 088B |
| 3760 | 5C04 | 8A46 | 0488 | 07EB | 1790 | BF01 | 008B | C750 |
| 3770 | 8D46 | 0450 | FF76 | FAE8 | DA17 | 83C4 | 0689 | 46FC |
| 3780 | 397E | FC74 | 03E9 | EBFE | 8A46 | 042A | E45E | 5F8B |
| 3790 | E55D | C390 | 558B | EC56 | 8B76 | 04F6 | 4406 | 8374 |
| 37A0 | 1DF6 | 4406 | 0874 | 17FF | 7404 | E8E1 | 1883 | C402 |
| 37B0 | 8064 | 06F7 | 2BC0 | 8904 | 8944 | 0489 | 4402 | 5E5D |
| 37C0 | C390 | 558B | EC83 | EC02 | 568B | 4604 | 2DD8 | 1CB1 |
| 37D0 | 03D3 | F88B | C8D1 | E003 | C1D1 | E005 | 781D | 8946 |
| 37E0 | FEB8 | 0002 | 50E8 | B818 | 83C4 | 028B | 5E04 | 8947 |
| 37F0 | 040B | C074 | 0F80 | 4F06 | 088B | 5EFE | C747 | 0200 |
| 3800 | 02EB | 1790 | 8B5E | 0480 | 4F06 | 048B | 46FE | 4089 |
| 3810 | 4704 | 8B5E | FEC7 | 4702 | 0100 | 8B5E | 048B | F38B |
| 3820 | 4404 | 8907 | C747 | 0200 | 005E | 8BE5 | 5DC3 | 558B |
| 3830 | EC83 | EC0A | 5756 | 8B76 | 088B | 5E06 | 8A07 | 983D |
| 3840 | 6100 | 7428 | 3D72 | 0074 | 0B3D | 7700 | 7414 | 2BC0 |
| 3850 | E9CD | 0090 | 2BFF | C646 | FC01 | B901 | 008A | 56FC |
| 3860 | EB1F | BF01 | 03C6 | 46FC | 02EB | EF90 | BF09 | 01EB |
| 3870 | F490 | F7C7 | 0200 | 753F | 81CF | 0200 | 83E7 | FEB2 |
| 3880 | 80FF | 4606 | 8B5E | 0680 | 3F00 | 7436 | 0BC9 | 7432 |
| 3890 | 8A07 | 983D | 2B00 | 74DA | 3D62 | 0074 | 133D | 7400 |
| 38A0 | 7515 | 8BC7 | A900 | C075 | 0E81 | CF00 | 40EB | D290 |
| 38B0 | 8BC7 | A900 | C074 | 052B | C9EB | C690 | 81CF | 0080 |
| 38C0 | EBBF | 8856 | FC89 | 4EFE | B8A4 | 0150 | 57FF | 7604 |
| 38D0 | E8FF | 1383 | C406 | 8946 | FA0B | C07D | 03E9 | 6EFF |
| 38E0 | 8A46 | FC88 | 4406 | FF06 | D61C | 8BC6 | 2DD8 | 1CB1 |
| 38F0 | 03D3 | F88B | C8D1 | E003 | C1D1 | E005 | 781D | 8946 |
| 3900 | F82A | C08B | 5EF8 | 8807 | 9889 | 4402 | C747 | 0400 |
| 3910 | 002B | C089 | 0489 | 4404 | 8A46 | FA88 | 4407 | 8BC6 |
| 3920 | 5E5F | 8BE5 | 5DC3 | 558B | EC83 | EC04 | 568B | 7604 |
| 3930 | FF06 | D61C | 81FE | E01C | 7508 | C746 | FE58 | 25EB |
| 3940 | 0C90 | 81FE | E81C | 7524 | C746 | FE90 | 2AF6 | 4406 |
| 3950 | 0C75 | 198B | DE81 | EBD8 | 1CB1 | 03D3 | FB8B | C3D1 |
| 3960 | E303 | D8D1 | E3F6 | 8778 | 1D01 | 7404 | 2BC0 | EB35 |
| 3970 | 8BC6 | 2DD8 | 1CB1 | 03D3 | F88B | C8D1 | E003 | C1D1 |
| 3980 | E005 | 781D | 8946 | FC8B | 46FE | 8944 | 0489 | 048B |
| 3990 | 5EFC | B800 | 0289 | 4702 | 8944 | 02C6 | 0701 | 804C |
| 39A0 | 0602 | B801 | 005E | 8BE5 | 5DC3 | 558B | EC83 | EC02 |
| 39B0 | 5683 | 7E04 | 0074 | 5B81 | 7E06 | E01C | 7407 | 817E |
| 39C0 | 06E8 | 1C75 | 768B | 5E06 | 8A47 | 0798 | 50E8 | F81A |
| 39D0 | 83C4 | 020B | C074 | 648B | 4606 | 2DD8 | 1CB1 | 03D3 |
| 39E0 | F88B | C8D1 | E003 | C1D1 | E005 | 781D | 8946 | FEFF |
| 39F0 | 7606 | E84B | 0083 | C402 | 8B5E | FEC6 | 0700 | C747 |
| 3A00 | 0200 | 008B | 5E06 | 8BF3 | 2BC0 | 8904 | 8947 | 04EB |
| 3A10 | 2A90 | 8B5E | 0681 | 7F04 | 5825 | 7407 | 817F | 0490 |
| 3A20 | 2A75 | 188A | 4707 | 9850 | E89D | 1A83 | C402 | 0BC0 |
| 3A30 | 7409 | FF76 | 06E8 | 0800 | 83C4 | 025E | 8BE5 | 5DC3 |
| 3A40 | 558B | EC83 | EC04 | 5756 | 8B76 | 042B | FF8A | 4406 |
| 3A50 | 2403 | 3C02 | 7546 | F644 | 0608 | 7519 | 8BDE | 81EB |
| 3A60 | D81C | B103 | D3FB | 8BC3 | D1E3 | 03D8 | D1E3 | F687 |

```
3A70    781D 0174 278B 042B    4404 8946 FC0B C07E
3A80    1B50 FF74 048A 4407    9850 E8C7 1483 C406
3A90    3B46 FC74 0780 4C06    20BF FFFF 8B44 0489
3AA0    04C7 4402 0000 8BC7    5E5F 8BE5 5DC3 558B
3AB0    ECB8 0401 E83B F557    568B 7606 C706 6C20
3AC0    0000 8B46 04A3 6220    8D86 FCFE A370 20C7
3AD0    0678 2000 00C7 067A    2000 008B 4608 A36E
3AE0    2080 3C00 7503 E946    038A 0498 8BD8 F687
3AF0    311E 0874 10E8 8207    468A 0498 8BD8 F687
3B00    311E 0875 F380 3C25    7403 E901 032B C0A3
3B10    7620 A372 20A3 6A20    A364 20A3 6620 A360
3B20    20A3 6820 A374 2088    46FC 4680 3C2A 7505
3B30    FF06 7620 468A 0498    8BD8 F687 311E 0474
3B40    378B 1674 208A 0498    8BCA D1E1 D1E1 03CA
3B50    D1E1 03C8 83E9 308B    D146 8A04 988B D8F6
3B60    8731 1E04 75DF 8916    7420 0BD2 7406 FF06
3B70    7220 EB04 FF06 6620    8A04 983D 4600 7466
3B80    3D4E 0074 593D 6800    740E 3D6C 0074 473D
3B90    7000 7452 EB08 9090    C706 6820 0100 833E
3BA0    6820 0074 0580 3C70    7505 803C 4C75 0146
3BB0    8A04 988B F8F6 8531    1E01 7432 83FF 4574
3BC0    1083 FF47 740B 83FF    5874 06C7 0668 2002
3BD0    0083 C720 EB68 C706    6820 0200 EBC0 C706
3BE0    6820 0800 EBB8 C706    6820 1000 EBB0 83FF
3BF0    5B75 4BFF 066A 2046    803C 5E75 04FE 46FC
3C00    46B8 0001 508A 46FC    9850 FF36 7020 E823
3C10    1B83 C406 8B0E 7020    EB10 803C 5D74 108A
3C20    0498 8BD8 03D9 8037    0146 803C 0075 EB80
3C30    3C00 7406 B873 00EB    0390 2BC0 8BF8 83FF
3C40    6974 03E9 9200 C706    F21D 0100 E82B 06FF
3C50    067A 208B 1E62 20FF    4F02 780C 8B07 FF07
3C60    8BD8 8A07 2AE4 EB0A    FF36 6220 E80F F983
3C70    C402 8BF8 83FF 3075    4DFF 0664 20FF 067A
3C80    208B 1E62 20FF 4F02    780C 8B07 FF07 8BD8
3C90    8A07 2AE4 EB0A FF36    6220 E8E1 F883 C402
3CA0    8BF8 83FF 7874 0583    FF58 7506 BF78 00EB
3CB0    2790 FF0E 7A20 FF36    6220 57E8 0E0F 83C4
3CC0    04BF 6F00 EB12 FF0E    7A20 FF36 6220 57E8
3CD0    FA0E 83C4 04BF 6400    0BFF 7503 E950 018B
3CE0    C72D 6300 3D15 0076    03E9 2701 03C0 932E
3CF0    FFA7 CE3B 833E 7220    0075 09B8 0100 A374
3D00    20A3 7220 2BC0 50E8    3401 83C4 02E9 EA00
3D10    B801 00EB F190 FF06    6020 B80A 0050 E80B
3D20    02EB E790 B808 00EB    F490 833E 6820 0274
3D30    0A83 3E68 2010 7403    E987 00B8 1000 50E8
3D40    EA01 83C4 0283 2E6E    2002 8B1E 6E20 8B1F
3D50    8B07 8B57 02A3 7C20    8916 7E20 FF06 7A20
3D60    8B1E 6220 FF4F 0278    0D8B 07FF 078B D88A
3D70    072A E4EB 0B90 FF36    6220 E801 F883 C402
3D80    8BF8 83FF 3A75 25FF    0678 20B8 1000 50E8
3D90    9A01 83C4 0283 2E6E    2002 8B1E 6E20 8B1F
3DA0    8B16 7C20 2BC0 0957    02EB 1090 FF0E 7A20
3DB0    FF36 6220 57E8 140E    83C4 0483 066E 2002
3DC0    EB38 B810 00E9 55FF    E8F3 02EB 2D90 F43A
3DD0    1A3B C83B C83B C83B    133C 133C 133C 133C
```

```
3DE0    133C 133C 163B 243B    2A3B 133C 133C 103B
3DF0    133C 1A3B 133C 133C    C23B 833E 6C20 0074
3E00    3383 3E78 2000 7527    B8FF FFEB 2B90 803C
3E10    0074 1C8A 0498 50E8    0604 83C4 028B F80B
3E20    FF74 1183 FF01 7407    833E 7820 0074 D9A1
3E30    7820 EB04 46E9 A9FC    5E5F 8BE5 5DC3 558B
3E40    EC83 EC06 5756 8B1E    6E20 8B37 8976 FA83
3E50    3E76 2000 7505 8306    6E20 0283 3E66 2000
3E60    7403 E9C0 0083 7E04    0074 2C83 3E6A 2000
3E70    7525 E805 04EB 2090    8A85 311E 2408 8BC8
3E80    80F9 011B C0F7 D80B    C074 3183 3E76 2000
3E90    7505 8BC7 8804 46E8    1204 0BC0 741E E8B7
3EA0    038B F840 7416 837E    0400 74DF 833E 6A20
3EB0    0074 C58B 1E70 208A    0198 EBCB 83FF FF75
3EC0    07FF 066C 20EB 4590    837E 0400 743E 833E
3ED0    7220 0074 2883 3E74    2000 7521 833E 6A20
3EE0    0074 0D8B 1E70 2080    3901 1BC0 F7D8 EB09
3EF0    8A85 311E 2AE4 2508    000B C074 0FFF 0E7A
3F00    20FF 3662 2057 E8C3    0C83 C404 833E 7620
3F10    0075 1283 7E04 0074    03C6 0400 3976 FA74
3F20    04FF 0678 205E 5F8B    E55D C390 558B EC83
3F30    EC08 5756 8B76 042B    C089 46FE 9989 46FA
3F40    8956 FC39 0660 2074    03E9 0E01 3906 6620
3F50    740C 3906 7620 7403    E95C 01E9 5401 833E
3F60    F21D 0075 03E8 1203    E8ED 028B F883 FF2D
3F70    7408 83FF 2B74 03E9    9E00 83FF 2D75 03FF
3F80    46FE FF0E 7420 E98A    0090 B830 002B F8EB
3F90    7590 83FE 0875 4583    FF38 7D0C B003 508D
3FA0    46FA 50E8 6E18 EB5B    83FF FF74 0FFF 0E7A
3FB0    20FF 3662 2057 E813    0C83 C404 837E FE00
3FC0    7503 E9A0 008B 46FA    8B56 FCF7 D883 D200
3FD0    F7DA 8946 FA89 56FC    E98A 0090 F685 311E
3FE0    0474 C58B 46FA 8B56    FCB1 02D1 E0D1 D2FE
3FF0    C975 F803 46FA 1356    FCD1 E0D1 D289 46FA
4000    8956 FC83 EF30 8BC7    9901 46FA 1156 FCFF
4010    0664 20E8 4202 8BF8    E891 020B C074 8983
4020    FFFF 7484 F685 311E    8075 03E9 7AFF 83FE
4030    1074 03E9 5CFF B004    508D 46FA 50E8 D417
4040    F685 311E 0174 0383    C720 F685 311E 0275
4050    03E9 36FF B857 00E9    33FF A17A 2089 46FA
4060    C746 FC00 0083 3E76    2000 754B 833E 6420
4070    0075 0783 3E60 2000    7438 833E 6820 0274
4080    0783 3E68 2010 7514    8B1E 6E20 8B1F 8B46
4090    FA8B 56FC 8907 8957    02EB 0C90 8B1E 6E20
40A0    8B1F 8B46 FA89 0783    3E60 2000 7504 FF06
40B0    7820 8306 6E20 025E    5F8B E55D C390 558B
40C0    EC83 EC4A 5756 C746    FC00 0083 3E66 2000
40D0    740E 833E 7620 0074    03E9 1A01 E912 0190
40E0    E897 018D 46BA 8BF8    8D45 4089 46B6 E867
40F0    018B F083 FE2B 7405    83FE 2D75 2383 FE2D
4100    7505 8BC6 8805 47FF    0E74 20EB 0E90 397E
4110    B676 18FF 46FC 8BC6    8805 47E8 3A01 8BF0
4120    56E8 D800 83C4 020B    C075 E383 FE2E 752E
4130    E879 010B C074 2439    7EB6 761F EB08 397E
4140    B676 18FF 46FC 8BC6    8805 47E8 0A01 8BF0
```

```
4150   56E8 A800 83C4 020B   C075 E383 7EFC 0074
4160   5783 FE65 7405 83FE   4575 4DE8 3E01 0BC0
4170   7446 397E B676 418B   C688 0547 E8D9 008B
4180   F083 FE2D 7405 83FE   2B75 22E8 1E01 0BC0
4190   741B 83FE 2D75 1139   7EB6 760C EB05 397E
41A0   B676 158B C688 0547   E8AD 008B F056 E84B
41B0   0083 C402 0BC0 75E6   FF0E 7A20 FF36 6220
41C0   56E8 080A 83C4 0483   3E76 2000 7528 837E
41D0   FC00 741D C605 008D   46BA 50FF 366E 20A1
41E0   6820 2502 0050 FF16   241E 83C4 06FF 0678
41F0   2083 066E 2002 5E5F   8BE5 5DC3 558B EC83
4200   7E04 FF74 178B 5E04   F687 311E 0474 0DE8
4210   9A00 0BC0 7406 B801   00EB 0390 2BC0 5DC3
4220   558B EC83 EC02 56E8   2E00 8BF0 3B76 0475
4230   052B C0EB 1D90 83FE   FF75 05B8 FFFF EB12
4240   FF0E 7A20 FF36 6220   56E8 8009 83C4 04B8
4250   0100 5E8B E55D C390   56FF 067A 208B 1E62
4260   20FF 4F02 780A 8B37   FF07 8A04 2AE4 EB07
4270   53E8 0AF3 83C4 025E   C390 558B EC83 EC02
4280   56E8 D4FF 8BF0 F684   311E 0875 F483 FEFF
4290   7506 FF06 6C20 EB0F   FF0E 7A20 FF36 6220
42A0   56E8 2809 83C4 045E   8BE5 5DC3 833E 7220
42B0   0075 05B8 0100 EB10   833E 7420 007E 07FF
42C0   0E74 20EB EE90 2BC0   C390 558B ECB8 6401
42D0   E81F ED57 568B 7606   8D86 9EFE A39E 208B
42E0   4608 A38E 208B 4604   A382 20C7 0698 2000
42F0   00C7 0696 2000 00E9   7C02 803C 2574 03E9
4300   5802 C706 9A20 0100   2BC0 A38A 20A3 8620
4310   A394 20A3 8820 A392   20A3 9020 A384 20A3
4320   8020 A38C 20C7 06A4   2020 0080 7C01 3075
4330   3C46 C706 A420 3000   EB33 803C 2B75 0DFF
4340   068A 20C7 0690 2000   00EB 2290 803C 2075
4350   0D83 3E8A 2000 7515   FF06 9020 EB0F FF06
4360   8020 EB09 803C 2D75   D1FF 068C 2046 8A04
4370   9850 E8F5 0783 C402   0BC0 75E8 56B8 A020
4380   50E8 6607 83C4 048B   F083 3EA0 2000 7D0C
4390   FF06 8C20 A1A0 20F7   D8A3 A020 803C 2E75
43A0   23FF 0692 2046 56B8   9A20 50E8 3C07 83C4
43B0   048B F083 3E9A 2000   7D0A C706 9A20 0100
43C0   FF0E 9220 8A04 983D   4600 7432 3D4E 0074
43D0   353D 6800 7420 3D6C   0075 06C7 0688 2002
43E0   0083 3E88 2000 7505   803C 4C75 0146 803C
43F0   0075 1BE9 8801 C706   8820 0100 EBE3 C706
4400   8820 1000 EBDB C706   8820 0800 EBD3 8A04
4410   9889 869C FE3D 4500   740A 3D47 0074 053D
4420   5800 7509 FF06 8620   8386 9CFE 208B 869C
4430   FE2D 6300 3D15 0076   03E9 1401 03C0 932E
4440   FFA7 9443 8B1E 8E20   8B1F A196 2089 0783
4450   068E 2002 E969 0190   FF06 9420 C706 8020
4460   0000 B80A 0050 E87F   0183 C402 E951 0190
4470   B808 00EB F090 FF06   8420 FF06 8620 833E
4480   9220 0075 09C7 069C   2001 00EB 0790 C706
4490   9C20 0000 FF06 9220   C706 9A20 0400 833E
44A0   8820 0875 03E9 8800   2BC0 A388 2089 46FC
44B0   3906 A020 7427 A1A0   2089 46FC 833E 8C20
```

```
44C0   0074 09C7 06A0 2000   00EB 1290 832E A020
44D0   05A1 A020 0BC0 7D02   2BC0 A3A0 2083 068E
44E0   2002 B810 0050 E8FF   0083 C402 B83A 0050
44F0   E8CF 0383 C402 837E   FC00 7422 833E 8C20
4500   0074 158B 46FC 2D05   00A3 A020 0BC0 7D02
4510   2BC0 A3A0 20EB 0790   C706 A020 0000 832E
4520   8E20 04B8 1000 50E8   BE00 83C4 02E9 1FFF
4530   B810 00E9 2FFF 2BC0   50E8 E201 E92A FF90
4540   B801 00EB F390 FFB6   9CFE E8B9 02E9 19FF
4550   833E 8820 0074 038B   C64E 8BFE 4780 3D00
4560   7405 803D 2575 F58B   C72B C650 1E56 E8ED
4570   0383 C406 8BF7 803C   0074 03E9 7CFD 833E
4580   9620 0075 598B 1E82   20F6 4706 2074 4FB8
4590   FFFF EB4D 4043 5C42   4643 4643 4643 5043
45A0   5C42 5043 5043 5043   5043 4442 7042 7642
45B0   5043 5043 3643 5043   5842 5043 5043 3043
45C0   833E 9820 0074 1383   3E96 2000 7510 8B1E
45D0   8220 F647 0620 75B7   EB04 46EB 9990 A196
45E0   205E 5F8B E55D C390   558B EC83 EC18 5756
45F0   837E 040A 7404 FF06   9420 833E 8820 0274
4600   0783 3E88 2010 7516   8B1E 8E20 8B07 8B57
4610   0289 46FC 8956 FE83   068E 2004 EB2A 833E
4620   9420 0074 118B 1E8E   208B 0789 46FC C746
4630   FE00 00EB 0E90 8B1E   8E20 8B07 9989 46FC
4640   8956 FE83 068E 2002   833E 8020 0074 0D8B
4650   46FC 0B46 FE74 058B   4604 EB02 2BC0 A3A2
4660   208B 369E 2083 3E94   2000 752A 837E FE00
4670   7D24 837E 040A 7517   C604 2D46 8B46 FC8B
4680   56FE F7D8 83D2 00F7   DA89 46FC 8956 FEC7
4690   46F8 0100 EB05 C746   F800 008D 46E8 8BF8
46A0   FF76 0457 FF76 FEFF   76FC E8F9 0D83 C408
46B0   833E 9220 0074 2157   E8C3 0C83 C402 8B0E
46C0   9A20 2BC8 894E F4EB   0590 C604 3046 8BC1
46D0   490B C07F F589 4EF4   8B0E 8620 8A05 8804
46E0   0BC9 7407 3C61 7C03   802C 2046 4780 7DFF
46F0   0075 E983 3E94 2000   7514 A18A 200B 0690
4700   2074 0B83 7EF8 0075   05B8 0100 EB02 2BC0
4710   50E8 B202 83C4 025E   5F8B E55D C390 558B
4720   EC83 EC10 5756 837E   0400 7414 BE01 00A1
4730   8E20 8946 F88C 5EFA   8306 8E20 02E9 9100
4740   833E 8820 1075 178B   1E8E 208B 078B 5702
4750   8946 F889 56FA 8306   8E20 04EB 1590 8B1E
4760   8E20 8B07 8946 FC89   46F8 8C5E FA83 068E
4770   2002 833E 8820 1075   0D8B 46F8 0B46 FA75
4780   14B8 F41D E309 837E   FC00 7509 B8FB 1D89
4790   46F8 8C5E FA8B 46F8   8B56 FA89 46F2 8956
47A0   F42B F639 3692 2074   1C8B 0E9A 20EB 0E90
47B0   C45E F2FF 46F2 2680   3F00 7415 463B CE7E
47C0   10EB ED90 46C4 5EF2   FF46 F226 803F 0075
47D0   F38B 3EA0 202B FE83   3E8C 2000 7507 57E8
47E0   1E01 83C4 0256 FF76   FAFF 76F8 E86F 0183
47F0   C406 833E 8C20 0074   0757 E803 0183 C402
4800   5E5F 8BE5 5DC3 558B   EC83 EC04 A18E 2089
4810   46FE 837E 0467 7406   837E 0447 7504 B001
4820   EB02 2AC0 8846 FC83   3E92 2000 7506 C706
```

```
4830   9A20 0600 807E FC00   740D 833E 9A20 0075
4840   06C7 069A 2001 00FF   3686 20FF 369A 20FF
4850   7604 FF36 9E20 FF76   FEFF 1620 1E83 C40A
4860   807E FC00 7412 833E   8020 0075 0BFF 369E
4870   20FF 1622 1E83 C402   833E 8020 0074 1283
4880   3E9A 2000 750B FF36   9E20 FF16 261E 83C4
4890   0283 068E 2008 C706   A220 0000 A18A 200B
48A0   0690 2074 13FF 76FE   FF16 281E 83C4 020B
48B0   C074 05B8 0100 EB02   2BC0 50E8 0801 8BE5
48C0   5DC3 558B EC56 833E   9820 0075 2F8B 1E82
48D0   20FF 4F02 780E 8A46   048B 37FF 0788 042A
48E0   E4EB 0B90 53FF 7604   E853 ED83 C404 4075
48F0   07FF 0698 20EB 0590   FF06 9620 5E5D C390
4900   558B EC83 EC02 5756   833E 9820 0075 498B
4910   7604 0BF6 7E42 EB15   FF36 8220 FF36 A420
4920   E81B ED83 C404 4075   04FF 0698 208B C64E
4930   0BC0 7E16 8B1E 8220   FF4F 0278 DBA0 A420
4940   8B3F FF07 8805 2AE4   EBDC 833E 9820 0075
4950   078B 4604 0106 9620   5E5F 8BE5 5DC3 558B
4960   EC83 EC02 5756 8B76   0883 3E98 2000 7550
4970   EB1C FF36 8220 C45E   0426 8A07 9850 E8BD
4980   EC83 C404 4075 04FF   0698 20FF 4604 8BC6
4990   4E0B C074 1D8B 1E82   20FF 4F02 78D4 C45E
49A0   0426 8A07 8B1E 8220   8B3F FF07 8805 2AE4
49B0   EBD2 833E 9820 0075   078B 4608 0106 9620
49C0   5E5F 8BE5 5DC3 558B   EC83 EC0A 5756 8B36
49D0   9E20 2BC0 8946 FC89   46FA 833E A420 3075
49E0   1839 0692 2074 1239   0684 2074 0639 069C
49F0   2075 06C7 06A4 2020   008B 3EA0 2056 E87D
4A00   0983 C402 8946 F82B   F82B 7E04 833E 8C20
4A10   0075 1880 3C2D 7513   833E A420 3075 0CAC
4A20   9850 E89D FE83 C402   FF4E F883 3EA4 2030
4A30   740B 0BFF 7E07 833E   8C20 0074 1983 7E04
4A40   0074 06FF 46FA E85F   0083 3EA2 2000 7406
4A50   FF46 FCE8 6A00 833E   8C20 0075 2657 E89F
4A60   FE83 C402 837E 0400   7409 837E FA00 7503
4A70   E835 0083 3EA2 2000   7409 837E FC00 7503
4A80   E83D 00FF 76F8 1E56   E8D3 FE83 C406 833E
4A90   8C20 0074 0DC7 06A4   2020 0057 E861 FE83
4AA0   C402 5E5F 8BE5 5DC3   833E 8A20 0074 05B8
4AB0   2B00 EB03 B820 0050   E807 FE83 C402 C390
4AC0   B830 0050 E8FB FD83   C402 833E A220 1075
4AD0   1783 3E86 2000 7406   B858 00EB 0490 B878
4AE0   0050 E8DD FD83 C402   C390 558B EC83 EC04
4AF0   5756 8B76 06C7 46FE   0100 803C 2A75 0F8B
4B00   1E8E 208B 3F83 068E   2002 46EB 4890 803C
4B10   2D75 06C7 46FE FFFF   462B FF80 3C30 7C35
4B20   803C 397F 3039 3E92   2075 0B80 3C30 7506
4B30   C706 A420 3000 8A04   988B CFD1 E1D1 E103
4B40   CFD1 E103 C883 E930   8BF9 4680 3C30 7C05
4B50   803C 397E E18B 46FE   F7EF 8BF8 8B5E 0489
4B60   3F8B C65E 5F8B E55D   C390 558B EC83 EC02
4B70   56BE 021E 8A4E 04EB   0290 4680 3C00 740A
4B80   3A0C 75F6 B801 00EB   0390 2BC0 5E8B E55D
4B90   C390 558B EC83 EC02   56BE D81C 8B0E F01D
```

```
4BA0    F644 0683 7516 2BC0    8944 0288 4406 8944
4BB0    0489 04C6 4407 FF8B    C6EB 0C90 8BC6 83C6
4BC0    083B C175 DB2B C05E    8BE5 5DC3 558B EC57
4BD0    568B 7604 8B7E 06F6    4506 0174 0583 FEFF
4BE0    7506 B8FF FFEB 4D90    837D 0400 7507 57E8
4BF0    D0EB 83C4 028B 0539    4504 7508 837D 0200
4C00    75E0 FF05 FF45 02FF    0D8B 1D8B C688 0780
4C10    6506 EFF6 4506 4075    178B DF81 EBD8 1CB1
4C20    03D3 FB8B C3D1 E303    D8D1 E380 8F78 1D04
4C30    8BC6 2AE4 5E5F 5DC3    558B EC8B 5E04 3B1E
4C40    8E1C 7206 B800 09F9    EB0B B43E CD21 7205
4C50    C687 901C 00E9 64E6    558B EC83 EC04 8B5E
4C60    043B 1E8E 1C72 05B8    0009 EB2A F746 0800
4C70    8074 4883 7E0A 0074    1A33 C98B D1B8 0142
4C80    CD21 724B F746 0A02    0075 0E03 4606 1356
4C90    0879 28B8 0016 F9EB    3689 56FE 8946 FC8B
4CA0    D1B8 0242 CD21 0346    0613 5608 790D 8B4E
4CB0    FE8B 56FC B800 42CD    21EB D88B 5606 8B4E
4CC0    088A 460A B442 CD21    7205 80A7 901C FDE9
4CD0    FDE5 558B EC83 EC04    32FF 887E FE8B 4606
4CE0    8BC8 C646 FC00 A900    8075 10A9 0040 7507
4CF0    F606 091E 8075 04C6    46FC 808B 5604 2403
4D00    0AC7 B43D CD21 7312    3D02 0075 09F7 C100
4D10    0174 03E9 A100 F9E9    B5E5 938B C125 0005
4D20    3D00 0575 09B4 3ECD    21B8 0011 EBE8 C646
4D30    FD01 B800 44CD 21F6    C280 7404 804E FC40
4D40    F646 FC40 7403 E9D5    008B 4606 A900 0274
4D50    1DA9 0300 7409 33C9    B440 CD21 E9BF 00B4
4D60    3ECD 218B 5604 B800    43CD 21EB 6790 F646
4D70    FC80 7503 E9A7 00A9    0200 7503 E99F 00B9
4D80    FFFF 8BD1 B802 42CD    21F7 D98D 56FF B43F
4D90    CD21 0BC0 7415 807E    FF1A 750F F7D9 8BD1
4DA0    B802 42CD 2133 C9B4    40CD 2133 C98B D1B8
4DB0    0042 CD21 EB68 90C6    46FD 008B 4E08 E8A4
4DC0    0089 4E08 F646 FEFF    7507 F746 0602 0075
4DD0    0380 E1FE 8356 04B4    3CCD 2173 03E9 EFE4
4DE0    93F6 46FE FF75 07F7    4606 0200 7530 B43E
4DF0    CD21 8A46 0624 030A    46FE 8B56 04B4 3DCD
4E00    2172 DA93 F646 FD01    7514 F746 0801 0074
4E10    0D80 C901 8356 04B8    0143 CD21 72BF F646
4E20    FC40 753D 8356 04B8    0043 CD21 8BC1 32C9
4E30    2501 0074 02B1 10F7    4606 0800 7403 80C9
4E40    203B 1E8E 1C72 0AB4    3ECD 21B8 0018 E9C5
4E50    FE0A 4EFC 80C9 0188    8F90 1C8B C38B E55D
4E60    C332 C9EB DCA1 831C    F7D0 23C1 33C9 A880
4E70    7503 80C9 01C3 558B    EC83 EC02 8B5E 043B
4E80    1E8E 1C72 06F9 B800    09EB 5C33 C08B 4E08
4E90    E355 F687 901C 0275    4E8B 4E08 8B56 06B4
4EA0    3FCD 2173 C4B4 09EB    3EF6 8790 1C80 7437
4EB0    80A7 901C FB56 57FC    8BF2 8BFA 8BC8 E325
4EC0    B40D 803C 0A75 0580    8F90 1C04 AC3A C474
4ED0    193C 1A75 0780 8F90    1C02 EB05 8805 47E2
4EE0    EB8B C72B C25F 5EE9    E5E3 83F9 0174 0780
4EF0    3C0A 74EB E5E6 F687    901C 4074 18B8 0044
4F00    CD21 F7C2 2000 7509    8D56 FFB4 3FCD 2172
```

```
4F10   D4B0 0AEB 2CC6 46FF   008D 56FF B43F CD21
4F20   72C3 0BC0 7419 837E   0801 741F B9FF FF8B
4F30   D1B8 0142 CD21 B901   0080 7EFF 0A74 07B0
4F40   0D8B 5606 EB96 8B56   06EB 9480 7EFF 0A75
4F50   DBEB BE00 558B EC83   EC08 8B5E 043B 1E8E
4F60   1C72 07B8 0009 F9E9   65E3 F687 901C 2074
4F70   0BB8 0242 33C9 8BD1   CD21 72EB F687 901C
4F80   8074 6E8B 5606 1E07   33C0 8946 FE89 46FC
4F90   FC57 568B FA8B F289   66F8 8B4E 08E3 54B0
4FA0   0AF2 AE75 4AE8 D400   3DA8 0076 4883 EC02
4FB0   8BDC BA00 023D 2802   7303 BA80 002B E28B
4FC0   D48B FA16 078B 4E08   AC3C 0A74 0C3B FB74
4FD0   19AA E2F4 E823 00EB   61B0 0D3B FB75 03E8
4FE0   1800 AAB0 0AFF 46FC   EBE3 E80D 00EB E25E
4FF0   5FEB 55EB 4533 C0E9   53DE 5053 518B CF2B
5000   CAE3 108B 5E04 B440   CD21 720D 0146 FE0B
5010   C074 0659 5B58 8BFA   C383 C408 7304 B409
5020   EB1E F687 901C 4074   0B8B 5E06 803F 1A75
5030   03F8 EB0C F9B8 001C   EB06 8B46 FE2B 46FC
5040   8B66 F85E 5FE9 87E2   8B4E 080B C975 058B
5050   C1E9 7BE2 8B56 06B4   40CD 2173 04B4 09EB
5060   E40B C075 E0F6 8790   1C40 740A 8BDA 803F
5070   1A75 03F8 EBCF F9B8   001C EBC9 59A1 BA1C
5080   3BC4 7306 2BC4 F7D8   FFE1 33C0 EBFA 558B
5090   EC8B 5E04 0BDB 7404   804F FE01 8BE5 5DC3
50A0   558B EC56 57BB 0A1E   833F 0075 291E 07B8
50B0   0500 E873 0175 0533   C099 EB24 4024 FEA3
50C0   0A1E A30C 1E96 C704   0100 83C6 04C7 44FE
50D0   FEFF 8936 101E 8B4E   048C D88E C0E8 0900
50E0   5F5E 8BE5 5DC3 E9CE   0041 74FA 80E1 FE83
50F0   F9EE 73F2 8B77 02FC   AD8B FEA8 0174 4248
5100   3BC1 7315 8BD0 03F0   ADA8 0174 3403 C205
5110   0200 8BF7 8944 FEEB   E68B FE74 0C03 F989
5120   4CFE 2BC1 4889 05EB   0503 F9FE 4CFE 8BC6
5130   8CDA 8CD1 3BD1 7405   268C 1E18 1E89 7F02
5140   C326 C606 1E1E 023D   FEFF 7425 8BFE 03F0
5150   ADA8 0174 F28B FE48   3BC1 73BD 8BD0 03F0
5160   ADA8 0174 E203 C205   0200 8BF7 8944 FEEB
5170   E68B 4708 0BC0 7404   8ED8 EB14 26FE 0E1E
5180   1E74 118C D88C D73B   C774 0526 8E1E 141E
5190   8B37 EBBC 8B77 0633   C0E8 6A00 3BC6 740D
51A0   2401 4040 98E8 5E00   740D FE4D FEE8 1C00
51B0   7405 964E 4EEB 998C   D88C D13B C174 0426
51C0   A318 1E8B 0789 4702   33C0 99C3 518B 45FE
51D0   A801 7403 2BC8 4941   41BA FF7F 263B 161A
51E0   1E76 04D1 EA75 F58B   C103 C672 1503 C272
51F0   0DF7 D223 C22B C6E8   0C00 7508 F7D2 D1EA
5200   75E5 33C0 59C3 5251   E81D 0074 1857 8BFE
5210   8BF0 03F2 C744 FEFE   FF89 7706 8BD6 2BD7
5220   4A89 55FE 5859 5AC3   5350 33D2 1E52 5250
5230   B801 0050 061F E80F   0083 C408 83FA FF1F
5240   5A5B 7402 0BD2 C300   558B EC56 5706 837E
5250   0800 7538 BF16 1C8B   5606 8B46 0448 7507
5260   E853 0072 27EB 488B   3666 1C48 7411 3BF7
5270   740D 8B44 C289 460C   56E8 3A00 5E73 3083
```

```
5280   C604 81FE 661C 7304   0BD2 7506 B8FF FF99
5290   EB1D 8BDA 83C3 0FD1   DBB1 03D3 EBB4 48CD
52A0   2172 E992 8904 8954   0289 3666 1C33 C007
52B0   5F5E 8BE5 5DC3 8B4E   0C8B F739 4C02 740C
52C0   83C6 0481 FE66 1C75   F2F9 EB3F 8BDA 031C
52D0   7239 8BD3 8EC1 3BF7   7506 391E 101C 7326
52E0   83C3 0FD1 DBD1 EBD1   EBD1 EB3B F775 0903
52F0   D9A1 871C 2BD8 8EC0   B44A CD21 720D 3BF7
5300   7504 8916 101C 9287   048B D1C3 558B EC8B
5310   D78B DE8C D88E C08B   7E04 33C0 B9FF FFF2
5320   AE8D 75FF 8B7E 06B9   FFFF F2AE F7D1 2BF9
5330   87FE 8B46 04F7 C601   0074 02A4 49D1 E9F3
5340   A513 C9F3 A48B F38B   FA5D C300 558B EC8B
5350   D78B DE8B 7606 8BFE   8CD8 8EC0 33C0 B9FF
5360   FFF2 AEF7 D18B 7E04   8BC7 A801 7402 A449
5370   D1E9 F3A5 13C9 F3A4   8BF3 8BFA 5DC3 558B
5380   EC8B D78C D88E C08B   7E04 33C0 B9FF FFF2
5390   AEF7 D149 918B FA5D   C300 558B EC57 561E
53A0   078B 7E04 8BD7 33C0   B9FF FFF2 AE4F 8BF7
53B0   8B7E 068B DF8B 4E08   F2AE 7501 412B 4E08
53C0   F7D9 8BFE 8BF3 F3A4   AA8B C25E 5F5D C300
53D0   558B EC57 561E 078B   7E04 8B76 068B DF8B
53E0   4E08 E30C AC0A C074   03AA E2F8 32C0 F3AA
53F0   8BC3 5E5F 8BE5 5DC3   558B EC57 561E 078B
5400   4E08 E326 8BD9 8B7E   048B F733 C0F2 AEF7
5410   D903 CB8B FE8B 7606   F3A6 8A44 FF33 C93A
5420   45FF 7704 7404 4949   F7D1 8BC1 5E5F 8BE5
5430   5DC3 E901 0000 558B   EC57 568B 7604 33C0
5440   9933 DBAC 3C20 74FB   3C09 74F7 503C 2D74
5450   043C 2B75 01AC 3C39   771F 2C30 721B D1E3
5460   D1D2 8BCB 8BFA D1E3   D1D2 D1E3 D1D2 03D9
5470   13D7 03D8 83D2 00EB   DC58 3C2D 9375 07F7
5480   D883 D200 F7DA 5E5F   5DC3 558B EC56 57B3
5490   018B 4E08 8B46 0433   D283 F90A 7501 998B
54A0   7E06 E9C9 0200 558B   EC56 57B3 00E9 B202
54B0   558B EC8B 5E04 F687   311E 0274 078B C32D
54C0   2000 EB02 8BC3 5DC3   558B EC8B 5E04 3B1E
54D0   8E1C 7D11 83FB 007C   0CF6 8790 1C40 7405
54E0   B801 00EB 0233 C08B   E55D C300 B601 EB02
54F0   B608 A132 1F0A E475   08C7 0632 1FFF FFEB
5500   0592 CD21 B400 C300   558B EC56 5783 EC0A
5510   C646 F6CD 8B46 0488   46F7 3C25 740A 3C26
5520   7406 C646 F8CB EB0C   C646 FACB C646 F944
5530   C646 F844 8C56 F48D   46F6 8946 F28B 7E06
5540   8B05 8B5D 028B 4D04   8B55 068B 7508 8B7D
5550   0A55 FF5E F25D FC57   8B7E 0889 0589 5D02
5560   894D 0489 5506 8975   088F 450A 7204 33F6
5570   EB08 E867 DDBE 0100   8B05 8975 0C83 C40A
5580   5F5E 8BE5 5DC3 558B   EC83 EC04 5756 8B76
5590   088B 7E04 837E 0600   7F28 2BC0 EB38 56E8
55A0   DCDF 83C4 0289 46FC   4075 0D39 7E04 74EA
55B0   C605 008B 4604 EB1E   8A46 FC88 0547 3C0A
55C0   74EE FF4E 0674 E9FF   4C02 78D2 8B1C FF04
55D0   8A07 2AE4 EBCF 5E5F   8BE5 5DC3 558B EC83
55E0   EC06 5756 FF76 04E8   94FD 83C4 028B F8FF
```

```
55F0   7606 E831 E383 C402   8BF0 FF76 0657 B801
5600   0050 FF76 04E8 3ADE   83C4 0889 46FA FF76
5610   0656 E895 E383 C404   397E FA75 052B C0EB
5620   0490 B8FF FF5E 5F8B   E55D C390 558B EC83
5630   EC0E 5756 8D46 F48B   F88D 4608 8946 FEC6
5640   4506 428B 4604 8945   0489 05C7 4502 FF7F
5650   8D46 0850 FF76 0657   E86F EC83 C406 8BF0
5660   FF4D 0278 0B2A C08B   1DFF 0588 07EB 0B90
5670   572B C050 E8C7 DF83   C404 8BC6 5E5F 8BE5
5680   5DC3 558B EC83 EC0C   5756 8B76 048D 46F4
5690   8BF8 8D46 0889 46FE   C645 0649 8975 0489
56A0   3556 E8D9 FC83 C402   8945 028D 4608 50FF
56B0   7606 57E8 F8E3 83C4   065E 5F8B E55D C390
56C0   558B EC56 571E 8E5E   048B 7606 8E46 088B
56D0   7E0A 8B4E 0CF3 A41F   5F5E 8BE5 5DC3 558B
56E0   EC57 8B7E 041E 078B   DF33 C0B9 FFFF F2AE
56F0   41F7 D98A 4606 8BFB   F2AE 4F38 0574 0233
5700   FF8B C75F 8BE5 5DC3   558B EC8B D78B DE8C
5710   D88E C08B 7606 8B7E   048B C78B 4E08 E30E
5720   A801 7402 A449 D1E9   F3A5 13C9 F3A4 8BF3
5730   8BFA 5DC3 558B EC8B   D78C D88E C08B 7E04
5740   8BDF 8B4E 08E3 158A   4606 8AE0 F7C7 0100
5750   7402 AA49 D1E9 F3AB   13C9 F3AA 8BFA 935D
5760   C300 8B4E 0A8B 4604   8B56 068B 7E08 571E
5770   07FC 930A C074 1383   F90A 750E 0BD2 790A
5780   B02D AAF7 DB83 D200   F7DA 8BF7 9233 D20B
5790   C074 02F7 F193 F7F1   9287 D304 303C 3976
57A0   0204 27AA 8BC2 0BC3   75E2 8805 4FAC 8605
57B0   8844 FF8D 4401 3BC7   72F2 585F 5E8B E55D
57C0   C300 558B EC8B 5604   B441 CD21 E9ED DA00
57D0   558B EC8A 6604 CD16   7508 807E 0401 7502
57E0   33C0 5DC3 558B EC8A   6604 8A46 088B 5606
57F0   CD17 8AC4 B400 5DC3   558B EC8A 6604 8A46
5800   088B 5606 CD14 5DC3   32ED E306 D1E0 D1D2
5810   E2FA C300 558B EC8B   5E04 8B07 8B57 028B
5820   4E06 E8E3 FF8B 5E04   8907 8957 028B E55D
5830   C204 0000 0000 0000   0000 0000 0000 0000
5840   0000 0000 0000 0000   0000 0000 0000 0000
5850   0000 0000 0000 0000   0000 0000 0000 0000
5860   0000 0000 0000 0000   0000 0000 0000 0000
5870   0000 0000 0000 0000   0000 0000 0000 0000
5880   0000 0000 0000 0000   0000 0000 0000 0000
5890   0000 0000 0000 0000   0000 0000 0000 0000
58A0   0000 0000 0000 0000   0000 0000 0000 0000
58B0   0000 0000 0000 0000   0000 0000 0000 0000
58C0   0000 0000 0000 0000   0000 0000 0000 0000
58D0   0000 0000 0000 0000   0000 0000 0000 0000
58E0   0000 0000 0000 0000   0000 0000 0000 0000
58F0   0000 0000 0000 0000   0000 0000 0000 0000
5900   0000 0000 0000 0000   0000 0000 0000 0000
5910   0000 0000 0000 0000   0000 0000 0000 0000
5920   0000 0000 0000 0000   0000 0000 0000 0000
5930   0000 0000 0000 0000   0000 0000 0000 0000
5940   0000 0000 0000 0000   0000 0000 0000 0000
5950   0000 0000 0000 0000   0000 0000 0000 0000
```

```
5960   0000 0000 0000 0000   0000 0000 0000 0000
5970   0000 0000 0000 0000   0000 0000 0000 0000
5980   0000 0000 0000 0000   0000 0000 0000 0000
5990   0000 0000 0000 0000   0000 0000 0000 0000
59A0   0000 0000 0000 0000   0000 0000 0000 0000
59B0   0000 0000 0000 0000   0000 0000 0000 0000
59C0   0000 0000 0000 0000   0000 0000 0000 0000
59D0   0000 0000 0000 0000   0000 0000 0000 0000
59E0   0000 0000 0000 0000   0000 0000 0000 0000
59F0   0000 0000 0000 0000   0000 0000 0000 0000
5A00   0000 0000 0000 0000   0000 0000 0000 0000
5A10   0000 0000 0000 0000   0000 0000 0000 0000
5A20   0000 0000 0000 0000   0000 0000 0000 0000
5A30   0000 0000 0000 0000   0000 0000 0000 0000
5A40   0000 0000 0000 0000   0000 0000 0000 0000
5A50   0000 0000 0000 0000   0000 0000 0000 0000
5A60   0000 0000 0000 0000   0000 0000 0000 0000
5A70   0000 0000 0000 0000   0000 0000 0000 0000
5A80   0000 0000 0000 0000   0000 0000 0000 0000
5A90   0000 0000 0000 0000   0000 0000 0000 0000
5AA0   0000 0000 0000 0000   0000 0000 0000 0000
5AB0   0000 0000 0000 0000   0000 0000 0000 0000
5AC0   0000 0000 0000 0000   0000 0000 0000 0000
5AD0   0000 0000 0000 0000   0000 0000 0000 0000
5AE0   0000 0000 0000 0000   0000 0000 0000 0000
5AF0   0000 0000 0000 0000   0000 0000 0000 0000
5B00   0000 0000 0000 0000   0000 0000 0000 0000
5B10   0000 0000 0000 0000   0000 0000 0000 0000
5B20   0000 0000 0000 0000   0000 0000 0000 0000
5B30   0000 0000 0000 0000   0000 0000 0000 0000
5B40   0000 0000 0000 0000   0000 0000 0000 0000
5B50   0000 0000 0000 0000   0000 0000 0000 0000
5B60   0000 0000 0000 0000   0000 0000 0000 0000
5B70   0000 0000 0000 0000   0000 0000 0000 0000
5B80   0000 0000 0000 0000   0000 0000 0000 0000
5B90   0000 0000 0000 0000   0000 0000 0000 0000
5BA0   0000 0000 0000 0000   0000 0000 0000 0000
5BB0   0000 0000 0000 0000   0000 0000 0000 0000
5BC0   0000 0000 0000 0000   0000 0000 0000 0000
5BD0   0000 0000 0000 0000   0000 0000 0000 0000
5BE0   0000 0000 0000 0000   0000 0000 0000 0000
5BF0   0000 0000 0000 0000   0000 0000 0000 0000
5C00   0000 0000 0000 0000   0000 0000 0000 0000
5C10   0000 0000 0000 0000   0000 0000 0000 0000
5C20   0000 0000 0000 0000   0000 0000 0000 0000
5C30   0000 0000 0000 0000   0000 0000 0000 00EF
5C40   F710 0800 0091 048D   0459 044F 04FB 5053
5C50   5256 5755 1E06 8CC8   8ED8 8B2E 0D04 8D56
5C60   02EC 988B D8FF 9715   048D 5602 ECA8 0174
5C70   F107 1F5D 5F3E 5A5B   FAB0 20E6 2058 CF8D
5C80   5605 EC24 1EA2 0C04   C38D 5600 EC8B 3606
5C90   008B 3E04 002B F777   0481 C600 0283 FE01
5CA0   741A 81C7 0C00 8CCE   8EC6 FCAA 81EF 0C00
5CB0   81FF 0002 7202 33FF   893E 0400 C3E8 0A00
5CC0   C3C3 8D56 05EC A820   7425 8B36 0A00 3B36
```

| | | | | | | | |
|---|---|---|---|---|---|---|---|
| 5CD0 | 0800 | 741B | 81C6 | 0C02 | FC2E | AC81 | EE0C | 0281 |
| 5CE0 | FE00 | 0272 | 0233 | F689 | 360A | 008D | 5600 | EEC3 |
| 5CF0 | 558B | EC1E | 8CCA | 8EDA | B840 | 008E | C033 | C08B |
| 5D00 | 5E06 | 03DB | 2639 | 8700 | 0075 | 02EB | 5326 | 8B87 |
| 5D10 | 0000 | A30D | 04D1 | EBB8 | 0C25 | 2BC3 | BA1D | 04CD |
| 5D20 | 21FA | A106 | 0CA3 | 0400 | A10A | 00A3 | 0800 | 558B |
| 5D30 | 2E0D | 048D | 5601 | ECA2 | 1304 | B007 | EE8D | 5604 |
| 5D40 | ECA2 | 1404 | B008 | EE8D | 5602 | EC8D | 5605 | ECE4 |
| 5D50 | 2122 | 870F | 04E6 | 218D | 5600 | ECFB | 5DB8 | 0100 |
| 5D60 | 1F5D | CB55 | 8BEC | 8B5E | 06E4 | 212E | 0A87 | 1104 |
| 5D70 | E621 | 2E8B | 2E0D | 048D | 5601 | 2EA0 | 1304 | EE8D |
| 5D80 | 5604 | 2EA0 | 1404 | EE5D | CB55 | 8BEC | 1E56 | 57C5 |
| 5D90 | 7606 | 8B4E | 0A2E | 8B3E | 0800 | 2EA1 | 0A00 | 2BC7 |
| 5DA0 | 7703 | 0500 | 0248 | 74ED | C746 | 0A00 | 003B | C876 |
| 5DB0 | 058B | C889 | 460A | 8CC8 | 8EC0 | BA0C | 02FC | 8BC7 |
| 5DC0 | 03C1 | BB00 | 023B | C376 | 0F8B | C32B | C791 | 2BC1 |
| 5DD0 | 03FA | F3A4 | 8BC8 | 33FF | 03FA | F3A4 | 2BFA | 3BFB |
| 5DE0 | 7C02 | 2BFB | 8CC8 | 8ED8 | 893E | 0800 | 558B | 2E0D |
| 5DF0 | 04FA | E8CD | FEFB | 5D8B | 4E0A | 83F9 | 0075 | 965F |
| 5E00 | 5E1F | 5DCB | 558B | EC1E | 5657 | C57E | 062E | 8B36 |
| 5E10 | 0600 | 8BC6 | 2E2B | 0604 | 0074 | 1FFC | 81C6 | 0C00 |
| 5E20 | 2EAC | 8805 | 81EE | 0C00 | 81FE | 0002 | 7204 | 81EE |
| 5E30 | 0002 | 2E89 | 3606 | 00B8 | 0100 | 5F5E | 1F5D | CB00 |
| 5E40 | 0000 | 0000 | 0000 | 0000 | 4D53 | 2052 | 756E | 2D54 |
| 5E50 | 696D | 6520 | 4C69 | 6272 | 6172 | 7920 | 2D20 | 436F |
| 5E60 | 7079 | 7269 | 6768 | 7420 | 2863 | 2920 | 3139 | 3838 |
| 5E70 | 2C20 | 4D69 | 6372 | 6F73 | 6F66 | 7420 | 436F | 7270 |
| 5E80 | 1100 | 4368 | 616E | 6E65 | 6C20 | 2300 | 5363 | 7261 |
| 5E90 | 6D62 | 6C69 | 6E67 | 0023 | 2050 | 6163 | 6B65 | 7473 |
| 5EA0 | 0050 | 6F6C | 6C69 | 6E67 | 204D | 6F64 | 6500 | 5345 |
| 5EB0 | 4544 | 0045 | 6469 | 7420 | 5061 | 636B | 6574 | 2028 |
| 5EC0 | 312D | 3829 | 0020 | 4E44 | 4320 | 5365 | 6375 | 7269 |
| 5ED0 | 7479 | 2043 | 6F6D | 7075 | 7465 | 7220 | 2863 | 2920 |
| 5EE0 | 3139 | 3838 | 2000 | 2043 | 6F6E | 7472 | 6F6C | 2050 |
| 5EF0 | 6163 | 6B65 | 7420 | 7061 | 7261 | 6D65 | 7465 | 7273 |
| 5F00 | 2000 | 2046 | 726F | 6D20 | 0020 | 546F | 2065 | 6E63 |
| 5F10 | 6F64 | 6572 | 2000 | 2048 | 656C | 7020 | 5363 | 7265 |
| 5F20 | 656E | 2000 | 2564 | 0049 | 6C6C | 6567 | 616C | 2043 |
| 5F30 | 4F4D | 2070 | 6172 | 616D | 2028 | 313D | 434F | 4D31 |
| 5F40 | 2C32 | 3D43 | 4F4D | 3229 | 3A20 | 2573 | 0003 | 0000 |
| 5F50 | C000 | 0305 | 4200 | 1400 | 0000 | 0100 | 3030 | 0000 |
| 5F60 | 0000 | 0000 | 0000 | 0000 | 0000 | 0000 | 0000 | 0000 |
| 5F70 | 0000 | 0000 | 0000 | 0000 | 0000 | 0000 | 0000 | 0000 |
| 5F80 | 0000 | 0000 | 0000 | 0000 | 0000 | 0000 | 0000 | 0000 |
| 5F90 | 0000 | 0000 | 0000 | 0000 | 0000 | 0000 | 0000 | 0000 |
| 5FA0 | 0000 | 0000 | 0000 | 0000 | 0000 | 0000 | 0000 | 0000 |
| 5FB0 | 0000 | 0000 | 0000 | 0000 | 0000 | 0000 | 0000 | 0000 |
| 5FC0 | 0405 | 4C00 | 1400 | 0000 | 0300 | 303A | 2043 | 6C65 |
| 5FD0 | 6172 | 0000 | 0000 | 0000 | 0000 | 0000 | 0000 | 0000 |
| 5FE0 | 0000 | 0031 | 3A20 | 6672 | 6565 | 0000 | 0000 | 0000 |
| 5FF0 | 0000 | 0000 | 0000 | 0000 | 0000 | 0000 | 323A | 2063 |
| 6000 | 6F6E | 7472 | 6F6C | 6C65 | 6400 | 0000 | 0000 | 0000 |
| 6010 | 0000 | 0000 | 0000 | 0000 | 0000 | 0000 | 0000 | 0000 |
| 6020 | 0000 | 0000 | 0000 | 0000 | 0000 | 0000 | 0000 | 0505 |
| 6030 | 5700 | 1400 | 0000 | 0100 | 3000 | 0000 | 0000 | 0000 |

| | | | | | | | | |
|---|---|---|---|---|---|---|---|---|
| 6040 | 0000 | 0000 | 0000 | 0000 | 0000 | 0000 | 0000 | 0000 |
| 6050 | 0000 | 0000 | 0000 | 0000 | 0000 | 0000 | 0000 | 0000 |
| 6060 | 0000 | 0000 | 0000 | 0000 | 0000 | 0000 | 0000 | 0000 |
| 6070 | 0000 | 0000 | 0000 | 0000 | 0000 | 0000 | 0000 | 0000 |
| 6080 | 0000 | 0000 | 0000 | 0000 | 0000 | 0000 | 0000 | 0000 |
| 6090 | 0000 | 0000 | 0000 | 0000 | 0000 | 0000 | 0605 | 6100 |
| 60A0 | 1400 | 0000 | 0300 | 313A | 2032 | 2E35 | 3600 | 0000 |
| 60B0 | 0000 | 0000 | 0000 | 0000 | 0000 | 0000 | 0000 | 0032 |
| 60C0 | 3A20 | 352E | 3132 | 0000 | 0000 | 0000 | 0000 | 0000 |
| 60D0 | 0000 | 0000 | 0000 | 0000 | 333A | 2031 | 302E | 3234 |
| 60E0 | 0000 | 0000 | 0000 | 0000 | 0000 | 0000 | 0000 | 0000 |
| 60F0 | 0000 | 0000 | 0000 | 0000 | 0000 | 0000 | 0000 | 0000 |
| 6100 | 0000 | 0000 | 0000 | 0000 | 0000 | 0705 | 6E00 | 1400 |
| 6110 | 0000 | 0200 | 4341 | 5244 | 0000 | 0000 | 0000 | 0000 |
| 6120 | 0000 | 0000 | 0000 | 0000 | 0000 | 0000 | 0056 | 6572 |
| 6130 | 6966 | 7900 | 0000 | 0000 | 0000 | 0000 | 0000 | 0000 |
| 6140 | 0000 | 0000 | 0000 | 0000 | 0000 | 0000 | 0000 | 0000 |
| 6150 | 0000 | 0000 | 0000 | 0000 | 0000 | 0000 | 0000 | 0000 |
| 6160 | 0000 | 0000 | 0000 | 0000 | 0000 | 0000 | 0000 | 0000 |
| 6170 | 0000 | 0000 | 0000 | 0000 | 0805 | 7300 | 1900 | 0000 |
| 6180 | 0100 | 3100 | 0000 | 0000 | 0000 | 0000 | 0000 | 0000 |
| 6190 | 0000 | 0000 | 0000 | 0000 | 0000 | 0000 | 0000 | 0000 |
| 61A0 | 0000 | 0000 | 0000 | 0000 | 0000 | 0000 | 0000 | 0000 |
| 61B0 | 0000 | 0000 | 0000 | 0000 | 0000 | 0000 | 0000 | 0000 |
| 61C0 | 0000 | 0000 | 0000 | 0000 | 0000 | 0000 | 0000 | 0000 |
| 61D0 | 0000 | 0000 | 0000 | 0000 | 0000 | 0000 | 0000 | 0000 |
| 61E0 | 0000 | 0000 | 0000 | 0000 | 1950 | 0144 | 8500 | 0203 |
| 61F0 | 094A | 0153 | A600 | 0A03 | 0C0A | 0153 | C200 | 0A0D |
| 6200 | 0C40 | 0153 | C900 | 0003 | 194A | 0153 | D600 | 0600 |
| 6210 | 0100 | 0000 | 0000 | 0000 | 0000 | 0000 | 7465 | 7374 |
| 6220 | 2E31 | 0000 | 0000 | 0000 | 0000 | 0000 | 0000 | 0000 |
| 6230 | 0000 | 0000 | 0000 | 0000 | 0000 | 0000 | 0000 | 0000 |
| 6240 | 0000 | 0000 | 0000 | 0000 | 0000 | 0000 | 0000 | 0000 |
| 6250 | 0000 | 0000 | 0000 | 0000 | 0000 | 0000 | 0000 | 0000 |
| 6260 | 0000 | 0000 | 0000 | 0000 | 0000 | 0000 | 0000 | 7465 |
| 6270 | 7374 | 2E31 | 0000 | 0000 | 0000 | 0000 | 0000 | 0000 |
| 6280 | 0000 | 0000 | 0000 | 0000 | 0000 | 0000 | 0000 | 0000 |
| 6290 | 0000 | 0000 | 0000 | 0000 | 0000 | 0000 | 0000 | 0000 |
| 62A0 | 0000 | 0000 | 0000 | 0000 | 0000 | 0000 | 0000 | 0000 |
| 62B0 | 0000 | 0000 | 0000 | 0000 | 0000 | 0000 | 0000 | 4F2E |
| 62C0 | 4B2E | 2074 | 6F20 | 5175 | 6974 | 3F00 | 7200 | 4669 |
| 62D0 | 6C65 | 206E | 6F74 | 2066 | 6F75 | 6E64 | 0052 | 6570 |
| 62E0 | 6C61 | 7920 | 6672 | 6F6D | 2000 | 2020 | 2020 | 2020 |
| 62F0 | 2020 | 2020 | 2020 | 0020 | 2020 | 2020 | 2020 | 2020 |
| 6300 | 2020 | 2000 | 2020 | 2020 | 2020 | 2020 | 2020 | 2020 |
| 6310 | 2020 | 2020 | 2020 | 2020 | 2020 | 2020 | 2000 | 7700 |
| 6320 | 6100 | 2020 | 2021 | 2000 | 5570 | 6461 | 7465 | 2070 |
| 6330 | 6163 | 6B65 | 7473 | 3F00 | 2020 | 456E | 7465 | 7220 |
| 6340 | 6E65 | 7720 | 7661 | 6C75 | 6520 | 3A20 | 2020 | 0025 |
| 6350 | 6400 | 2525 | 3025 | 6464 | 0000 | 2020 | 2020 | 2020 |
| 6360 | 2020 | 2020 | 2020 | 2020 | 2020 | 2020 | 2020 | 2020 |
| 6370 | 2020 | 2020 | 2020 | 2020 | 2020 | 2020 | 2020 | 2020 |
| 6380 | 2020 | 2020 | 2020 | 2020 | 2020 | 2020 | 2020 | 2020 |
| 6390 | 2020 | 2020 | 2020 | 2020 | 2020 | 2020 | 2020 | 2020 |
| 63A0 | 2020 | 2020 | 0000 | 0000 | 0000 | 2530 | 3278 | 2000 |

```
63B0   2049 6C6C 6567 616C    206E 756D 6265 7220
63C0   6F66 2070 6163 6B65    7473 2028 302D 3829
63D0   2121 2000 2049 6C6C    6567 616C 2063 6861
63E0   6E6E 656C 206E 756D    6265 7220 2830 2D31
63F0   3529 2121 2000 B1FD    912C 6DB8 B6BE 1508
6400   0DE2 83B1 E80B 36B0    47EA A110 A78E AA2E
6410   94C8 4741 FE87 7EEC    6745 AB89 84A5 EFCD
6420   2301 6745 2D46 ABA9    EFCD 2493 0267 1B4F
6430   8195 A701 0001 299F    C985 19B9 5353 9252
6440   905A 442D CAD4 908D    3AAD FB2B 009D E40C
6450   B881 28BF E90B 857C    AD90 41E7 7ABA 9DEF
6460   7E83 820D 0ACE 6477    831E 1D80 26F5 48A4
6470   396E C301 0001 0D2D    C925 514A A385 8BDC
6480   C725 400C B861 0CF9    C121 BD3D 576D 6C71
6490   2FA4 CC93 4037 DE32    3965 C18D 636A 49B6
64A0   E1D0 735E DE9C 12A7    C334 5E38 8C73 054E
64B0   6341 0A01 0001 E520    5BD5 56D1 9BA9 A554
64C0   B783 16DE 360B D603    581B E00D 3672 AD6B
64D0   69DA D999 16BC CB24    F665 B445 A6BB ED53
64E0   3EB0 F7B8 F5EA A6B7    AF64 EDA2 E7FE C257
64F0   C4D1 0B01 0001 592B    7122 CFB7 334F 2530
6500   3264 0025 6400 7200    2564 0025 3173 0020
6510   2020 2020 2020 2020    2020 2020 2020 2020
6520   2020 2020 2020 2020    0025 7800 2530 3278
6530   0000 4672 6F6D 2065    6E63 6F64 6572 0025
6540   3032 7820 0054 6F20    656E 636F 6465 7200
6550   2530 3278 0000 003C    4573 633E 2051 7569
6560   7420 3C18 193E 2073    656C 6563 7420 6F70
6570   7469 6F6E 203C 1B1A    3E20 6368 616E 6765
6580   206F 7074 696F 6E20    2020 203C 4631 3E20
6590   4865 6C70 203C 4632    3E20 5072 7420 5B4F
65A0   6E5D 2F4F 6666 003C    4573 633E 2051 7569
65B0   7420 3C18 193E 2073    656C 6563 7420 6F70
65C0   7469 6F6E 203C 1B1A    3E20 6368 616E 6765
65D0   206F 7074 696F 6E20    2020 203C 4631 3E20
65E0   4865 6C70 203C 4632    3E20 5072 7420 4F6E
65F0   2F5B 4F66 665D 003C    4634 3E20 5B53 656C
6600   6563 745D 2F53 746F    7020 3C46 353E 2043
6610   6B73 6D20 3C46 363E    2052 6570 6C61 7920
6620   3C46 373E 2053 746F    7020 5265 706C 6179
6630   203C 4638 3E20 5361    7665 2066 696C 6520
6640   3C46 393E 2053 6176    6520 3C46 3130 3E20
6650   5365 7400 3C46 343E    2053 656C 6563 742F
6660   5B53 746F 705D 203C    4635 3E20 436B 736D
6670   203C 4636 3E20 5265    706C 6179 203C 4637
6680   3E20 5374 6F70 2052    6570 6C61 7920 3C46
6690   383E 2053 6176 6520    6669 6C65 203C 4639
66A0   3E20 5361 7665 203C    4631 303E 2053 6574
66B0   0020 00AF 0000 2020    2020 2020 2020 2020
66C0   2020 2020 2020 2020    2020 2020 2020 2020
66D0   2020 2020 2020 2020    2020 2020 2020 2020
66E0   2020 2020 2020 2020    2020 2020 2020 2020
66F0   2020 2020 2020 2020    2020 2020 0000 0000
6700   0000 0000 0000 0007    0F0F 7070 7070 0F70
6710   0700 0006 0B0C 1F71    1717 1339 1FDA 00BF
```

```
6720  00C0 00D9 00B3 00C4  00C9 00BB 00C8 00BC
6730  00BA 00CD 0000 DD08  DF08 E108 E308 E508
6740  E708 E908 EB08 ED08  EF08 F108 F308 5479
6750  7065 3A20 0020 456E  7465 7220 5061 636B
6760  6574 2054 7970 653A  2000 2045 6E74 6572
6770  2041 7265 6120 6669  656C 6420 7061 7261
6780  6D73 3A20 0020 5665  7220 2020 5061 636B
6790  6574 2000 2042 6C61  636B 2050 6163 6B65
67A0  7420 0020 4475 6D62  2020 5061 636B 6574
67B0  2000 2053 6D61 7274  2050 6163 6B65 7420
67C0  0020 5665 7220 5061  636B 6574 2000 5368
67D0  6F77 2063 6172 6420  4964 2020 0046 5320
67E0  4D6F 6420 4E75 6D20  2020 2000 5265 6164
67F0  2046 5320 4E75 6D20  2020 0053 656E 6420
6800  4653 2051 7565 7279  2000 5265 6164 2046
6810  5320 5265 7375 6C74  0046 5320 5261 6E64
6820  2051 7565 7279 2000  5261 6E64 6F6D 2028
6830  6865 7829 2020 0050  7269 6F72 6974 7920
6840  2830 2D37 2900 4C65  6E67 7468 2020 2830
6850  2D32 3429 004D 6573  7361 6765 2020 2020
6860  2020 2000 436F 6D70  2054 7970 6500 4944
6870  2023 3120 2868 6578  2920 0049 4420 2332
6880  2028 6865 7829 2000  4944 2023 3320 2868
6890  6578 2920 0049 4420  2334 2028 6865 7829
68A0  2000 4944 2023 3520  2868 6578 2920 0049
68B0  4420 2336 2028 6865  7829 2000 4669 656C
68C0  6420 636F 756E 7420  6D61 736B 2028 302D
68D0  3130 2900 4672 6565  2056 6965 7720 4D61
68E0  736B 2000 466F 7263  6520 5061 7920 0041
68F0  7265 6120 4D61 736B  2028 6865 7829 2000
6900  4669 656C 6420 6E75  6D62 6572 2830 2D39
6910  2900 7070 7620 7072  6F67 206E 756F 2028
6920  6465 6329 0070 7076  2070 726F 6720 7261
6930  7465 2028 6465 6329  0070 7076 206D 696E
6940  2072 6174 6520 2864  6563 2900 4172 6561
6950  204C 656E 2028 312D  3136 2900 4172 6561
6960  2054 7970 6500 4172  6561 2043 6F6D 7020
6970  2000 4172 6561 204D  7367 2028 302D 3329
6980  0028 2364 6179 7320  6672 6F6D 2031 2F31
6990  2F38 3729 0053 4545  4420 2868 6578 2920
69A0  2020 2020 2020 2020  0045 6E74 6572 2070
69B0  6172 616D 7320 666F  7220 7061 636B 6574
69C0  2025 6400 3C45 7363  3E20 5175 6974 203C
69D0  1819 3E20 7365 6C65  6374 206F 7074 696F
69E0  6E20 3C1B 1A3E 2063  6861 6E67 6520 6F70
69F0  7469 6F6E 2020 2020  3C46 3130 3E20 4578
6A00  6974 2B53 6176 6500  0000 0305 0E09 1400
6A10  0000 0400 303A 2056  4552 2000 0000 0000
6A20  0000 0000 0000 0000  0000 0000 0031 3A20
6A30  424C 4143 4B20 0000  0000 0000 0000 0000
6A40  0000 0000 0000 323A  2044 554D 4220 0000
6A50  0000 0000 0000 0000  0000 0000 0000 0033
6A60  3A20 534D 4152 5420  0000 0000 0000 0000
6A70  0000 0000 0000 0000  0100 0450 0153 1509
6A80  0500 0F50 0153 2A09  0400 1250 0153 4509
```

```
6A90   0500 0F50 0153 5409   0500 0F50 0153 6309
6AA0   0500 0F50 0153 7209   0500 0F50 0153 8109
6AB0   0703 8E09 1400 0000   0200 5965 7300 0000
6AC0   0000 0000 0000 0000   0000 0000 0000 0000
6AD0   0000 004E 6F00 0000   0000 0000 0000 0000
6AE0   0000 0000 0000 0000   0000 0000 0000 0000
6AF0   0000 0000 0000 0000   0000 0000 0000 0000
6B00   0000 0000 0000 0000   0000 0000 0000 0000
6B10   0000 0000 0000 0000   0000 0000 0000 0803
6B20   9D09 1400 0000 0100   3000 0000 0000 0000
6B30   0000 0000 0000 0000   0000 0000 0000 0000
6B40   0000 0000 0000 0000   0000 0000 0000 0000
6B50   0000 0000 0000 0000   0000 0000 0000 0000
6B60   0000 0000 0000 0000   0000 0000 0000 0000
6B70   0000 0000 0000 0000   0000 0000 0000 0000
6B80   0000 0000 0000 0000   0000 0000 0903 AC09
6B90   1400 0000 0200 5965   7300 0000 0000 0000
6BA0   0000 0000 0000 0000   0000 0000 0000 004E
6BB0   6F00 0000 0000 0000   0000 0000 0000 0000
6BC0   0000 0000 0000 0000   0000 0000 0000 0000
6BD0   0000 0000 0000 0000   0000 0000 0000 0000
6BE0   0000 0000 0000 0000   0000 0000 0000 0000
6BF0   0000 0000 0000 0000   0000 0A03 BB09 1400
6C00   0000 0200 5965 7300   0000 0000 0000 0000
6C10   0000 0000 0000 0000   0000 0000 004E 6F00
6C20   0000 0000 0000 0000   0000 0000 0000 0000
6C30   0000 0000 0000 0000   0000 0000 0000 0000
6C40   0000 0000 0000 0000   0000 0000 0000 0000
6C50   0000 0000 0000 0000   0000 0000 0000 0000
6C60   0000 0000 0000 0000   0B03 CA09 1400 0000
6C70   0200 5965 7300 0000   0000 0000 0000 0000
6C80   0000 0000 0000 0000   0000 004E 6F00 0000
6C90   0000 0000 0000 0000   0000 0000 0000 0000
6CA0   0000 0000 0000 0000   0000 0000 0000 0000
6CB0   0000 0000 0000 0000   0000 0000 0000 0000
6CC0   0000 0000 0000 0000   0000 0000 0000 0000
6CD0   0000 0000 0000 0C03   D909 1400 0000 0200
6CE0   3100 0000 0000 0000   0000 0000 0000 0000
6CF0   0000 0000 0000 0000   0030 0000 0000 0000
6D00   0000 0000 0000 0000   0000 0000 0000 0000
6D10   0000 0000 0000 0000   0000 0000 0000 0000
6D20   0000 0000 0000 0000   0000 0000 0000 0000
6D30   0000 0000 0000 0000   0000 0000 0000 0000
6D40   0000 0000 0D03 E809   1400 0000 0000 3030
6D50   3030 0000 0000 0000   0000 0000 0000 0000
6D60   0000 0000 0000 0000   0000 0000 0000 0000
6D70   0000 0000 0000 0000   0000 0000 0000 0000
6D80   0000 0000 0000 0000   0000 0000 0000 0000
6D90   0000 0000 0000 0000   0000 0000 0000 0000
6DA0   0000 0000 0000 0000   0000 0000 0000 0000
6DB0   0000 0E03 F709 1400   0000 0100 3000 0000
6DC0   0000 0000 0000 0000   0000 0000 0000 0000
6DD0   0000 0000 0000 0000   0000 0000 0000 0000
6DE0   0000 0000 0000 0000   0000 0000 0000 0000
6DF0   0000 0000 0000 0000   0000 0000 0000 0000
```

| | | | | | | | | |
|---|---|---|---|---|---|---|---|---|
| 6E00 | 0000 | 0000 | 0000 | 0000 | 0000 | 0000 | 0000 | 0000 |
| 6E10 | 0000 | 0000 | 0000 | 0000 | 0000 | 0000 | 0000 | 0000 |
| 6E20 | 0F03 | 060A | 14C0 | 0000 | 0100 | 3030 | 0000 | 0000 |
| 6E30 | 0000 | 0000 | 0000 | 0000 | 0000 | 0000 | 0000 | 0000 |
| 6E40 | 0000 | 0000 | 0000 | 0000 | 0000 | 0000 | 0000 | 0000 |
| 6E50 | 0000 | 0000 | 0000 | 0000 | 0000 | 0000 | 0000 | 0000 |
| 6E60 | 0000 | 0000 | 0000 | 0000 | 0000 | 0000 | 0000 | 0000 |
| 6E70 | 0000 | 0000 | 0000 | 0000 | 0000 | 0000 | 0000 | 0000 |
| 6E80 | 0000 | 0000 | 0000 | 0000 | 0000 | 0000 | 0000 | 1003 |
| 6E90 | 150A | 1400 | 0000 | 0000 | 2020 | 2020 | 2020 | 2020 |
| 6EA0 | 2020 | 2020 | 2020 | 2020 | 2020 | 2020 | 2020 | 2020 |
| 6EB0 | 0000 | 0000 | 0000 | 0000 | 0000 | 0000 | 0000 | 0000 |
| 6EC0 | 0000 | 0000 | 0000 | 0000 | 0000 | 0000 | 0000 | 0000 |
| 6ED0 | 0000 | 0000 | 0000 | 0000 | 0000 | 0000 | 0000 | 0000 |
| 6EE0 | 0000 | 0000 | 0000 | 0000 | 0000 | 0000 | 0000 | 0000 |
| 6EF0 | 0000 | 0000 | 0000 | 0000 | 0000 | 0000 | 0000 | 0000 |
| 6F00 | 0000 | 0000 | 0000 | 0000 | 0000 | 0000 | 0000 | 0000 |
| 6F10 | 0000 | 0000 | 0000 | 0000 | 0000 | 0000 | 0000 | 0000 |
| 6F20 | 0000 | 0000 | 0000 | 0000 | 0000 | 0000 | 0000 | 0000 |
| 6F30 | 0000 | 0000 | 0000 | 0000 | 0000 | 0000 | 0000 | 0000 |
| 6F40 | 0000 | 0000 | 0000 | 0000 | 0000 | 0000 | 0000 | 0000 |
| 6F50 | 0000 | 0000 | 0000 | 0000 | 0000 | 0000 | 0000 | 0000 |
| 6F60 | 0000 | 0000 | 0000 | 0000 | 0000 | 0A00 | 0603 | 240A |
| 6F70 | 1400 | 0000 | 0200 | 4578 | 6163 | 7400 | 0000 | 0000 |
| 6F80 | 0000 | 0000 | 0000 | 0000 | 0000 | 0000 | 0000 | 0052 |
| 6F90 | 616E | 6765 | 0000 | 0000 | 0000 | 0000 | 0000 | 0000 |
| 6FA0 | 0000 | 0000 | 0000 | 0000 | 0000 | 0000 | 0000 | 0000 |
| 6FB0 | 0000 | 0000 | 0000 | 0000 | 0000 | 0000 | 0000 | 0000 |
| 6FC0 | 0000 | 0000 | 0000 | 0000 | 0000 | 0000 | 0000 | 0000 |
| 6FD0 | 0000 | 0000 | 0000 | 0000 | 0000 | 0803 | 2E0A | 1400 |
| 6FE0 | 0000 | 0000 | 3030 | 3030 | 3030 | 3030 | 3030 | 0000 |
| 6FF0 | 0000 | 0000 | 0000 | 0000 | 0000 | 0000 | 0000 | 0000 |
| 7000 | 0000 | 0000 | 0000 | 0000 | 0000 | 0000 | 0000 | 0000 |
| 7010 | 0000 | 0000 | 0000 | 0000 | 0000 | 0000 | 0000 | 0000 |
| 7020 | 0000 | 0000 | 0000 | 0000 | 0000 | 0000 | 0000 | 0000 |
| 7030 | 0000 | 0000 | 0000 | 0000 | 0000 | 0000 | 0000 | 0000 |
| 7040 | 0000 | 0000 | 0000 | 0000 | 0903 | 3B0A | 1400 | 0000 |
| 7050 | 0000 | 3030 | 3030 | 3030 | 3030 | 3030 | 0000 | 0000 |
| 7060 | 0000 | 0000 | 0000 | 0000 | 0000 | 0000 | 0000 | 0000 |
| 7070 | 0000 | 0000 | 0000 | 0000 | 0000 | 0000 | 0000 | 0000 |
| 7080 | 0000 | 0000 | 0000 | 0000 | 0000 | 0000 | 0000 | 0000 |
| 7090 | 0000 | 0000 | 0000 | 0000 | 0000 | 0000 | 0000 | 0000 |
| 70A0 | 0000 | 0000 | 0000 | 0000 | 0000 | 0000 | 0000 | 0000 |
| 70B0 | 0000 | 0000 | 0000 | 0A03 | 480A | 1400 | 0000 | 0000 |
| 70C0 | 3030 | 3030 | 3030 | 3030 | 3030 | 0000 | 0000 | 0000 |
| 70D0 | 0000 | 0000 | 0000 | 0000 | 0000 | 0000 | 0000 | 0000 |
| 70E0 | 0000 | 0000 | 0000 | 0000 | 0000 | 0000 | 0000 | 0000 |
| 70F0 | 0000 | 0000 | 0000 | 0000 | 0000 | 0000 | 0000 | 0000 |
| 7100 | 0000 | 0000 | 0000 | 0000 | 0000 | 0000 | 0000 | 0000 |
| 7110 | 0000 | 0000 | 0000 | 0000 | 0000 | 0000 | 0000 | 0000 |
| 7120 | 0000 | 0000 | 0B03 | 550A | 1400 | 0000 | 0000 | 3030 |
| 7130 | 3030 | 3030 | 3030 | 3030 | 0000 | 0000 | 0000 | 0000 |
| 7140 | 0000 | 0000 | 0000 | 0000 | 0000 | 0000 | 0000 | 0000 |
| 7150 | 0000 | 0000 | 0000 | 0000 | 0000 | 0000 | 0000 | 0000 |
| 7160 | 0000 | 0000 | 0000 | 0000 | 0000 | 0000 | 0000 | 0000 |

```
7170   0000 0000 0000 0000   0000 0000 0000 0000
7180   0000 0000 0000 0000   0000 0000 0000 0000
7190   0000 0C03 620A 1400   0000 0000 3030 3030
71A0   3030 3030 3030 0000   0000 0000 0000 0000
71B0   0000 0000 0000 0000   0000 0000 0000 0000
71C0   0000 0000 0000 0000   0000 0000 0000 0000
71D0   0000 0000 0000 0000   0000 0000 0000 0000
71E0   0000 0000 0000 0000   0000 0000 0000 0000
71F0   0000 0000 0000 0000   0000 0000 0000 0000
7200   0D03 6F0A 1400 0000   0000 3030 3030 3030
7210   3030 3030 0000 0000   0000 0000 0000 0000
7220   0000 0000 0000 0000   0000 0000 0000 0000
7230   0000 0000 0000 0000   0000 0000 0000 0000
7240   0000 0000 0000 0000   0000 0000 0000 0000
7250   0000 0000 0000 0000   0000 0000 0000 0000
7260   0000 0000 0000 0000   0000 0000 0000 0700
7270   0703 7C0A 1E00 0000   0100 3030 0000 0000
7280   0000 0000 0000 0000   0000 0000 0000 0000
7290   0000 0000 0000 0000   0000 0000 0000 0000
72A0   0000 0000 0000 0000   0000 0000 0000 0000
72B0   0000 0000 0000 0000   0000 0000 0000 0000
72C0   0000 0000 0000 0000   0000 0000 0000 0000
72D0   0000 0000 0000 0000   0000 0000 0000 0803
72E0   940A 1E00 0000 0200   5965 7300 0000 0000
72F0   0000 0000 0000 0000   0000 0000 0000 0000
7300   004E 6F00 0000 0000   0000 0000 0000 0000
7310   0000 0000 0000 0000   0000 0000 0000 0000
7320   0000 0000 0000 0000   0000 0000 0000 0000
7330   0000 0000 0000 0000   0000 0000 0000 0000
7340   0000 0000 0000 0000   0000 0000 0903 A40A
7350   1E00 0000 0200 5965   7300 0000 0000 0000
7360   0000 0000 0000 0000   0000 0000 0000 004E
7370   6F00 0000 0000 0000   0000 0000 0000 0000
7380   0000 0000 0000 0000   0000 0000 0000 0000
7390   0000 0000 0000 0000   0000 0000 0000 0000
73A0   0000 0000 0000 0000   0000 0000 0000 0000
73B0   0000 0000 0000 0000   0000 0A03 AF0A 1E00
73C0   0000 0000 3030 3030   3030 3030 3030 0000
73D0   0000 0000 0000 0000   0000 0000 0000 0000
73E0   0000 0000 0000 0000   0000 0000 0000 0000
73F0   0000 0000 0000 0000   0000 0000 0000 0000
7400   0000 0000 0000 0000   0000 0000 0000 0000
7410   0000 0000 0000 0000   0000 0000 0000 0000
7420   0000 0000 0000 0000   0B03 C00A 1E00 0000
7430   0100 3000 0000 0000   0000 0000 0000 0000
7440   0000 0000 0000 0000   0000 0000 0000 0000
7450   0000 0000 0000 0000   0000 0000 0000 0000
7460   0000 0000 0000 0000   0000 0000 0000 0000
7470   0000 0000 0000 0000   0000 0000 0000 0000
7480   0000 0000 0000 0000   0000 0000 0000 0000
7490   0000 0000 0000 0C03   D20A 1E00 0000 0100
74A0   3030 3030 3000 0000   0000 0000 0000 0000
74B0   0000 0000 0000 0000   0000 0000 0000 0000
74C0   0000 0000 0000 0000   0000 0000 0000 0000
74D0   0000 0000 0000 0000   0000 0000 0000 0000
```

```
74E0   0000 0000 0000 0000   0000 0000 0000 0000
74F0   0000 0000 0000 0000   0000 0000 0000 0000
7500   0000 0000 0D03 E50A   1E00 0000 0100 3030
7510   3000 0000 0000 0000   0000 0000 0000 0000
7520   0000 0000 0000 0000   0000 0000 0000 0000
7530   0000 0000 0000 0000   0000 0000 0000 0000
7540   0000 0000 0000 0000   0000 0000 0000 0000
7550   0000 0000 0000 0000   0000 0000 0000 0000
7560   0000 0000 0000 0000   0000 0000 0000 0000
7570   0000 0E03 F90A 1E00   0000 0100 3030 3000
7580   0000 0000 0000 0000   0000 0000 0000 0000
7590   0000 0000 0000 0000   0000 0000 0000 0000
75A0   0000 0000 0000 0000   0000 0000 0000 0000
75B0   0000 0000 0000 0000   0000 0000 0000 0000
75C0   0000 0000 0000 0000   0000 0000 0000 0000
75D0   0000 0000 0000 0000   0000 0000 0000 0000
75E0   0800 0703 0C0B 1700   0000 0100 3030 0000
75F0   0000 0000 0000 0000   0000 0000 0000 0000
7600   0000 0000 0000 0000   0000 0000 0000 0000
7610   0000 0000 0000 0000   0000 0000 0000 0000
7620   0000 0000 0000 0000   0000 0000 0000 0000
7630   0000 0000 0000 0000   0000 0000 0000 0000
7640   0000 0000 0000 0000   0000 0000 0000 0000
7650   0803 1C0B 1700 0000   0200 4269 7400 0000
7660   0000 0000 0000 0000   0000 0000 0000 0000
7670   0000 004E 756D 6572   6963 0000 0000 0000
7680   0000 0000 0000 0000   0000 0000 0000 0000
7690   0000 0000 0000 0000   0000 0000 0000 0000
76A0   0000 0000 0000 0000   0000 0000 0000 0000
76B0   0000 0000 0000 0000   0000 0000 0000 0903
76C0   260B 1700 0000 0200   4745 0000 0000 0000
76D0   0000 0000 0000 0000   0000 0000 0000 0000
76E0   004C 4500 0000 0000   0000 0000 0000 0000
76F0   0000 0000 0000 0000   0000 0000 0000 0000
7700   0000 0000 0000 0000   0000 0000 0000 0000
7710   0000 0000 0000 0000   0000 0000 0000 0000
7720   0000 0000 0000 0000   0000 0000 0A03 320B
7730   1700 0000 0100 3000   0000 0000 0000 0000
7740   0000 0000 0000 0000   0000 0000 0000 0000
7750   0000 0000 0000 0000   0000 0000 0000 0000
7760   0000 0000 0000 0000   0000 0000 0000 0000
7770   0000 0000 0000 0000   0000 0000 0000 0000
7780   0000 0000 0000 0000   0000 0000 0000 0000
7790   0000 0000 0000 0000   0000 0400 0603 410B
77A0   1900 0000 0100 3030   3030 0000 0000 0000
77B0   0000 0000 0000 0000   0000 0000 0000 0000
77C0   0000 0000 0000 0000   0000 0000 0000 0000
77D0   0000 0000 0000 0000   0000 0000 0000 0000
77E0   0000 0000 0000 0000   0000 0000 0000 0000
77F0   0000 0000 0000 0000   0000 0000 0000 0000
7800   0000 0000 0000 0000   0000 0703 550B 1900
7810   0000 0000 3030 3030   3030 3030 3030 3030
7820   3030 3030 0000 0000   0000 0000 0000 0000
7830   0000 0000 0000 0000   0000 0000 0000 0000
7840   0000 0000 0000 0000   0000 0000 0000 0000
```

```
7850   0000 0000 0000 0000   0000 0000 0000 0000
7860   0000 0000 0000 0000   0000 0000 0000 0000
7870   0000 0000 0000 0000   0200 2564 0025 3032
7880   6400 2530 3264 0025   3035 6400 2530 3364
7890   0025 3033 6400 2530   3464 0047 4500 4C45
78A0   0047 4500 4551 0045   6E74 6572 2070 6172
78B0   616D 7320 666F 7220   6669 656C 6420 2564
78C0   0025 3032 6400 2564   0025 7800 2530 3278
78D0   0000 4661 696C 6564   2069 6E20 6F70 656E
78E0   2063 6F6D 6D75 6E69   6361 7469 6F6E 0000
78F0   2020 2020 2020 2020   2020 2020 2020 2020
7900   2020 2020 2020 2020   2020 2020 2020 2020
7910   2020 2020 2020 2020   2020 2020 2020 2020
7920   2020 2020 2020 2020   2020 2020 2020 2020
7930   2020 2020 2020 2020   2020 2020 2000 0000
7940   0000 0A00 456E 7465   7220 636F 756E 7400
7950   456E 7465 7220 6669   6C65 6E61 6D65 0020
7960   5072 696E 7465 7220   7469 6D65 6420 6F75
7970   7400 204F 7574 206F   6620 7061 7065 7200
7980   2050 7269 6E74 6572   206F 6666 206C 696E
7990   6500 2041 636B 6E6F   6C65 6467 6520 5072
79A0   696E 7465 7220 5072   6F62 6C65 6D00 2050
79B0   7269 6E74 6572 2065   7272 6F72 000A 0D00
79C0   0A0D 0020 4552 524F   5220 0020 4869 7420
79D0   4553 4320 746F 2052   6573 756D 6520 2E2E
79E0   2E20 0000 204D 6573   7361 6765 2000 2048
79F0   6974 2041 6E79 204B   6579 2074 6F20 5265
7A00   7375 6D65 202E 2E2E   2000 2043 6F6E 6669
7A10   726D 2000 2043 6F6E   7469 6E75 6520 2859
7A20   6573 2F4E 6F29 203A   2000 2053 656C 6563
7A30   7420 5965 7320 6F72   204E 6F20 2121 2000
7A40   2578 2563 0072 0073   6B79 2E68 6C70 0000
7A50   0000 0000 372D 0000   C405 0000 0000 0000
7A60   0000 0000 0000 0000   0000 0000 0000 0000
7A70   0000 0000 0000 0000   0000 0000 0000 0000
7A80   0000 0000 0000 0000   0000 0000 0000 0000
7A90   0000 0000 0000 0000   0000 0000 0000 0000
7AA0   0000 0000 0000 161C   3B43 5F46 494C 455F
7AB0   494E 464F 0000 0000   0000 0000 0000 0000
7AC0   0000 0000 0000 0000   0000 0000 0000 1400
7AD0   8181 8101 0100 0000   0000 0000 0000 0000
7AE0   0000 0000 0000 0000   0000 AE1C C405 4300
7AF0   0000 0000 0000 0000   0000 A02D 0000 0016
7B00   0202 180D 090C 0C0C   0708 1616 FF12 0D12
7B10   02FF 5C00 5C00 0000   8228 0000 8228 0100
7B20   0000 0000 0000 0201   0000 0000 0000 0202
7B30   0000 0000 0000 8403   0000 0000 0000 0204
7B40   0000 0000 0000 0000   0000 0000 0000 0000
7B50   0000 0000 0000 0000   0000 0000 0000 0000
7B60   0000 0000 0000 0000   0000 0000 0000 0000
7B70   0000 0000 0000 0000   0000 0000 0000 0000
7B80   0000 0000 0000 0000   0000 0000 0000 0000
7B90   0000 0000 0000 0000   0000 0000 0000 0000
7BA0   0000 0000 0000 0000   0000 0000 0000 0000
7BB0   0000 0000 0000 0000   0100 0002 0000 0000
```

| | | | | | | | | |
|---|---|---|---|---|---|---|---|---|
| 7BC0 | 0000 | 0000 | 0000 | 0000 | 0000 | 0000 | 0000 | 0000 |
| 7BD0 | 0000 | 0000 | 0000 | 0000 | 0000 | 0000 | 0000 | 0000 |
| 7BE0 | 0000 | 0000 | 0000 | 0000 | 0000 | 0000 | 0000 | 0000 |
| 7BF0 | 0000 | 0000 | 0000 | 0000 | 0000 | 0000 | 0000 | 0000 |
| 7C00 | 0000 | 0000 | 0000 | 0000 | 0000 | 0000 | 0000 | 0000 |
| 7C10 | 0000 | 0000 | 0000 | 0000 | 0000 | 0000 | 0000 | 0000 |
| 7C20 | 0000 | 0000 | 0000 | 0000 | 0000 | 0000 | 0000 | 0000 |
| 7C30 | 701D | 0000 | 286E | 756C | 6C29 | 0028 | 6E75 | 6C6C |
| 7C40 | 2900 | 2B2D | 2023 | 0000 | 0000 | 0000 | 0000 | 0000 |
| 7C50 | 0000 | 0000 | 0000 | 0000 | 0000 | 0020 | 0000 | 0000 |
| 7C60 | EC2D | EC2D | EC2D | EC2D | EC2D | 0000 | 0000 | 0000 |
| 7C70 | 0020 | 2020 | 2020 | 2020 | 2020 | 2828 | 2828 | 2820 |
| 7C80 | 2020 | 2020 | 2020 | 2020 | 2020 | 2020 | 2020 | 2020 |
| 7C90 | 2048 | 1010 | 1010 | 1010 | 1010 | 1010 | 1010 | 1010 |
| 7CA0 | 1084 | 8484 | 8484 | 8484 | 8484 | 8410 | 1010 | 1010 |
| 7CB0 | 1010 | 8181 | 8181 | 8181 | 0101 | 0101 | 0101 | 0101 |
| 7CC0 | 0101 | 0101 | 0101 | 0101 | 0101 | 0101 | 1010 | 1010 |
| 7CD0 | 1010 | 8282 | 8282 | 8282 | 0202 | 0202 | 0202 | 0202 |
| 7CE0 | 0202 | 0202 | 0202 | 0202 | 0202 | 0202 | 1010 | 1010 |
| 7CF0 | 2000 | 0000 | 0000 | 0000 | 0000 | 0000 | 0000 | 0000 |
| 7D00 | 0000 | 0000 | 0000 | 0000 | 0000 | 0000 | 0000 | 0000 |
| 7D10 | 0000 | 0000 | 0000 | 0000 | 0000 | 0000 | 0000 | 0000 |
| 7D20 | 0000 | 0000 | 0000 | 0000 | 0000 | 0000 | 0000 | 0000 |
| 7D30 | 0000 | 0000 | 0000 | 0000 | 0000 | 0000 | 0000 | 0000 |
| 7D40 | 0000 | 0000 | 0000 | 0000 | 0000 | 0000 | 0000 | 0000 |
| 7D50 | 0000 | 0000 | 0000 | 0000 | 0000 | 0000 | 0000 | 0000 |
| 7D60 | 0000 | 0000 | 0000 | 0000 | 0000 | 0000 | 0000 | 0000 |
| 7D70 | 0000 | FFFF | 0000 | 0000 | 0000 | 0000 | 0000 | 0000 |
| 7D80 | 0000 | CA31 | 3C3C | 4E4D | 5347 | 3E3E | 0000 | 5236 |
| 7D90 | 3030 | 300D | 0A2D | 2073 | 7461 | 636B | 206F | 7665 |
| 7DA0 | 7266 | 6C6F | 770D | 0A00 | 0300 | 5236 | 3030 | 330D |
| 7DB0 | 0A2D | 2069 | 6E74 | 6567 | 6572 | 2064 | 6976 | 6964 |
| 7DC0 | 6520 | 6279 | 2030 | 0D0A | 0009 | 0052 | 3630 | 3039 |
| 7DD0 | 0D0A | 2D20 | 6E6F | 7420 | 656E | 6F75 | 6768 | 2073 |
| 7DE0 | 7061 | 6365 | 2066 | 6F72 | 2065 | 6E76 | 6972 | 6F6E |
| 7DF0 | 6D65 | 6E74 | 0D0A | 00FC | 000D | 0A00 | FF00 | 7275 |
| 7E00 | 6E2D | 7469 | 6D65 | 2065 | 7272 | 6F72 | 2000 | 0200 |
| 7E10 | 5236 | 3030 | 320D | 0A2D | 2066 | 6C6F | 6174 | 696E |
| 7E20 | 6720 | 706F | 696E | 7420 | 6E6F | 7420 | 6C6F | 6164 |
| 7E30 | 6564 | 0D0A | 0001 | 0052 | 3630 | 3031 | 0D0A | 2D20 |
| 7E40 | 6E75 | 6C6C | 2070 | 6F69 | 6E74 | 6572 | 2061 | 7373 |
| 7E50 | 6967 | 6E6D | 656E | 740D | 0A00 | FFFF | FF4E | 4230 |
| 7E60 | 30DE | 6A00 | 0000 | 0010 | 00E0 | 0F00 | 0000 | 0000 |
| 7E70 | 0007 | 534B | 592E | 4F42 | 4A00 | 00F0 | 0FBC | 0800 |
| 7E80 | 0000 | 0000 | 0007 | 5749 | 4F2E | 4F42 | 4A63 | 0504 |
| 7E90 | 000B | 0600 | 0000 | 0000 | 0008 | 434F | 4D4D | 2E4F |
| 7EA0 | 424A | 0000 | AC18 | 740C | 0000 | 0000 | 0000 | 0853 |
| 7EB0 | 4B59 | 312E | 4F42 | 4A00 | 0020 | 258A | 0600 | 0000 |
| 7EC0 | 0000 | 0008 | 534B | 5932 | 2E4F | 424A | 0000 | AA2B |
| 7ED0 | B200 | 0000 | 0100 | 0000 | 0C64 | 6F73 | 5C63 | 7274 |
| 7EE0 | 302E | 6173 | 6D00 | 005C | 2C6F | 0100 | 0001 | 0000 |
| 7EF0 | 000F | 646F | 735C | 6372 | 7430 | 6461 | 742E | 6173 |
| 7F00 | 6D00 | 00CC | 2D20 | 0000 | 0001 | 0000 | 000F | 646F |
| 7F10 | 735C | 6372 | 7430 | 6D73 | 672E | 6173 | 6D00 | 00EC |
| 7F20 | 2D06 | 0000 | 0001 | 0000 | 000A | 6372 | 7430 | 6670 |

| | | | | | | | | |
|---|---|---|---|---|---|---|---|---|
| 7F30 | 2E61 | 736D | 0000 | F22D | 1600 | 0000 | 0100 | 0000 |
| 7F40 | 0A63 | 686B | 7374 | 6B2E | 6173 | 6D00 | 0008 | 2E22 |
| 7F50 | 0000 | 0001 | 0000 | 000A | 6368 | 6B73 | 756D | 2E61 |
| 7F60 | 736D | 0000 | 2A2E | 8E01 | 0000 | 0100 | 0000 | 0F64 |
| 7F70 | 6F73 | 5C73 | 7464 | 6172 | 6776 | 2E61 | 736D | 0000 |
| 7F80 | B82F | 6E00 | 0000 | 0100 | 0000 | 0F64 | 6F73 | 5C73 |
| 7F90 | 7464 | 656E | 7670 | 2E61 | 736D | 0000 | 2630 | 5400 |
| 7FA0 | 0000 | 0100 | 0000 | 0F64 | 6F73 | 5C6E | 6D73 | 6768 |
| 7FB0 | 6472 | 2E61 | 736D | 0000 | 7A30 | 4200 | 0000 | 0100 |
| 7FC0 | 0000 | 1064 | 6F73 | 5C73 | 7464 | 616C | 6C6F | 632E |
| 7FD0 | 6173 | 6D00 | 00BC | 3054 | 0000 | 0001 | 0000 | 000E |
| 7FE0 | 646F | 735C | 646F | 7372 | 6574 | 2E61 | 736D | 0000 |
| 7FF0 | 1031 | BA00 | 0000 | 0100 | 0000 | 0866 | 636C | 6F73 |
| 8000 | 652E | 6300 | 00CA | 3132 | 0000 | 0001 | 0000 | 000A |
| 8010 | 666C | 7573 | 6861 | 6C6C | 2E63 | 0000 | FC31 | 2800 |
| 8020 | 0000 | 0100 | 0000 | 0766 | 6F70 | 656E | 2E63 | 0000 |
| 8030 | 2432 | 1E00 | 0000 | 0100 | 0000 | 0866 | 7363 | 616E |
| 8040 | 662E | 6300 | 0042 | 323C | 0100 | 0001 | 0000 | 0008 |
| 8050 | 6677 | 7269 | 7465 | 2E63 | 0000 | 7E33 | 0000 | 0000 |
| 8060 | 0100 | 0000 | 0B5F | 6366 | 6C75 | 7368 | 2E61 | 736D |
| 8070 | 0000 | 7E33 | 0000 | 0000 | 0100 | 0000 | 075F | 6669 |
| 8080 | 6C65 | 2E63 | 0000 | 7E33 | C000 | 0000 | 0100 | 0000 |
| 8090 | 095F | 6669 | 6C62 | 7566 | 2E63 | 0000 | 3E34 | 5601 |
| 80A0 | 0000 | 0100 | 0000 | 095F | 666C | 7362 | 7566 | 2E63 |
| 80B0 | 0000 | 9435 | 2E00 | 0000 | 0100 | 0000 | 0A5F | 6672 |
| 80C0 | 6565 | 6275 | 662E | 6300 | 00C2 | 356C | 0000 | 0001 |
| 80D0 | 0000 | 0009 | 5F67 | 6574 | 6275 | 662E | 6300 | 002E |
| 80E0 | 36F8 | 0000 | 0001 | 0000 | 0007 | 5F6F | 7065 | 6E2E |
| 80F0 | 6300 | 0026 | 371A | 0100 | 0001 | 0000 | 0009 | 5F73 |
| 8100 | 6674 | 6275 | 662E | 6300 | 0040 | 386E | 0000 | 0001 |
| 8110 | 0000 | 0008 | 6666 | 6C75 | 7368 | 2E63 | 0000 | AE38 |
| 8120 | 1C08 | 0000 | 0100 | 0000 | 0769 | 6E70 | 7574 | 2E63 |
| 8130 | 0000 | CA40 | C808 | 0000 | 0100 | 0000 | 086F | 7574 |
| 8140 | 7075 | 742E | 6300 | 0092 | 493A | 0000 | 0001 | 0000 |
| 8150 | 0008 | 7374 | 7265 | 616D | 2E63 | 0000 | CC49 | 6C00 |
| 8160 | 0000 | 0100 | 0000 | 0875 | 6E67 | 6574 | 632E | 6300 |
| 8170 | 0038 | 4A20 | 0000 | 0001 | 0000 | 000D | 646F | 735C |
| 8180 | 636C | 6F73 | 652E | 6173 | 6D00 | 0058 | 4A7A | 0000 |
| 8190 | 0001 | 0000 | 000D | 646F | 735C | 6C73 | 6565 | 6B2E |
| 81A0 | 6173 | 6D00 | 00D2 | 4AA4 | 0100 | 0001 | 0000 | 000C |
| 81B0 | 646F | 735C | 6F70 | 656E | 2E61 | 736D | 0000 | 764C |
| 81C0 | DD00 | 0000 | 0100 | 0000 | 0C64 | 6F73 | 5C72 | 6561 |
| 81D0 | 642E | 6173 | 6D00 | 0054 | 4D28 | 0100 | 0001 | 0000 |
| 81E0 | 0009 | 7772 | 6974 | 652E | 6173 | 6D00 | 007C | 4E12 |
| 81F0 | 0000 | 0001 | 0000 | 000C | 7374 | 6163 | 6B61 | 7661 |
| 8200 | 2E61 | 736D | 0000 | 8E4E | 0000 | 0000 | 0100 | 0000 |
| 8210 | 0B74 | 7874 | 6D6F | 6465 | 2E61 | 736D | 0000 | 8E4E |
| 8220 | 5800 | 0000 | 0100 | 0000 | 0B6E | 6D61 | 6C6C | 6F63 |
| 8230 | 2E61 | 736D | 0000 | E64E | 6101 | 0000 | 0100 | 0000 |
| 8240 | 0B61 | 6D61 | 6C6C | 6F63 | 2E61 | 736D | 0000 | 4850 |
| 8250 | C400 | 0000 | 0100 | 0000 | 0E64 | 6F73 | 5C62 | 726B |
| 8260 | 6374 | 6C2E | 6173 | 6D00 | 000C | 513F | 0000 | 0001 |
| 8270 | 0000 | 000A | 7374 | 7263 | 6174 | 2E61 | 736D | 0000 |
| 8280 | 4C51 | 3200 | 0000 | 0100 | 0000 | 0A73 | 7472 | 6370 |
| 8290 | 792E | 6173 | 6D00 | 007E | 511B | 0000 | 0001 | 0000 |

```
82A0   000A 7374 726C 656E   2E61 736D 0000 9A51
82B0   3500 0000 0100 0000   0B73 7472 6E63 6174
82C0   2E61 736D 0000 D051   2800 0000 0100 0000
82D0   0B73 7472 6E63 7079   2E61 736D 0000 F851
82E0   3A00 0000 0100 0000   0B73 7472 6E63 6D70
82F0   2E61 736D 0000 3252   0300 0000 0100 0000
8300   0861 746F 692E 6173   6D00 0036 5254 0000
8310   0001 0000 0008 6174   6F78 2E61 736D 0000
8320   8A52 1B00 0000 0100   0000 0869 746F 612E
8330   6173 6D00 00A6 520A   0000 0001 0000 0009
8340   756C 746F 612E 6173   6D00 00B0 5218 0000
8350   0001 0000 0009 746F   7570 7065 722E 6300
8360   00C8 5200 0000 0001   0000 000C 636D 6973
8370   6364 6174 2E61 736D   0000 C852 0000 0000
8380   0100 0000 0963 7479   7065 2E61 736D 0000
8390   C852 2300 0000 0100   0000 0A69 7361 7474
83A0   792E 6173 6D00 00EC   521B 0000 0001 0000
83B0   000D 646F 735C 6765   7463 682E 6173 6D00
83C0   0008 537E 0000 0001   0000 000D 646F 735C
83D0   696E 7438 362E 6173   6D00 0086 5356 0000
83E0   0001 0000 0007 6667   6574 732E 6300 00DC
83F0   5350 0000 0001 0000   0007 6670 7574 732E
8400   6300 002C 5456 0000   0001 0000 0009 7370
8410   7269 6E74 662E 6300   0082 543E 0000 0001
8420   0000 0008 7373 6361   6E66 2E63 0000 C054
8430   1E00 0000 0100 0000   0C6D 6F76 6564 6174
8440   612E 6173 6D00 00DE   542A 0000 0001 0000
8450   000A 7374 7263 6872   2E61 736D 0000 0855
8460   2C00 0000 0100 0000   0A6D 656D 6370 792E
8470   6173 6D00 0034 552D   0000 0001 0000 000A
8480   6D65 6D73 6574 2E61   736D 0000 6255 5F00
8490   0000 0100 0000 0878   746F 612E 6173 6D00
84A0   00C2 550D 0000 0001   0000 000E 646F 735C
84B0   756E 6C69 6E6B 2E61   736D 0000 D055 1400
84C0   0000 0100 0000 1064   6F73 5C62 5F6B 6579
84D0   6272 642E 6173 6D00   00E4 5514 0000 0001
84E0   0000 000F 646F 735C   625F 7072 696E 742E
84F0   6173 6D00 00F8 5510   0000 0001 0000 0010
8500   646F 735C 625F 7365   7269 616C 2E61 736D
8510   0000 0856 0B00 0000   0100 0000 086C 7368
8520   6C2E 6173 6D00 0014   561F 0000 0001 0000
8530   0009 616C 7368 6C2E   6173 6D2E 24C4 0584
8540   0003 5F63 7081 28C4   0584 0003 5F70 7058
8550   27C4 05AF 0307 5F70   6163 6B65 742F 24C4
8560   05AF 030C 5F73 656E   645F 7061 636B 6574
8570   B020 C405 B203 0B5F   7061 636B 6574 5F73
8580   7472 2C24 C405 1202   055F 7062 6668 822A
8590   C405 8100 075F 7062   5F63 7472 200D 0000
85A0   3704 0F5F 636F 6D70   7574 655F 6368 6B73
85B0   756D B80D 0000 3A04   0C5F 5061 696E 7453
85C0   6372 6565 6E14 0E00   003B 0410 5F70 7269
85D0   6E74 5F66 756E 635F   6C69 6E65 820E 0000
85E0   4004 0B5F 5072 696E   7450 6172 616D B000
85F0   0000 D803 0A5F 5275   6E53 6372 6565 6E7C
8600   0400 00FB 0308 5F67   6574 5F76 616C 2C08
```

```
8610  0000 1604 0E5F 6275  696C 645F 7061 636B
8620  6574 3028 0600 0009  040E 5F62 7569 6C64
8630  5F70 6163 6B65 7473  1000 0000 C203 055F
8640  6D61 696E 0D01 C405  8400 0A5F 6461 7461
8650  5F62 6974 730E 01C4  0584 000A 5F73 746F
8660  705F 6269 7473 0F01  C405 8400 075F 7061
8670  7269 7479 1001 C405  8400 055F 6261 7564
8680  1101 C405 8400 055F  706F 7274 C603 C405
8690  6A03 095F 6865 6C70  5F77 6477 D403 C405
86A0  8500 055F 7374 6F70  1201 C405 9F03 095F
86B0  536B 7950 6172 616D  A603 C405 6A03 095F
86C0  6675 6C6C 5F77 6477  AE03 C405 6A03 0A5F
86D0  7061 7261 6D5F 7764  77B6 03C4 056A 0309
86E0  5F66 726F 6D5F 7764  77BE 03C4 056A 0307
86F0  5F74 6F5F 7764 77CE  03C4 0588 030C 5F53
8700  6B79 5061 7261 6D53  6372 D003 C405 8500
8710  0A5F 7072 696E 745F  7764 77D2 03C4 0585
8720  0006 5F70 7269 6E74  D603 C405 8500 065F
8730  6572 726F 72D8 03C4  0584 000F 5F4E 6565
8740  645F 546F 5F55 7064  6174 659C 0F00 0042
8750  040D 5F69 6E69 745F  7061 636B 6574 73CC
8760  0500 0007 0412 5F62  7569 6C64 5F70 6163
8770  6B65 745F 7374 7273  DA03 C405 8100 0F5F
8780  7361 7665 5F66 696C  655F 6F70 656E 3A0A
8790  0000 2204 0C5F 5265  6164 5061 636B 6574
87A0  73DC 03C4 05B4 030A  5F73 6176 655F 6669
87B0  6C65 6609 0000 2104  0E5F 7570 6461 7465
87C0  5F70 6172 616D 7388  0D00 0039 0408 5F50
87D0  6B74 436B 736D 2C04  C405 8100 095F 706C
87E0  6179 6261 636B 2E04  C405 B403 0E5F 706C
87F0  6179 6261 636B 5F66  696C 65F8 0800 001F
8800  040A 5F4D 6978 4275  6666 6572 6C0B 0000
8810  2B04 095F 7273 325F  636F 6D6D 8E2A C405
8820  8500 095F 5669 6465  6F53 6567 902C C405
8830  A400 095F 436F 6C6F  7250 7472 7416 0000
8840  A603 065F 5762 6565  709C 1600 00A8 0307
8850  5F57 7570 7065 72C6  1600 00AA 030D 5F47
8860  6574 4375 7273 6F72  506F 73FA 1600 00AC
8870  030D 5F53 6574 4375  7273 6F72 506F 7378
8880  1700 00B5 0307 5F57  6F70 656E 3114 1800
8890  00BB 0309 5F57 7363  726F 6C6C 312A 1700
88A0  00B0 030A 5F73 6574  6375 7273 6F72 5617
88B0  0000 B103 085F 6375  7273 6F66 6666 1700
88C0  00B2 0307 5F63 7572  736F 6EDC 1700 00B8
88D0  0308 5F70 7574 5F77  6477 F00F 0000 7803
88E0  065F 5769 6E69 746E  1000 007E 0306 5F57
88F0  7465 726D 9C10 0000  8203 065F 576F 7065
8900  6EF2 1200 0095 0307  5F57 636C 6F73 6548
8910  1800 00BE 030E 5F47  6574 4375 7273 6F72
8920  5479 7065 7C18 0000  C003 0E5F 5365 7443
8930  7572 736F 7254 7970  657C 1300 009A 0306
8940  5F57 6669 6C6C FC13  0000 9D03 055F 5770
8950  7574 6C14 0000 A003  055F 5767 6574 1416
8960  0000 A503 085F 5773  6372 6F6C 6C8D 0463
8970  0500 0218 5F54 5241  4E53 4D49 545F 4259
```

```
8980   5445 5F49 4E54 4552   5255 5054 9204 6305
8990   0002 135F 4348 4543   4B5F 464F 525F 5452
89A0   414E 534D 4954 D405   6305 0102 095F 4765
89B0   745F 4279 7465 0C04   6305 8400 0A5F 436F
89C0   6D6D 4572 726F 72C0   0463 0501 020A 5F4F
89D0   7065 6E5F 436F 6D6D   5905 6305 0102 0A5F
89E0   5075 745F 4279 7465   7333 0563 0501 020B
89F0   5F43 6C6F 7365 5F43   6F6D 6D4F 0463 0500
8A00   0216 5F4C 494E 455F   5354 4154 5553 5F49
8A10   4E54 4552 5255 5054   1D04 6305 0102 065F
8A20   494E 5433 3459 0463   0500 0217 5F52 4543
8A30   4549 5645 5F42 5954   455F 494E 5445 5252
8A40   5550 5491 0463 0500   0217 5F4D 4F44 454D
8A50   5F53 5441 5455 535F   494E 5445 5252 5550
8A60   5484 2AC4 05CF 0310   5F64 756D 625F 6172
8A70   6561 5F66 6965 6C64   2E14 C405 8C03 0E5F
8A80   426C 6163 6B50 6172   616D 5363 7230 14C4
8A90   05B7 030A 5F44 756D   6250 6172 616D A017
8AA0   C405 8C03 0D5F 4475   6D62 5061 7261 6D53
8AB0   6372 A217 C405 BE03   0F5F 4475 6D62 4669
8AC0   656C 6450 6172 616D   5A19 C405 8C03 125F
8AD0   4475 6D62 4669 656C   6450 6172 616D 5363
8AE0   725C 19C4 05C0 030B   5F53 6D61 7274 5061
8AF0   7261 6D38 1AC4 058C   030E 5F53 6D61 7274
8B00   5061 7261 6D53 6372   AC18 0000 D103 0C5F
8B10   6564 6974 5F70 6163   6B65 7454 1A00 00E5
8B20   0310 5F45 6469 745F   7665 725F 7061 636B
8B30   6574 861C 0000 F603   125F 4564 6974 5F62
8B40   6C61 636B 5F70 6163   6B65 7472 1D00 00F8
8B50   0311 5F45 6469 745F   6475 6D62 5F70 6163
8B60   6B65 7460 1F00 00FA   0312 5F45 6469 745F
8B70   736D 6172 745F 7061   636B 6574 CA0B C405
8B80   8903 0A5F 5479 7065   5061 7261 6D84 2300
8B90   000B 0414 5F47 6574   5F44 756D 625F 6172
8BA0   6561 5F66 6965 6C64   380C C405 6E03 095F
8BB0   5479 7065 5F77 6477   3220 0000 FC03 125F
8BC0   5275 6E4F 6E65 5061   7261 6D53 6372 6565
8BD0   6E40 0CC4 056E 030E   5F44 756D 625F 6172
8BE0   6561 5F77 6477 480C   C405 AA03 0B5F 5061
8BF0   636B 6574 5F77 6477   4222 0000 0904 0B5F
8C00   5275 6E53 6372 6565   6E32 A020 0000 FE03
8C10   0B5F 5275 6E53 6372   6565 6E31 700C C405
8C20   AD03 095F 5665 7250   6172 616D 8224 0000
8C30   0E04 095F 6865 7874   6F62 696E DA24 0000
8C40   1404 095F 6269 6E74   6F68 6578 2A11 C405
8C50   8C03 0C5F 5665 7250   6172 616D 5363 722C
8C60   11C4 05B4 030B 5F42   6C61 636B 5061 7261
8C70   6D20 2500 00AB 030B   5F69 6E69 745F 7273
8C80   3233 3210 2B00 0000   0405 5F68 656C 7084
8C90   2700 00D7 030A 5F70   7269 6E74 5F73 7472
8CA0   CE26 0000 CD03 0E5F   6765 745F 6669 6C65
8CB0   5F6E 616D 65EE 2800   00E6 030B 5F50 7574
8CC0   4D65 7373 6167 6542   2600 00BC 0307 5F6D
8CD0   6670 7574 7360 2600   00C2 030B 5F47 6574
8CE0   5F6E 756D 6265 7272   2500 00B5 030D 5F50
```

```
8CF0    7269 6E74 4675 6E4C    696E 6566 2A00 00F3
8D00    0306 5F47 6574 4B42    7829 0000 ED03 0B5F
8D10    4765 7443 6F6E 6669    726D 5228 0000 E103
8D20    095F 5075 7445 7272    6F72 1E20 C405 0000
8D30    065F 6564 6174 61A0    2CC4 0500 0004 5F65
8D40    6E64 141C C405 0000    0B5F 5F61 6578 6974
8D50    5F72 746E 661C C405    0000 075F 5F61 6272
8D60    6B70 161C C405 0000    085F 5F61 6272 6B74
8D70    6210 1CC4 0500 0008    5F5F 6173 697A 6473
8D80    AA2B 0000 0000 085F    5F61 7374 6172 7412
8D90    1CC4 0500 0008 5F5F    6174 6F70 7370 661C
8DA0    C405 0000 095F 5F61    6272 6B74 6265 3E2C
8DB0    0000 0000 095F 5F63    696E 7444 4956 7698
8DC0    0000 0100 0A5F 5F61    6372 7475 7365 644D
8DD0    2C00 0000 000B 5F5F    616D 7367 5F65 7869
8DE0    7489 1CC4 0500 000B    5F5F 6F73 7665 7273
8DF0    696F 6E81 1CC4 0500    0006 5F65 7272 6E6F
8E00    372D 0000 0000 065F    5F65 7869 74B0 1CC4
8E10    0500 0007 5F5F 6368    696C 648E 1CC4 0500
8E20    0007 5F5F 6E66 696C    655C 2C00 0000 0007
8E30    5F5F 6369 6E69 74A4    1CC4 0500 0007 5F5F
8E40    5F61 7267 63B3 1CC4    0500 0007 5F5F 696E
8E50    746E 6F89 1CC4 0500    000D 5F5F 646F 7376
8E60    6572 6D61 6A6F 728C    1CC4 0500 0007 5F5F
8E70    6F73 6572 72A6 1CC4    0500 0007 5F5F 5F61
8E80    7267 768A 1CC4 0500    000D 5F5F 646F 7376
8E90    6572 6D69 6E6F 72A8    1CC4 0500 0008 5F65
8EA0    6E76 6972 6F6E 901C    C405 0000 085F 5F6F
8EB0    7366 696C 658B 1CC4    0500 0008 5F5F 6F73
8EC0    6D6F 6465 851C C405    0000 085F 5F70 7370
8ED0    6164 7236 1FC4 0500    0008 5F5F 6670 696E
8EE0    6974 B41C C405 0000    085F 5F6F 766C 7665
8EF0    63AA 1CC4 0500 0008    5F5F 7067 6D70 7472
8F00    681C C405 0000 095F    5F61 6366 696E 666F
8F10    B21C C405 0000 095F    5F6F 766C 666C 6167
8F20    751C C405 0000 095F    5F61 696E 7464 6976
8F30    891C C405 0000 095F    5F6F 736D 616A 6F72
8F40    8A1C C405 0000 095F    5F6F 736D 696E 6F72
8F50    831C C405 0000 0A5F    5F75 6D61 736B 7661
8F60    6C7C 2D00 0000 000A    5F5F 6374 6572 6D73
8F70    7562 8C1C C405 0000    0A5F 5F64 6F73 6572
8F80    726E 6F79 1CC4 0500    0005 5F5F 6661 6320
8F90    2D00 0000 0005 5F65    7869 7487 1CC4 0500
8FA0    0005 5F5F 7073 70CC    2D00 0000 000E 5F5F
8FB0    4646 5F4D 5347 4241    4E4E 4552 B81C C405
8FC0    0000 095F 5F61 6462    676D 7367 7698 0000
8FD0    0100 095F 5F61 6372    746D 7367 EC2D 0000
8FE0    0000 085F 5F66 7074    7261 70BA 1CC4 0500
8FF0    0006 5354 4B48 5151    F22D 0000 0000 085F
9000    5F63 686B 7374 6B08    2E00 0000 000B 5F5F
9010    6E75 6C6C 6368 6563    6B2A 2E00 0000 0009
9020    5F5F 7365 7461 7267    7638 2F00 0000 0009
9030    5F5F 7365 7465 6E76    7026 3000 0000 000B
9040    5F5F 4E4D 5347 5F54    4558 5451 3000 0000
9050    000C 5F5F 4E4D 5347    5F57 5249 5445 7A30
```

```
9060   0000 0000 095F 5F6D    7961 6C6C 6F63 BC30
9070   0000 0000 095F 5F64    6F73 7265 7430 DC30
9080   0000 0000 0A5F 5F6D    6170 6572 726F 72CF
9090   3000 0000 000A 5F5F    646F 7372 6574 6178
90A0   C430 0000 0000 0B5F    5F64 6F73 7265 7475
90B0   726E 1031 0000 0000    075F 6663 6C6F 7365
90C0   CA31 0000 0000 095F    666C 7573 6861 6C6C
90D0   FC31 0000 0000 065F    666F 7065 6E24 3200
90E0   0000 0007 5F66 7363    616E 6642 3200 0000
90F0   0007 5F66 7772 6974    65D6 1CC4 0500 0008
9100   5F5F 6366 6C75 7368    8228 C405 0000 075F
9110   5F62 7566 696E 5825    C405 0000 085F 5F62
9120   7566 6F75 7490 2AC4    0500 0008 5F5F 6275
9130   6665 7272 781D C405    0000 065F 5F69 6F62
9140   32F0 1DC4 0500 0009    5F5F 6C61 7374 696F
9150   62D8 1CC4 0500 0005    5F5F 696F 627E 3300
9160   0000 0008 5F5F 6669    6C62 7566 3E34 0000
9170   0000 085F 5F66 6C73    6275 6694 3500 0000
9180   0009 5F5F 6672 6565    6275 66C2 3500 0000
9190   0008 5F5F 6765 7462    7566 2E36 0000 0000
91A0   0A5F 5F6F 7065 6E66    696C 65AA 3700 0000
91B0   0007 5F5F 6674 6275    6626 3700 0000 0007
91C0   5F5F 7374 6275 6640    3800 0000 0007 5F66
91D0   666C 7573 68AE 3800    0000 0007 5F5F 696E
91E0   7075 74CA 4000 0000    0008 5F5F 6F75 7470
91F0   7574 9249 0000 0000    0B5F 5F67 6574 7374
9200   7265 616D CC49 0000    0000 075F 756E 6765
9210   7463 384A 0000 0000    065F 636C 6F73 6558
9220   4A00 0000 0006 5F6C    7365 656B DA4A 0000
9230   0000 0A5F 5F63 6F70    656E 7375 62D2 4A00
9240   0000 0005 5F6F 7065    6E65 4C00 0000 0011
9250   5F5F 6358 454E 4958    746F 444F 536D 6F64
9260   6576 4C00 0000 0005    5F72 6561 6454 4D00
9270   0000 0006 5F77 7269    7465 7C4E 0000 0000
9280   0B5F 7374 6163 6B61    7661 696C 081E C405
9290   0000 075F 5F66 6D6F    6465 081E C405 0000
92A0   085F 5F69 6F6D 6F64    65A0 4E00 0000 0007
92B0   5F6D 616C 6C6F 638E    4E00 0000 0007 5F5F
92C0   6E66 7265 650A 1EC4    0500 0008 5F5F 6173
92D0   6567 6473 A04E 0000    0000 095F 5F6E 6D61
92E0   6C6C 6F63 8E4E 0000    0000 055F 6672 6565
92F0   2850 0000 0000 0C5F    5F61 6D61 6C6C 6F63
9300   6272 6B14 1EC4 0500    0007 5F5F 6173 6567
9310   311C 1EC4 0500 0007    5F5F 6173 6567 6816
9320   1EC4 0500 0007 5F5F    6173 6567 6E18 1EC4
9330   0500 0007 5F5F 6173    6567 7206 5000 0000
9340   0008 5F5F 616D 6C69    6E6B 1C1E C405 0000
9350   095F 5F51 4368 6461    7461 E94E 0000 0000
9360   095F 5F61 6D61 6C6C    6F63 CC4F 0000 0000
9370   0A5F 5F61 6D65 7870    616E 641A 1EC4 0500
9380   000A 5F5F 616D 626C    6B73 697A 4850 0000
9390   0000 075F 6272 6B63    746C 0C51 0000 0000
93A0   075F 7374 7263 6174    4C51 0000 0000 075F
93B0   7374 7263 7079 7E51    0000 0000 075F 7374
93C0   726C 656E 9A51 0000    0000 085F 7374 726E
```

```
93D0   6361 74D0 5100 0000   0008 5F73 7472 6E63
93E0   7079 F851 0000 0000   085F 7374 726E 636D
93F0   7032 5200 0000 0005   5F61 746F 6936 5200
9400   0000 0007 5F5F 6361   746F 788A 5200 0000
9410   0005 5F69 746F 61A6   5200 0000 0006 5F75
9420   6C74 6F61 B052 0000   0000 085F 746F 7570
9430   7065 7220 1EC4 0500   000D 5F5F 6366 6C74
9440   6376 745F 7461 622E   1EC4 0500 0008 5F5F
9450   6173 697A 6543 2F1E   C405 0000 085F 5F61
9460   7369 7A65 442C 1EC4   0500 000B 5F5F 7369
9470   6769 6E74 6F66 662A   1EC4 0500 000B 5F5F
9480   7369 6769 6E74 7365   6730 1EC4 0500 0007
9490   5F5F 6374 7970 6530   1EC4 0500 0008 5F5F
94A0   6374 7970 655F C852   0000 0000 075F 6973
94B0   6174 7479 F052 0000   0000 065F 6765 7463
94C0   68EC 5200 0000 0007   5F67 6574 6368 6532
94D0   1FC4 0500 0007 5F5F   6368 6275 6608 5300
94E0   0000 0006 5F69 6E74   3836 8653 0000 0000
94F0   065F 6667 6574 73DC   5300 0000 0006 5F66
9500   7075 7473 2C54 0000   0000 085F 7370 7269
9510   6E74 6682 5400 0000   0007 5F73 7363 616E
9520   66C0 5400 0000 0009   5F6D 6F76 6564 6174
9530   61DE 5400 0000 0007   5F73 7472 6368 7208
9540   5500 0000 0007 5F6D   656D 6370 7934 5500
9550   0000 0007 5F6D 656D   7365 746E 5500 0000
9560   0007 5F5F 6378 746F   6162 5500 0000 000A
9570   5F5F 636C 746F 6173   7562 C255 0000 0000
9580   075F 7265 6D6F 7665   C255 0000 0000 075F
9590   756E 6C69 6E6B D055   0000 0000 0D5F 5F62
95A0   696F 735F 6B65 7962   7264 E455 0000 0000
95B0   0E5F 5F62 696F 735F   7072 696E 7465 72F8
95C0   5500 0000 0010 5F5F   6269 6F73 5F73 6572
95D0   6961 6C63 6F6D 0856   0000 0000 085F 5F61
95E0   4E6C 7368 6C14 5600   0000 000A 5F5F 614E
95F0   4E61 6C73 686C 0101   0080 0101 0080 0101
9600   0080 0101 0080 0101   0080 0101 0080 0101
9610   0080 0101 0080 0101   0080 0101 0080 0101
9620   0080 0101 0080 0101   0080 0101 0080 0112
9630   0079 4005 830F 0283   1002 8206 5F69 6F62
9640   7566 6901 1000 7F83   A000 8381 0083 A000
9650   8380 0083 8000 012C   007F 8204 5F70 7472
9660   8800 8204 5F63 6E74   8802 8205 5F62 6173
9670   6588 0482 055F 666C   6167 8806 8205 5F66
9680   696C 6588 0701 0100   8001 0D00 7A74 830E
9690   0282 065F 696F 6275   6601 0100 8001 0100
96A0   8001 0100 8001 0100   8001 0100 8001 0100
96B0   8001 0100 8001 0100   8001 0100 8001 0100
96C0   8001 0100 8001 0100   8001 0100 8001 0100
96D0   8001 0100 8001 0100   8001 0100 8001 0100
96E0   8001 0100 8001 0100   8001 0100 8001 0100
96F0   8001 0100 8001 0100   8001 0100 8001 0100
9700   8001 0100 8001 0100   8001 0100 8001 0100
9710   8001 0100 8001 0100   8001 0100 8001 0100
9720   8001 0100 8001 0100   8001 0100 8001 0100
9730   8001 0100 8001 0100   8001 0100 8001 0100
```

| | | | | | | | | |
|---|---|---|---|---|---|---|---|---|
| 9740 | 8001 | 0100 | 8001 | 0100 | 8001 | 0100 | 8001 | 0100 |
| 9750 | 8001 | 0100 | 8001 | 0100 | 8001 | 0100 | 8001 | 0100 |
| 9760 | 8001 | 0100 | 8001 | 0100 | 8001 | 0100 | 8001 | 0100 |
| 9770 | 8001 | 0100 | 8001 | 0100 | 8001 | 0100 | 8001 | 0100 |
| 9780 | 8001 | 0100 | 8001 | 0100 | 8001 | 0100 | 8001 | 0100 |
| 9790 | 8001 | 0100 | 8001 | 0100 | 8001 | 0100 | 8001 | 0100 |
| 97A0 | 8001 | 0100 | 8001 | 0100 | 8001 | 0100 | 8001 | 0100 |
| 97B0 | 8001 | 0100 | 8001 | 0100 | 8001 | 0100 | 8001 | 0100 |
| 97C0 | 8001 | 0100 | 8001 | 0100 | 8001 | 0100 | 8001 | 0100 |
| 97D0 | 8001 | 0100 | 8001 | 0100 | 8001 | 0100 | 8001 | 0100 |
| 97E0 | 8001 | 0100 | 8001 | 0100 | 8001 | 0100 | 8001 | 0100 |
| 97F0 | 8001 | 0100 | 8001 | 0100 | 8001 | 0100 | 8001 | 0100 |
| 9800 | 8001 | 0100 | 8001 | 0100 | 8001 | 0100 | 8001 | 0100 |
| 9810 | 8001 | 0100 | 8001 | 0100 | 8001 | 0100 | 8001 | 0100 |
| 9820 | 8001 | 0100 | 8001 | 0100 | 8001 | 0100 | 8001 | 0100 |
| 9830 | 8001 | 0100 | 8001 | 0100 | 8001 | 0100 | 8001 | 0100 |
| 9840 | 8001 | 0100 | 8001 | 0100 | 8001 | 0100 | 8001 | 0100 |
| 9850 | 8001 | 0100 | 8001 | 0100 | 8001 | 0100 | 8001 | 0100 |
| 9860 | 8001 | 0100 | 8001 | 0100 | 8001 | 0100 | 8001 | 0100 |
| 9870 | 8001 | 0100 | 8001 | 0100 | 8001 | 0100 | 8001 | 0100 |
| 9880 | 8001 | 0100 | 8001 | 0100 | 8001 | 0100 | 8001 | 0100 |
| 9890 | 8001 | 0100 | 8001 | 0100 | 8001 | 0100 | 8001 | 0100 |
| 98A0 | 8001 | 0100 | 8001 | 0100 | 8001 | 0100 | 8001 | 0100 |
| 98B0 | 8001 | 0100 | 8001 | 0100 | 8001 | 0100 | 8001 | 0100 |
| 98C0 | 8001 | 0100 | 8001 | 0100 | 8001 | 0100 | 8001 | 0100 |
| 98D0 | 8001 | 0100 | 8001 | 0100 | 8001 | 0100 | 8001 | 0100 |
| 98E0 | 8001 | 0100 | 8001 | 0100 | 8001 | 0100 | 8001 | 0100 |
| 98F0 | 8001 | 0100 | 8001 | 0100 | 8001 | 0100 | 8001 | 0100 |
| 9900 | 8001 | 0100 | 8001 | 0100 | 8001 | 0100 | 8001 | 0100 |
| 9910 | 8001 | 0100 | 8001 | 0100 | 8001 | 0100 | 8001 | 0100 |
| 9920 | 8001 | 0100 | 8001 | 0100 | 8001 | 0100 | 8001 | 0100 |
| 9930 | 8001 | 0100 | 8001 | 0100 | 8001 | 0100 | 8001 | 0100 |
| 9940 | 8001 | 0100 | 8001 | 0100 | 8001 | 0100 | 8001 | 0100 |
| 9950 | 8001 | 0100 | 8001 | 0100 | 8001 | 0100 | 8001 | 0100 |
| 9960 | 8001 | 0100 | 8001 | 0100 | 8001 | 0100 | 8001 | 0100 |
| 9970 | 8001 | 0100 | 8001 | 0100 | 8001 | 0100 | 8001 | 0100 |
| 9980 | 8001 | 0100 | 8001 | 0100 | 8001 | 0100 | 8001 | 0100 |
| 9990 | 8001 | 0100 | 8001 | 0100 | 8001 | 0100 | 8001 | 0100 |
| 99A0 | 8001 | 0100 | 8001 | 0100 | 8001 | 0100 | 8001 | 0100 |
| 99B0 | 8001 | 0100 | 8001 | 0100 | 8001 | 0100 | 8001 | 0100 |
| 99C0 | 8001 | 0100 | 8001 | 0100 | 8001 | 0100 | 8001 | 0100 |
| 99D0 | 8001 | 0100 | 8001 | 0100 | 8001 | 0100 | 8001 | 0100 |
| 99E0 | 8001 | 0100 | 8001 | 0100 | 8001 | 0100 | 8001 | 0100 |
| 99F0 | 8001 | 0100 | 8001 | 0100 | 8001 | 0100 | 8001 | 0100 |
| 9A00 | 8001 | 0100 | 8001 | 0100 | 8001 | 0100 | 8001 | 0100 |
| 9A10 | 8001 | 0100 | 8001 | 0100 | 8001 | 0100 | 8001 | 0100 |
| 9A20 | 8001 | 0100 | 8001 | 0100 | 8001 | 0100 | 8001 | 0100 |
| 9A30 | 8001 | 0100 | 8001 | 0100 | 8001 | 0100 | 8001 | 0100 |
| 9A40 | 8001 | 0100 | 8001 | 0100 | 8001 | 0100 | 8001 | 0100 |
| 9A50 | 8001 | 0100 | 8001 | 0100 | 8001 | 0100 | 8001 | 0100 |
| 9A60 | 8001 | 0100 | 8001 | 0100 | 8001 | 0100 | 8001 | 0100 |
| 9A70 | 8001 | 0100 | 8001 | 0100 | 8001 | 0100 | 8001 | 0100 |
| 9A80 | 8001 | 0100 | 8001 | 0100 | 8001 | 0100 | 8001 | 0100 |
| 9A90 | 8001 | 0100 | 8001 | 0100 | 8001 | 0100 | 8001 | 0100 |
| 9AA0 | 8001 | 0100 | 8001 | 0100 | 8001 | 0100 | 8001 | 0100 |

| | | | | | | | |
|---|---|---|---|---|---|---|---|
| 9AB0 | 8001 | 0100 | 8001 | 0100 | 8001 | 0100 | 8001 | 0100 |
| 9AC0 | 8001 | 0100 | 8001 | 0100 | 8001 | 0100 | 8001 | 0100 |
| 9AD0 | 8001 | 0100 | 8001 | 0100 | 8001 | 0100 | 8001 | 0100 |
| 9AE0 | 8001 | 0100 | 8001 | 0100 | 8001 | 0100 | 8001 | 0100 |
| 9AF0 | 8001 | 0100 | 8001 | 0100 | 8001 | 0100 | 8001 | 0100 |
| 9B00 | 8001 | 0100 | 8001 | 0100 | 8001 | 0100 | 8001 | 0100 |
| 9B10 | 8001 | 0100 | 8001 | 0100 | 8001 | 0100 | 8001 | 0100 |
| 9B20 | 8001 | 0100 | 8001 | 0100 | 8001 | 0100 | 8001 | 0100 |
| 9B30 | 8001 | 0100 | 8001 | 0100 | 8001 | 0100 | 8001 | 0100 |
| 9B40 | 8001 | 0100 | 8001 | 0100 | 8001 | 0100 | 8001 | 0100 |
| 9B50 | 8001 | 0100 | 8001 | 0100 | 8001 | 0100 | 8001 | 0100 |
| 9B60 | 8001 | 0100 | 8001 | 0100 | 8001 | 0100 | 8001 | 0100 |
| 9B70 | 8001 | 0100 | 8001 | 0100 | 8001 | 0100 | 8001 | 0100 |
| 9B80 | 8001 | 0100 | 8001 | 0100 | 8001 | 0100 | 8001 | 0100 |
| 9B90 | 8001 | 0100 | 8001 | 0100 | 8001 | 0100 | 8001 | 0100 |
| 9BA0 | 8001 | 0100 | 8001 | 0100 | 8001 | 0100 | 8001 | 0100 |
| 9BB0 | 8001 | 0100 | 8001 | 0100 | 8001 | 0100 | 8001 | 0100 |
| 9BC0 | 8001 | 0100 | 8001 | 0100 | 8001 | 0100 | 8001 | 0100 |
| 9BD0 | 8001 | 0100 | 8001 | 0100 | 8001 | 0100 | 8001 | 0100 |
| 9BE0 | 8001 | 0100 | 8001 | 0100 | 8001 | 0100 | 8001 | 0100 |
| 9BF0 | 8001 | 0100 | 8001 | 1800 | 7940 | 0783 | 6B03 | 836C |
| 9C00 | 0382 | 0C57 | 494E | 444F | 575F | 4652 | 414D | 4569 |
| 9C10 | 0116 | 007F | 8384 | 0083 | 8400 | 8384 | 0083 | 8400 |
| 9C20 | 8384 | 0083 | 8400 | 83A0 | 0001 | 2F00 | 7F82 | 0179 |
| 9C30 | 8800 | 8201 | 7888 | 0182 | 0168 | 8802 | 8201 | 7788 |
| 9C40 | 0382 | 0474 | 7970 | 6588 | 0482 | 0566 | 7261 | 6D65 |
| 9C50 | 8805 | 8205 | 7469 | 746C | 6588 | 0601 | 0100 | 8001 |
| 9C60 | 0100 | 8001 | 0100 | 8001 | 0100 | 8001 | 0100 | 8001 |
| 9C70 | 0100 | 8001 | 0100 | 8001 | 0100 | 8001 | 0100 | 8001 |
| 9C80 | 0100 | 8001 | 0100 | 8001 | 0100 | 8001 | 0100 | 8001 |
| 9C90 | 0100 | 8001 | 0100 | 8001 | 0100 | 8001 | 0100 | 8001 |
| 9CA0 | 0100 | 8001 | 0100 | 8001 | 0100 | 8001 | 0100 | 8001 |
| 9CB0 | 0100 | 8001 | 0700 | 7885 | 2003 | 8384 | 0301 | 0700 |
| 9CC0 | 7885 | C800 | 8380 | 0001 | 1300 | 7985 | 7003 | 0783 |
| 9CD0 | 8603 | 8387 | 0382 | 0550 | 4152 | 414D | 6901 | 1600 |
| 9CE0 | 7F83 | 8400 | 8384 | 0083 | A400 | 8384 | 0083 | 8500 |
| 9CF0 | 8385 | 0083 | 8303 | 013A | 007F | 8203 | 685F | 7988 |
| 9D00 | 0082 | 0368 | 5F78 | 8801 | 8206 | 6865 | 6164 | 6572 |
| 9D10 | 8802 | 8203 | 665F | 7888 | 0482 | 0376 | 616C | 8806 |
| 9D20 | 8204 | 7479 | 7065 | 8808 | 8207 | 6F70 | 7469 | 6F6E |
| 9D30 | 7388 | 0A01 | 1500 | 7910 | 0183 | 8903 | 838A | 0382 |
| 9D40 | 0950 | 4152 | 414D | 5F53 | 4352 | 6901 | 0400 | 7F83 |
| 9D50 | 8500 | 0111 | 007F | 820C | 6E6D | 5F6F | 665F | 7061 |
| 9D60 | 7261 | 6D73 | 8800 | 0101 | 0080 | 0101 | 0080 | 0101 |
| 9D70 | 0080 | 0101 | 0080 | 0101 | 0080 | 0101 | 0080 | 0101 |
| 9D80 | 0080 | 0101 | 0080 | 0101 | 0080 | 010C | 007A | 7483 |
| 9D90 | 8503 | 8205 | 5041 | 5241 | 4D01 | 0100 | 8001 | 0100 |
| 9DA0 | 8001 | 1000 | 7A74 | 8388 | 0382 | 0950 | 4152 | 414D |
| 9DB0 | 5F53 | 4352 | 0101 | 0080 | 0101 | 0080 | 0101 | 0080 |
| 9DC0 | 0101 | 0080 | 0101 | 0080 | 0101 | 0080 | 0101 | 0080 |
| 9DD0 | 0107 | 0078 | 85A0 | 1483 | 8503 | 0105 | 0078 | 5083 |
| 9DE0 | 8000 | 0105 | 0078 | 2083 | 8000 | 0105 | 0078 | 0883 |
| 9DF0 | 8000 | 0105 | 0078 | 5883 | 8000 | 0101 | 0080 | 0105 |
| 9E00 | 0078 | 4083 | 8000 | 0105 | 0078 | 7083 | 8000 | 0105 |
| 9E10 | 0078 | 1083 | 8000 | 0105 | 0078 | 6883 | 8000 | 0105 |

| | | | | | | | | |
|---|---|---|---|---|---|---|---|---|
| 9E20 | 0078 | 2883 | 8000 | 0105 | 0078 | 3883 | 8000 | 0107 |
| 9E30 | 0078 | 8590 | 0083 | 8000 | 0107 | 0078 | 8508 | 0183 |
| 9E40 | 8000 | 0107 | 0078 | 85E0 | 0083 | 8000 | 0101 | 0080 |
| 9E50 | 0107 | 0078 | 8548 | 0983 | B003 | 0107 | 0078 | 8508 |
| 9E60 | 0183 | 8000 | 0101 | 0080 | 0107 | 0078 | 85D8 | 1B83 |
| 9E70 | B303 | 0107 | 0078 | 8518 | 0383 | 8000 | 0107 | 0078 |
| 9E80 | 8580 | 0283 | 8000 | 0101 | 0080 | 0101 | 0080 | 0101 |
| 9E90 | 0080 | 0101 | 0080 | 0101 | 0080 | 0101 | 0080 | 0101 |
| 9EA0 | 0080 | 0101 | 0080 | 0101 | 0080 | 0107 | 007A | 7483 |
| 9EB0 | A000 | 8200 | 0101 | 0080 | 0101 | 0080 | 0107 | 007F |
| 9EC0 | 8385 | 0083 | BE03 | 0108 | 0075 | 8081 | 6302 | 83C1 |
| 9ED0 | 0301 | 0700 | 7885 | 8002 | 8380 | 0001 | 0100 | 8001 |
| 9EE0 | 0100 | 8001 | 0100 | 8001 | 0100 | 8001 | 0500 | 7818 |
| 9EF0 | 8380 | 0001 | 0100 | 8001 | 0100 | 8001 | 0100 | 8001 |
| 9F00 | 0700 | 7885 | 3001 | 8380 | 0001 | 0100 | 8001 | 0100 |
| 9F10 | 8001 | 0100 | 8001 | 0100 | 8001 | 0100 | 8001 | 0100 |
| 9F20 | 8001 | 0100 | 8001 | 0100 | 8001 | 0100 | 8001 | 0100 |
| 9F30 | 8001 | 0700 | 7F83 | 9703 | 8394 | 0301 | 0800 | 7580 |
| 9F40 | 8163 | 0283 | D703 | 0101 | 0080 | 0101 | 0080 | 0101 |
| 9F50 | 0080 | 0101 | 0080 | 0101 | 0080 | 0101 | 0080 | 0101 |
| 9F60 | 0080 | 0101 | 0080 | 0101 | 0080 | 0101 | 0080 | 0101 |
| 9F70 | 0080 | 0101 | 0080 | 0101 | 0080 | 0101 | 0080 | 0101 |
| 9F80 | 0080 | 0101 | 0080 | 0101 | 0080 | 0101 | 0080 | 0101 |
| 9F90 | 0080 | 0105 | 0078 | 7883 | 8000 | 0101 | 0080 | 0101 |
| 9FA0 | 0080 | 0101 | 0080 | 0101 | 0080 | 0107 | 0078 | 85D0 |
| 9FB0 | 0083 | 8000 | 0105 | 0078 | 7883 | 8000 | 0101 | 0080 |
| 9FC0 | 0101 | 0080 | 0101 | 0080 | 0105 | 0078 | 3083 | 8000 |
| 9FD0 | 0101 | 0080 | 0101 | 0080 | 0107 | 0078 | 8580 | 0083 |
| 9FE0 | 8000 | 0104 | 007F | 8394 | 0301 | 0A00 | 7580 | 8384 |
| 9FF0 | 0063 | 0183 | FA03 | 0107 | 0078 | 8518 | 0183 | 8000 |
| A000 | 0101 | 0080 | 0101 | 0080 | 0101 | 0080 | 0101 | 0080 |
| A010 | 0101 | 0080 | 0107 | 0078 | 85B8 | 0083 | 8000 | 0101 |
| A020 | 0080 | 0101 | 0080 | 0101 | 0080 | 0107 | 0078 | 85A0 |
| A030 | 0083 | 8000 | 0108 | 0075 | 8081 | 6300 | 8302 | 0201 |
| A040 | 0100 | 8001 | 0800 | 7580 | 8163 | 0083 | 0202 | 0105 |
| A050 | 0078 | 1083 | 8000 | 0107 | 0078 | 85B0 | 0083 | 8000 |
| A060 | 0101 | 0080 | 0101 | 0080 | 0101 | 0080 | 0101 | 0080 |
| A070 | 0101 | 0080 | 0101 | 0080 | 0101 | 0080 | 0101 | 0080 |
| A080 | 0101 | 0080 | 0101 | 0080 | 0108 | 0075 | 8081 | 6300 |
| A090 | 8302 | 0201 | 0700 | 7885 | 2001 | 8380 | 0001 | 0700 |
| A0A0 | 7885 | 1001 | 8380 | 0001 | 0100 | 8001 | 0700 | 7885 |
| A0B0 | 0008 | 831B | 0401 | 0700 | 7885 | 0002 | 8380 | 0001 |
| A0C0 | 0500 | 7840 | 8380 | 0001 | 0100 | 8001 | 0700 | 7F83 |
| A0D0 | A400 | 8385 | 0001 | 0800 | 7580 | 8163 | 0283 | 1E04 |
| A0E0 | 0101 | 0080 | 0108 | 0075 | 8081 | 6300 | 8302 | 0201 |
| A0F0 | 0800 | 7580 | 8163 | 0083 | 0202 | 0107 | 0078 | 85F8 |
| A100 | 0783 | 8000 | 0101 | 0080 | 0101 | 0080 | 0101 | 0080 |
| A110 | 0101 | 0080 | 0101 | 0080 | 0101 | 0080 | 0104 | 007F |
| A120 | 8384 | 0001 | 0800 | 7580 | 8163 | 0183 | 2A04 | 0101 |
| A130 | 0080 | 0101 | 0080 | 0101 | 0080 | 0101 | 0080 | 0101 |
| A140 | 0080 | 0101 | 0080 | 0101 | 0080 | 0101 | 0080 | 0101 |
| A150 | 0080 | 0101 | 0080 | 010A | 007F | 8384 | 0083 | A400 |
| A160 | 8385 | 0001 | 0A00 | 7580 | 8384 | 0063 | 0383 | 3604 |
| A170 | 0104 | 007F | 83A4 | 0001 | 0A00 | 7580 | 8384 | 0063 |
| A180 | 0183 | 3804 | 0108 | 0075 | 8081 | 6300 | 8302 | 0201 |

```
A190    0800 7580 8163 0083    0202 0101 0080 0107
A1A0    0078 8580 0283 8000    0107 0078 85E8 0283
A1B0    8000 0107 007F 8394    0383 8500 0108 0075
A1C0    8081 6302 833F 0401    0100 8001 0800 7580
A1D0    8163 0083 0202 0101    0080 0101 0080 0101
A1E0    0080 0101 0080 0101    0080 0101 0080 0101
A1F0    0080 0101 0080 0101    0080 0101 0080 0101
A200    0080 0101 0080 0101    0080 0101 0080 0101
A210    0080 0101 0080 0101    0080 0101 0080 0101
A220    0080 0101 0080 0101    0080 0101 0080 0101
A230    0080 0101 0080 0101    0080 0101 0080 0101
A240    0080 0101 0080 0101    0080 0101 0080 0101
A250    0080 0101 0080 0101    0080 0101 0080 0101
A260    0080 0101 0080 0101    0080 0101 0080 0101
A270    0080 0101 0080 0101    0080 0101 0080 0101
A280    0080 0101 0080 0101    0080 0101 0080 0101
A290    0080 0101 0080 0101    0080 0101 0080 0101
A2A0    0080 0101 0080 0101    0080 0101 0080 0101
A2B0    0080 0101 0080 0101    0080 0101 0080 0101
A2C0    0080 0101 0080 0101    0080 0101 0080 0101
A2D0    0080 0101 0080 0101    0080 0101 0080 0101
A2E0    0080 0101 0080 0101    0080 0101 0080 0101
A2F0    0080 0101 0080 0101    0080 0101 0080 0101
A300    0080 0101 0080 0101    0080 0101 0080 0101
A310    0080 0101 0080 0101    0080 0101 0080 0101
A320    0080 0101 0080 0101    0080 0101 0080 0101
A330    0080 0101 0080 0101    0080 0101 0080 0101
A340    0080 0101 0080 0101    0080 0101 0080 0101
A350    0080 0101 0080 0101    0080 0101 0080 0101
A360    0080 0101 0080 0101    0080 0101 0080 0101
A370    0080 0101 0080 0101    0080 0101 0080 0101
A380    0080 0101 0080 0101    0080 0101 0080 0101
A390    0080 0101 0080 0101    0080 0101 0080 0101
A3A0    0080 0101 0080 0101    0080 0101 0080 0101
A3B0    0080 0101 0080 0101    0080 0101 0080 0101
A3C0    0080 0101 0080 0101    0080 0101 0080 0101
A3D0    0080 0101 0080 0101    0080 0101 0080 0101
A3E0    0080 0101 0080 0101    0080 0101 0080 0101
A3F0    0080 0101 0080 0101    0080 0101 0080 0101
A400    0080 0101 0080 0101    0080 0101 0080 0101
A410    0080 0101 0080 0101    0080 0101 0080 0101
A420    0080 0101 0080 0101    0080 0101 0080 0101
A430    0080 0101 0080 0101    0080 0101 0080 0101
A440    0080 0101 0080 0101    0080 0101 0080 0101
A450    0080 0101 0080 0101    0080 0101 0080 0101
A460    0080 0101 0080 0101    0080 0101 0080 0101
A470    0080 0101 0080 0101    0080 0101 0080 0101
A480    0080 0101 0080 0101    0080 0101 0080 0101
A490    0080 0101 0080 0101    0080 0101 0080 0101
A4A0    0080 0101 0080 0101    0080 0101 0080 0101
A4B0    0080 0101 0080 0101    0080 0101 0080 0101
A4C0    0080 0101 0080 0101    0080 0101 0080 0101
A4D0    0080 0101 0080 0101    0080 0101 0080 0101
A4E0    0080 0101 0080 0101    0080 0101 0080 0101
A4F0    0080 0101 0080 0101    0080 0101 0080 0101
```

```
A500   0080 0101 0080 0101   0080 0101 0080 0101
A510   0080 0101 0080 0101   0080 0101 0080 0101
A520   0080 0101 0080 0101   0080 0101 0080 0101
A530   0080 0101 0080 0101   0080 0101 0080 0101
A540   0080 0101 0080 0101   0080 0101 0080 0101
A550   0080 0101 0080 0101   0080 0101 0080 0101
A560   0080 0101 0080 0114   0079 7007 83E5 0283
A570   E602 8208 574F 5244   5245 4753 6901 1600
A580   7F83 8500 8385 0083   8500 8385 0083 8500
A590   8385 0083 8500 012E   007F 8202 6178 8800
A5A0   8202 6278 8802 8202   6378 8804 8202 6478
A5B0   8806 8202 7369 8808   8202 6469 880A 8205
A5C0   6366 6C61 6788 0C01   1400 7940 0883 E802
A5D0   83E9 0282 0842 5954   4552 4547 5369 0119
A5E0   007F 8384 0083 8400   8384 0083 8400 8384
A5F0   0083 8400 8384 0083   8400 0131 007F 8202
A600   616C 8800 8202 6168   8801 8202 626C 8802
A610   8202 6268 8803 8202   636C 8804 8202 6368
A620   8805 8202 646C 8806   8202 6468 8807 0110
A630   0079 7002 83EB 0283   EC02 8204 5245 4753
A640   6901 0700 7F83 E402   83E7 0201 0B00 7F82
A650   0178 8800 8201 6888   0001 0100 8001 0100
A660   8001 0100 8001 0100   8001 0100 8001 0100
A670   8001 0100 8001 0100   8001 0100 8001 0100
A680   8001 0100 8001 0100   8001 0100 8001 0100
A690   8001 0100 8001 0100   8001 0100 8001 0100
A6A0   8001 0100 8001 0100   8001 0100 8001 0100
A6B0   8001 0100 8001 0100   8001 0100 8001 0100
A6C0   8001 0100 8001 0100   8001 0100 8001 0100
A6D0   8001 0100 8001 0100   8001 0100 8001 0100
A6E0   8001 0100 8001 0100   8001 0100 8001 0100
A6F0   8001 0100 8001 0100   8001 0100 8001 0100
A700   8001 0100 8001 0100   8001 0100 8001 0100
A710   8001 0100 8001 0100   8001 0100 8001 0100
A720   8001 0100 8001 0100   8001 0100 8001 0100
A730   8001 0100 8001 0100   8001 0100 8001 0100
A740   8001 0100 8001 0100   8001 0100 8001 0100
A750   8001 0100 8001 0100   8001 0100 8001 0100
A760   8001 0100 8001 0100   8001 0100 8001 0100
A770   8001 0100 8001 0100   8001 0100 8001 0100
A780   8001 0100 8001 0100   8001 0100 8001 0100
A790   8001 0100 8001 0100   8001 0100 8001 0100
A7A0   8001 0100 8001 0100   8001 0100 8001 0100
A7B0   8001 0100 8001 0100   8001 0100 8001 0100
A7C0   8001 0100 8001 0100   8001 0100 8001 0100
A7D0   8001 0500 7800 8380   0001 0100 8001 0100
A7E0   8001 0100 8001 0100   8001 0100 8001 0100
A7F0   8001 0100 8001 0100   8001 0100 8001 0100
A800   8001 0100 8001 1800   7940 0783 5803 8359
A810   0382 0C57 494E 444F   575F 4652 414D 4569
A820   0116 007F 8384 0083   8400 8384 0083 8400
A830   8384 0083 8400 83A0   0001 2F00 7F82 0179
A840   8800 8201 7888 0182   0168 8802 8201 7788
A850   0382 0474 7970 6588   0482 0566 7261 6D65
A860   8805 8205 7469 746C   6588 0601 0100 8001
```

| | | | | | | | | |
|---|---|---|---|---|---|---|---|---|
| A870 | 0100 | 8001 | 0100 | 8001 | 0100 | 8001 | 0100 | 8001 |
| A880 | 0100 | 8001 | 0100 | 8001 | 0100 | 8001 | 0100 | 8001 |
| A890 | 0100 | 8001 | 0100 | 8001 | 0100 | 8001 | 0100 | 8001 |
| A8A0 | 0100 | 8001 | 0100 | 8001 | 0100 | 8001 | 1300 | 7A74 |
| A8B0 | 8357 | 0382 | 0C57 | 494E | 444F | 575F | 4652 | 414D |
| A8C0 | 4501 | 0100 | 8001 | 0100 | 8001 | 0100 | 8001 | 0100 |
| A8D0 | 8001 | 0C00 | 7930 | 0583 | 7003 | 8371 | 0382 | 0069 |
| A8E0 | 0110 | 007F | 8384 | 0083 | 8400 | 8384 | 0083 | 8400 |
| A8F0 | 83A4 | 0001 | 3A00 | 7F82 | 0777 | 696E | 5F72 | 6F77 |
| A900 | 8800 | 8207 | 7769 | 6E5F | 636F | 6C88 | 0182 | 0877 |
| A910 | 696E | 5F72 | 6F77 | 7388 | 0282 | 0877 | 696E | 5F63 |
| A920 | 6F6C | 7388 | 0382 | 0777 | 696E | 5F62 | 7566 | 8804 |
| A930 | 0101 | 0080 | 0105 | 0078 | 5883 | 8000 | 0107 | 0078 |
| A940 | 85E0 | 0183 | 6F03 | 0101 | 0080 | 0101 | 0080 | 0101 |
| A950 | 0080 | 0108 | 0075 | 8081 | 6300 | 8302 | 0201 | 0100 |
| A960 | 8001 | 0100 | 8001 | 0100 | 8001 | 0100 | 8001 | 0100 |
| A970 | 8001 | 0800 | 7580 | 8163 | 0083 | 0202 | 0101 | 0080 |
| A980 | 0101 | 0080 | 011C | 007F | 8384 | 0083 | 8400 | 8384 |
| A990 | 0083 | 8400 | 8384 | 0083 | 8400 | 8384 | 0083 | A400 |
| A9A0 | 8384 | 0001 | 0800 | 7580 | 8163 | 0983 | 8103 | 0105 |
| A9B0 | 0078 | 6083 | A000 | 0105 | 0078 | 1083 | 8000 | 0107 |
| A9C0 | 007A | 7483 | A000 | 8200 | 0107 | 007A | 7483 | 6F03 |
| A9D0 | 8200 | 0101 | 0080 | 0101 | 0080 | 0101 | 0080 | 0101 |
| A9E0 | 0080 | 0101 | 0080 | 0101 | 0080 | 0101 | 0080 | 0101 |
| A9F0 | 0080 | 0101 | 0080 | 0101 | 0080 | 0101 | 0080 | 0101 |
| AA00 | 0080 | 0101 | 0080 | 0101 | 0080 | 0108 | 0075 | 8081 |
| AA10 | 6300 | 8302 | 0201 | 0100 | 8001 | 0100 | 8001 | 0100 |
| AA20 | 8001 | 1300 | 7F83 | 8400 | 8384 | 0083 | 8400 | 8384 |
| AA30 | 0083 | 8400 | 8384 | 0001 | 0800 | 7580 | 8163 | 0683 |
| AA40 | 9903 | 0101 | 0080 | 010D | 007F | 8384 | 0083 | 8400 |
| AA50 | 8384 | 0083 | C400 | 0108 | 0075 | 8081 | 6304 | 839C |
| AA60 | 0301 | 0100 | 8001 | 0D00 | 7F83 | 8400 | 8384 | 0083 |
| AA70 | 8500 | 83C4 | 0001 | 0A00 | 7580 | 8384 | 0063 | 0483 |
| AA80 | 9F03 | 0101 | 0080 | 0101 | 0080 | 0101 | 0080 | 0113 |
| AA90 | 007F | 8384 | 0083 | 8400 | 8384 | 0083 | 8400 | 8384 |
| AAA0 | 0083 | 8100 | 0108 | 0075 | 8081 | 6306 | 83A4 | 0301 |
| AAB0 | 0800 | 7580 | 8163 | 0083 | 0202 | 0104 | 007F | 83A4 |
| AAC0 | 0001 | 0800 | 7580 | 8163 | 0183 | A703 | 0107 | 007F |
| AAD0 | 83A4 | 0083 | A400 | 0108 | 0075 | 8081 | 6302 | 83A9 |
| AAE0 | 0301 | 0700 | 7F83 | 8400 | 8384 | 0001 | 0800 | 7580 |
| AAF0 | 8163 | 0283 | AB03 | 0101 | 0080 | 0101 | 0080 | 0107 |
| AB00 | 007F | 8381 | 0083 | 8100 | 0108 | 0075 | 8081 | 6302 |
| AB10 | 83AF | 0301 | 0800 | 7580 | 8163 | 0083 | 0202 | 0108 |
| AB20 | 0075 | 8081 | 6300 | 8302 | 0201 | 0100 | 8001 | 0400 |
| AB30 | 7F83 | 6A03 | 0108 | 0075 | 8081 | 6301 | 83B4 | 0301 |
| AB40 | 0100 | 8001 | 0700 | 7F83 | 6A03 | 83A0 | 0001 | 0800 |
| AB50 | 7580 | 8163 | 0283 | B703 | 0101 | 0080 | 0104 | 007F |
| AB60 | 836A | 0301 | 0800 | 7580 | 8163 | 0183 | BA03 | 0101 |
| AB70 | 0080 | 0107 | 007F | 83A4 | 0083 | A400 | 0108 | 0075 |
| AB80 | 8081 | 6302 | 83BD | 0301 | 0700 | 7F83 | 8400 | 8384 |
| AB90 | 0001 | 0800 | 7580 | 8163 | 0283 | BF03 | 0103 | 0072 |
| ABA0 | 8074 | 0103 | 0072 | 8073 | 0101 | 0080 | 0101 | 0080 |
| ABB0 | 0101 | 0080 | 0101 | 0080 | 0101 | 0080 | 0101 | 0080 |
| ABC0 | 0101 | 0080 | 0101 | 0080 | 0101 | 0080 | 0101 | 0080 |
| ABD0 | 0101 | 0080 | 0101 | 0080 | 0101 | 0080 | 0101 | 0080 |

| | | | | | | | | |
|---|---|---|---|---|---|---|---|---|
| ABE0 | 0101 | 0080 | 0101 | 0080 | 0101 | 0080 | 0101 | 0080 |
| ABF0 | 0101 | 0080 | 0101 | 0080 | 0101 | 0080 | 0101 | 0080 |
| AC00 | 0101 | 0080 | 0101 | 0080 | 0101 | 0080 | 0101 | 0080 |
| AC10 | 0101 | 0080 | 0101 | 0080 | 0101 | 0080 | 0101 | 0080 |
| AC20 | 0101 | 0080 | 0101 | 0080 | 0101 | 0080 | 0101 | 0080 |
| AC30 | 0101 | 0080 | 0101 | 0080 | 0101 | 0080 | 0101 | 0080 |
| AC40 | 0101 | 0080 | 0101 | 0080 | 0101 | 0080 | 0101 | 0080 |
| AC50 | 0101 | 0080 | 0101 | 0080 | 0101 | 0080 | 0101 | 0080 |
| AC60 | 0101 | 0080 | 0101 | 0080 | 0101 | 0080 | 0101 | 0080 |
| AC70 | 0101 | 0080 | 0101 | 0080 | 0101 | 0080 | 0101 | 0080 |
| AC80 | 0101 | 0080 | 0101 | 0080 | 0101 | 0080 | 0101 | 0080 |
| AC90 | 0101 | 0080 | 0101 | 0080 | 0101 | 0080 | 0101 | 0080 |
| ACA0 | 0101 | 0080 | 0101 | 0080 | 0101 | 0080 | 0101 | 0080 |
| ACB0 | 0101 | 0080 | 0101 | 0080 | 0101 | 0080 | 0101 | 0080 |
| ACC0 | 0101 | 0080 | 0101 | 0080 | 0101 | 0080 | 0101 | 0080 |
| ACD0 | 0101 | 0080 | 0101 | 0080 | 0101 | 0080 | 0101 | 0080 |
| ACE0 | 0101 | 0080 | 0101 | 0080 | 0101 | 0080 | 0101 | 0080 |
| ACF0 | 0101 | 0080 | 0101 | 0080 | 0101 | 0080 | 0101 | 0080 |
| AD00 | 0101 | 0080 | 0101 | 0080 | 0101 | 0080 | 0101 | 0080 |
| AD10 | 0101 | 0080 | 0101 | 0080 | 0101 | 0080 | 0101 | 0080 |
| AD20 | 0101 | 0080 | 0101 | 0080 | 0101 | 0080 | 0101 | 0080 |
| AD30 | 0101 | 0080 | 0101 | 0080 | 0101 | 0080 | 0101 | 0080 |
| AD40 | 0101 | 0080 | 0101 | 0080 | 0101 | 0080 | 0101 | 0080 |
| AD50 | 0101 | 0080 | 0101 | 0080 | 0101 | 0080 | 0101 | 0080 |
| AD60 | 0101 | 0080 | 0101 | 0080 | 0101 | 0080 | 0101 | 0080 |
| AD70 | 0101 | 0080 | 0101 | 0080 | 0101 | 0080 | 0101 | 0080 |
| AD80 | 0101 | 0080 | 0101 | 0080 | 0101 | 0080 | 0101 | 0080 |
| AD90 | 0101 | 0080 | 0101 | 0080 | 0101 | 0080 | 0101 | 0080 |
| ADA0 | 0101 | 0080 | 0101 | 0080 | 0101 | 0080 | 0101 | 0080 |
| ADB0 | 0101 | 0080 | 0101 | 0080 | 0101 | 0080 | 0101 | 0080 |
| ADC0 | 0101 | 0080 | 0101 | 0080 | 0101 | 0080 | 0101 | 0080 |
| ADD0 | 0101 | 0080 | 0101 | 0080 | 0101 | 0080 | 0101 | 0080 |
| ADE0 | 0101 | 0080 | 0101 | 0080 | 0101 | 0080 | 0101 | 0080 |
| ADF0 | 0101 | 0080 | 0101 | 0080 | 0101 | 0080 | 0101 | 0080 |
| AE00 | 0101 | 0080 | 0101 | 0080 | 0101 | 0080 | 0101 | 0080 |
| AE10 | 0101 | 0080 | 0101 | 0080 | 0101 | 0080 | 0101 | 0080 |
| AE20 | 0101 | 0080 | 0101 | 0080 | 0101 | 0080 | 0101 | 0080 |
| AE30 | 0101 | 0080 | 0101 | 0080 | 0101 | 0080 | 0101 | 0080 |
| AE40 | 0101 | 0080 | 0101 | 0080 | 0101 | 0080 | 0101 | 0080 |
| AE50 | 0101 | 0080 | 0101 | 0080 | 0101 | 0080 | 0101 | 0080 |
| AE60 | 0101 | 0080 | 0101 | 0080 | 0101 | 0080 | 0101 | 0080 |
| AE70 | 0101 | 0080 | 0101 | 0080 | 0101 | 0080 | 0101 | 0080 |
| AE80 | 0101 | 0080 | 0101 | 0080 | 0101 | 0080 | 0101 | 0080 |
| AE90 | 0101 | 0080 | 0101 | 0080 | 0101 | 0080 | 0101 | 0080 |
| AEA0 | 0101 | 0080 | 0101 | 0080 | 0101 | 0080 | 0101 | 0080 |
| AEB0 | 0101 | 0080 | 0101 | 0080 | 0101 | 0080 | 0101 | 0080 |
| AEC0 | 0101 | 0080 | 0101 | 0080 | 0101 | 0080 | 0101 | 0080 |
| AED0 | 0101 | 0080 | 0101 | 0080 | 0101 | 0080 | 0101 | 0080 |
| AEE0 | 0101 | 0080 | 0101 | 0080 | 0101 | 0080 | 0101 | 0080 |
| AEF0 | 0101 | 0080 | 0101 | 0080 | 0101 | 0080 | 0101 | 0080 |
| AF00 | 0101 | 0080 | 0101 | 0080 | 0101 | 0080 | 0101 | 0080 |
| AF10 | 0101 | 0080 | 0101 | 0080 | 0101 | 0080 | 0101 | 0080 |
| AF20 | 0101 | 0080 | 0101 | 0080 | 0101 | 0080 | 0101 | 0080 |
| AF30 | 0101 | 0080 | 0101 | 0080 | 0101 | 0080 | 0101 | 0080 |
| AF40 | 0101 | 0080 | 0101 | 0080 | 0101 | 0080 | 0101 | 0080 |

```
AF50    0101 0080 0101 0080    0101 0080 0101 0080
AF60    0101 0080 0101 0080    0101 0080 0101 0080
AF70    0101 0080 0101 0080    0101 0080 0101 0080
AF80    0101 0080 0101 0080    0101 0080 0101 0080
AF90    0101 0080 0101 0080    0101 0080 0101 0080
AFA0    0101 0080 0101 0080    0101 0080 0101 0080
AFB0    0101 0080 0101 0080    0101 0080 0101 0080
AFC0    0101 0080 0101 0080    0101 0080 0101 0080
AFD0    0101 0080 0101 0080    0101 0080 0101 0080
AFE0    0101 0080 0101 0080    0101 0080 0101 0080
AFF0    0101 0080 0101 0080    0101 0080 0101 0080
B000    0101 0080 0101 0080    0101 0080 0101 0080
B010    0101 0080 0101 0080    0101 0080 0101 0080
B020    0101 0080 0101 0080    0101 0080 0101 0080
B030    0101 0080 0101 0080    0101 0080 0101 0080
B040    0101 0080 0101 0080    0101 0080 0101 0080
B050    0101 0080 0101 0080    0101 0080 0101 0080
B060    0101 0080 0101 0080    0101 0080 0101 0080
B070    0101 0080 0101 0080    0101 0080 0101 0080
B080    0101 0080 0101 0080    0101 0080 0101 0080
B090    0101 0080 0101 0080    0101 0080 0101 0080
B0A0    0101 0080 0101 0080    0101 0080 0101 0080
B0B0    0101 0080 0101 0080    0101 0080 0101 0080
B0C0    0101 0080 0101 0080    0101 0080 0101 0080
B0D0    0101 0080 0101 0080    0101 0080 0101 0080
B0E0    0101 0080 0101 0080    0101 0080 0101 0080
B0F0    0101 0080 0101 0080    0101 0080 0101 0080
B100    0101 0080 0101 0080    0101 0080 0101 0080
B110    0101 0080 0101 0080    0101 0080 0101 0080
B120    0101 0080 0101 0080    0101 0080 0101 0080
B130    0101 0080 0101 0080    0101 0080 0101 0080
B140    0101 0080 0101 0080    0101 0080 0101 0080
B150    0101 0080 0101 0080    0101 0080 0101 0080
B160    0118 0079 4007 836F    0383 7003 820C 5749
B170    4E44 4F57 5F46 5241    4D45 6901 1600 7F83
B180    8400 8384 0083 8400    8384 0083 8400 8384
B190    0083 A000 012F 007F    8201 7988 0082 0178
B1A0    8801 8201 6888 0282    0177 8803 8204 7479
B1B0    7065 8804 8205 6672    616D 6588 0582 0574
B1C0    6974 6C65 8806 0101    0080 0101 0080 0101
B1D0    0080 0101 0080 0101    0080 0101 0080 0101
B1E0    0080 0101 0080 0101    0080 0101 0080 0101
B1F0    0080 0101 0080 0101    0080 0101 0080 0101
B200    0080 0101 0080 0101    0080 0101 0080 0101
B210    0080 0101 0080 0101    0080 0101 0080 0107
B220    0078 8520 0383 8803    0107 0078 85C8 0083
B230    8000 0113 0079 8570    0307 838A 0383 8B03
B240    8205 5041 5241 4D69    0116 007F 8384 0083
B250    8400 83A4 0083 8400    8385 0083 8500 8387
B260    0301 3A00 7F82 0368    5F79 8800 8203 685F
B270    7888 0182 0668 6561    6465 7288 0282 0366
B280    5F78 8804 8203 7661    6C88 0682 0474 7970
B290    6588 0882 076F 7074    696F 6E73 880A 0115
B2A0    0079 1001 838D 0383    8E03 8209 5041 5241
B2B0    4D5F 5343 5269 0104    007F 8385 0001 1100
```

| | | | | | | | | |
|---|---|---|---|---|---|---|---|---|
| B2C0 | 7F82 | 0C6E | 6D5F | 6F66 | 5F70 | 6172 | 616D | 7388 |
| B2D0 | 0001 | 0100 | 8001 | 0100 | 8001 | 0100 | 8001 | 0100 |
| B2E0 | 8001 | 0100 | 8001 | 0100 | 8001 | 0100 | 8001 | 0100 |
| B2F0 | 8001 | 0100 | 8001 | 0C00 | 7A74 | 8389 | 0382 | 0550 |
| B300 | 4152 | 414D | 0101 | 0080 | 0101 | 0080 | 0110 | 007A |
| B310 | 7483 | 8C03 | 8209 | 5041 | 5241 | 4D5F | 5343 | 5201 |
| B320 | 0100 | 8001 | 0100 | 8001 | 0100 | 8001 | 0100 | 8001 |
| B330 | 0100 | 8001 | 0100 | 8001 | 0100 | 8001 | 0700 | 7885 |
| B340 | A014 | 8389 | 0301 | 0500 | 7838 | 8380 | 0001 | 0100 |
| B350 | 8001 | 0500 | 7850 | 8380 | 0001 | 0100 | 8001 | 0700 |
| B360 | 7885 | A800 | 8380 | 0001 | 0700 | 7885 | D800 | 8380 |
| B370 | 0001 | 0700 | 7885 | 4001 | 836E | 0301 | 0500 | 7878 |
| B380 | 8380 | 0001 | 0500 | 7868 | 8380 | 0001 | 0700 | 7885 |
| B390 | D025 | 8389 | 0301 | 0100 | 8001 | 0500 | 7818 | 8380 |
| B3A0 | 0001 | 0500 | 7808 | 8380 | 0001 | 0100 | 8001 | 0500 |
| B3B0 | 7828 | 8380 | 0001 | 0100 | 8001 | 0700 | 7885 | 1018 |
| B3C0 | 8389 | 0301 | 0100 | 8001 | 0500 | 7858 | 8380 | 0001 |
| B3D0 | 0700 | 7885 | 801B | 8389 | 0301 | 0700 | 7885 | C000 |
| B3E0 | 8380 | 0001 | 0700 | 7885 | 8000 | 8380 | 0001 | 0700 |
| B3F0 | 7885 | 8800 | 8380 | 0001 | 0700 | 7885 | 9000 | 8380 |
| B400 | 0001 | 0700 | 7885 | 9800 | 8380 | 0001 | 0700 | 7885 |
| B410 | A000 | 8380 | 0001 | 0700 | 7885 | C00D | 8389 | 0301 |
| B420 | 0500 | 7860 | 8380 | 0001 | 0700 | 7885 | E006 | 8389 |
| B430 | 0301 | 0100 | 8001 | 0700 | 7885 | 4809 | 83C3 | 0301 |
| B440 | 0700 | 7885 | 0801 | 8380 | 0001 | 0100 | 8001 | 0100 |
| B450 | 8001 | 0100 | 8001 | 0100 | 8001 | 0100 | 8001 | 0100 |
| B460 | 8001 | 0100 | 8001 | 0100 | 8001 | 0100 | 8001 | 0100 |
| B470 | 8001 | 0100 | 8001 | 0500 | 7850 | 8380 | 0001 | 0400 |
| B480 | 7F83 | 8500 | 010A | 0075 | 8083 | 8500 | 6301 | 83D0 |
| B490 | 0301 | 0100 | 8001 | 0100 | 8001 | 0100 | 8001 | 0100 |
| B4A0 | 8001 | 0100 | 8001 | 0100 | 8001 | 0100 | 8001 | 0100 |
| B4B0 | 8001 | 0100 | 8001 | 0100 | 8001 | 0100 | 8001 | 0100 |
| B4C0 | 8001 | 0100 | 8001 | 0100 | 8001 | 0100 | 8001 | 0100 |
| B4D0 | 8001 | 0700 | 7885 | 2002 | 8380 | 0001 | 0100 | 8001 |
| B4E0 | 0400 | 7F83 | 8500 | 0108 | 0075 | 8081 | 6301 | 83E4 |
| B4F0 | 0301 | 0100 | 8001 | 0100 | 8001 | 0100 | 8001 | 0100 |
| B500 | 8001 | 0100 | 8001 | 0100 | 8001 | 0100 | 8001 | 0100 |
| B510 | 8001 | 0100 | 8001 | 0100 | 8001 | 0100 | 8001 | 0100 |
| B520 | 8001 | 0100 | 8001 | 0100 | 8001 | 0100 | 8001 | 0400 |
| B530 | 7F83 | 8500 | 0108 | 0075 | 8081 | 6301 | 83F5 | 0301 |
| B540 | 0400 | 7F83 | 8500 | 0108 | 0075 | 8081 | 6301 | 83F7 |
| B550 | 0301 | 0400 | 7F83 | 8500 | 0108 | 0075 | 8081 | 6301 |
| B560 | 83F9 | 0301 | 0400 | 7F83 | 9803 | 010A | 0075 | 8083 |
| B570 | 8500 | 6301 | 83FB | 0301 | 0700 | 7F83 | 9B03 | 8398 |
| B580 | 0301 | 0A00 | 7580 | 8385 | 0063 | 0283 | FD03 | 0101 |
| B590 | 0080 | 0101 | 0080 | 0101 | 0080 | 0101 | 0080 | 0101 |
| B5A0 | 0080 | 0101 | 0080 | 0101 | 0080 | 0101 | 0080 | 0101 |
| B5B0 | 0080 | 0107 | 007F | 839B | 0383 | 9803 | 010A | 0075 |
| B5C0 | 8083 | 8500 | 6302 | 8308 | 0401 | 0400 | 7F83 | 8500 |
| B5D0 | 0108 | 0075 | 8081 | 6301 | 830A | 0401 | 0700 | 7885 |
| B5E0 | D000 | 8380 | C001 | 0A00 | 7F83 | A400 | 83A4 | 0083 |
| B5F0 | 8500 | 0108 | C075 | 8081 | 6303 | 830D | 0401 | 0500 |
| B600 | 7818 | 8380 | 0001 | 0100 | 8001 | 0100 | 8001 | 0100 |
| B610 | 8001 | 0A00 | 7F83 | A400 | 83A4 | 0083 | 8500 | 0108 |
| B620 | 0075 | 8081 | 6303 | 8313 | 0401 | 0100 | 8001 | 0100 |

```
B630   8001 0100 8001 0100   8001 0100 8001 0100
B640   8001 0100 8001 0100   8001 0100 8001 0100
B650   8001 0100 8001 0100   8001 0100 8001 0100
B660   8001 1200 7940 0583   0F02 8310 0282 065F
B670   696F 6275 6669 0110   007F 83A0 0083 8100
B680   83A0 0083 8000 8380   0001 2C00 7F82 045F
B690   7074 7288 0082 045F   636E 7488 0282 055F
B6A0   6261 7365 8804 8205   5F66 6C61 6788 0682
B6B0   055F 6669 6C65 8807   0101 0080 010D 007A
B6C0   7483 0E02 8206 5F69   6F62 7566 0101 0080
B6D0   0101 0080 0101 0080   0101 0080 0101 0080
B6E0   0101 0080 0101 0080   0101 0080 0101 0080
B6F0   0101 0080 0101 0080   0101 0080 0101 0080
B700   0101 0080 0101 0080   0101 0080 0101 0080
B710   0101 0080 0101 0080   0101 0080 0101 0080
B720   0101 0080 0101 0080   0101 0080 0101 0080
B730   0101 0080 0101 0080   0101 0080 0101 0080
B740   0101 0080 0101 0080   0101 0080 0101 0080
B750   0101 0080 0101 0080   0101 0080 0101 0080
B760   0101 0080 0101 0080   0101 0080 0101 0080
B770   0101 0080 0101 0080   0101 0080 0101 0080
B780   0101 0080 0101 0080   0101 0080 0101 0080
B790   0101 0080 0101 0080   0101 0080 0101 0080
B7A0   0101 0080 0101 0080   0101 0080 0101 0080
B7B0   0101 0080 0101 0080   0101 0080 0101 0080
B7C0   0101 0080 0101 0080   0101 0080 0101 0080
B7D0   0101 0080 0101 0080   0101 0080 0101 0080
B7E0   0101 0080 0101 0080   0101 0080 0101 0080
B7F0   0101 0080 0101 0080   0101 0080 0101 0080
B800   0101 0080 0101 0080   0101 0080 0101 0080
B810   0101 0080 0101 0080   0101 0080 0101 0080
B820   0101 0080 0101 0080   0101 0080 0101 0080
B830   0101 0080 0101 0080   0101 0080 0101 0080
B840   0101 0080 0101 0080   0101 0080 0101 0080
B850   0101 0080 0101 0080   0101 0080 0101 0080
B860   0101 0080 0101 0080   0101 0080 0101 0080
B870   0101 0080 0101 0080   0101 0080 0101 0080
B880   0101 0080 0101 0080   0101 0080 0101 0080
B890   0101 0080 0101 0080   0101 0080 0101 0080
B8A0   0101 0080 0101 0080   0101 0080 0101 0080
B8B0   0101 0080 0101 0080   0101 0080 0101 0080
B8C0   0101 0080 0101 0080   0101 0080 0101 0080
B8D0   0101 0080 0101 0080   0101 0080 0101 0080
B8E0   0101 0080 0101 0080   0101 0080 0101 0080
B8F0   0101 0080 0101 0080   0101 0080 0101 0080
B900   0101 0080 0101 0080   0101 0080 0101 0080
B910   0101 0080 0101 0080   0101 0080 0101 0080
B920   0101 0080 0101 0080   0101 0080 0101 0080
B930   0101 0080 0101 0080   0101 0080 0101 0080
B940   0101 0080 0101 0080   0101 0080 0101 0080
B950   0101 0080 0101 0080   0101 0080 0101 0080
B960   0101 0080 0101 0080   0101 0080 0101 0080
B970   0101 0080 0101 0080   0101 0080 0101 0080
B980   0101 0080 0101 0080   0101 0080 0101 0080
B990   0101 0080 0101 0080   0101 0080 0101 0080
```

```
B9A0   0101 0080 0101 0080   0101 0080 0101 0080
B9B0   0101 0080 0101 0080   0101 0080 0101 0080
B9C0   0101 0080 0101 0080   0101 0080 0101 0080
B9D0   0101 0080 0101 0080   0101 0080 0101 0080
B9E0   0101 0080 0101 0080   0101 0080 0101 0080
B9F0   0101 0080 0101 0080   0101 0080 0101 0080
BA00   0101 0080 0101 0080   0101 0080 0101 0080
BA10   0101 0080 0101 0080   0101 0080 0101 0080
BA20   0101 0080 0101 0080   0101 0080 0101 0080
BA30   0101 0080 0101 0080   0101 0080 0101 0080
BA40   0101 0080 0101 0080   0101 0080 0101 0080
BA50   0101 0080 0101 0080   0101 0080 0101 0080
BA60   0101 0080 0101 0080   0101 0080 0101 0080
BA70   0101 0080 0101 0080   0101 0080 0101 0080
BA80   0101 0080 0101 0080   0101 0080 0101 0080
BA90   0101 0080 0101 0080   0101 0080 0101 0080
BAA0   0101 0080 0101 0080   0101 0080 0101 0080
BAB0   0101 0080 0101 0080   0101 0080 0101 0080
BAC0   0101 0080 0101 0080   0101 0080 0101 0080
BAD0   0101 0080 0101 0080   0101 0080 0101 0080
BAE0   0101 0080 0101 0080   0101 0080 0101 0080
BAF0   0101 0080 0101 0080   0101 0080 0101 0080
BB00   0101 0080 0101 0080   0101 0080 0101 0080
BB10   0101 0080 0101 0080   0101 0080 0101 0080
BB20   0101 0080 0101 0080   0101 0080 0101 0080
BB30   0101 0080 0101 0080   0101 0080 0101 0080
BB40   0101 0080 0101 0080   0101 0080 0101 0080
BB50   0101 0080 0101 0080   0101 0080 0101 0080
BB60   0101 0080 0101 0080   0101 0080 0101 0080
BB70   0101 0080 0101 0080   0101 0080 0101 0080
BB80   0101 0080 0101 0080   0101 0080 0101 0080
BB90   0101 0080 0101 0080   0101 0080 0101 0080
BBA0   0101 0080 0101 0080   0101 0080 0101 0080
BBB0   0101 0080 0101 0080   0101 0080 0101 0080
BBC0   0101 0080 0101 0080   0101 0080 0101 0080
BBD0   0101 0080 0101 0080   0101 0080 0101 0080
BBE0   0101 0080 0101 0080   0101 0080 0101 0080
BBF0   0101 0080 0101 0080   0101 0080 0101 0080
BC00   0101 0080 0101 0080   0101 0080 0101 0080
BC10   0101 0080 0101 0080   0101 0080 0101 0080
BC20   0101 0080 0101 0080   0101 0080 0101 0080
BC30   0101 0080 0101 0080   0118 0079 4007 836F
BC40   0383 7003 820C 5749   4E44 4F57 5F46 5241
BC50   4D45 6901 1600 7F83   8400 8384 0083 8400
BC60   8384 0083 8400 8384   0083 A000 012F 007F
BC70   8201 7988 0082 0178   8801 8201 6888 0282
BC80   0177 8803 8204 7479   7065 8804 8205 6672
BC90   616D 6588 0582 0574   6974 6C65 8806 0101
BCA0   0080 0101 0080 0101   0080 0101 0080 0101
BCB0   0080 0101 0080 0101   0080 0101 0080 0101
BCC0   0080 0101 0080 0101   0080 0101 0080 0101
BCD0   0080 0101 0080 0101   0080 0101 0080 0101
BCE0   0080 0101 0080 0101   0080 0101 0080 0101
BCF0   0080 0101 0080 0101   0080 0101 0080 0101
BD00   0080 0101 0080 0101   0080 0101 0080 0101
```

```
BD10    0080 0101 0080 0101    0080 0101 0080 0101
BD20    0080 0101 0080 0101    0080 0101 0080 0101
BD30    0080 0101 0080 0101    0080 0101 0080 0101
BD40    0080 0101 0080 0101    0080 0101 0080 0101
BD50    0080 0101 0080 0101    0080 0101 0080 0101
BD60    0080 0101 0080 0101    0080 0101 0080 0101
BD70    0080 0101 0080 0101    0080 0101 0080 0101
BD80    0080 0101 0080 0108    0075 8081 6300 8302
BD90    0201 0100 8001 0100    8001 0100 8001 0100
BDA0    8001 0100 8001 0100    8001 0100 8001 0700
BDB0    7885 E800 8380 0001    1300 7F83 8100 8381
BDC0    0083 A000 8380 0083    8000 8380 0001 0800
BDD0    7580 8163 0683 B403    0105 0078 1883 8000
BDE0    0107 0078 8590 0283    8000 0101 0080 0101
BDF0    0080 0101 0080 0107    007F 83A0 0083 1202
BE00    0108 0075 8081 6302    83BB 0301 0100 8001
BE10    0100 8001 0100 8001    0500 7810 8380 0001
BE20    0400 7F83 A400 0108    0075 8081 6301 83C1
BE30    0301 0100 8001 0100    8001 0100 8001 0100
BE40    8001 0500 7860 8380    0001 0100 8001 0100
BE50    8001 0100 8001 0100    8001 0400 7F83 A400
BE60    010A 0075 8083 8500    6301 83CC 0301 0700
BE70    7885 8002 8380 0001    0100 8001 0100 8001
BE80    0100 8001 0100 8001    0100 8001 0100 8001
BE90    0500 7878 8380 0001    0700 7F83 A400 83A4
BEA0    0001 0800 7580 8163    0283 D603 0107 0078
BEB0    8598 0083 8000 0105    0078 7083 0107 0078
BEC0    0078 8590 0083 8000    0107 0078 85E0 0083
BED0    8000 0101 0080 0101    0080 0101 0080 0105
BEE0    0078 1883 8000 0104    007F 83A4 0001 0800
BEF0    7580 8163 0183 E003    0105 0078 4083 8000
BF00    0107 0078 85C0 0083    8000 0105 0078 0883
BF10    8000 0104 007F 83A4    0001 0800 7580 8163
BF20    0183 E503 0105 0078    5083 8000 0101 0080
BF30    0101 0080 0101 0080    0101 0080 0104 007F
BF40    83A4 0001 0A00 7580    8385 0063 0183 EC03
BF50    0105 0078 1083 8000    0107 0078 85B0 0083
BF60    8000 0101 0080 0101    0080 0101 0080 010A
BF70    0075 8083 8500 6300    8302 0201 0500 7860
BF80    8380 0001 0100 8001    0100 8001 0100 8001
BF90    0100 8001 0100 8001    0100 8001 0100 8001
BFA0    0100 8001 0100 8001    0500 7828 8380 0001
BFB0    0100 8001 0800 7580    8163 0083 0202 0107
BFC0    0078 8580 0283 8000    1301 1000 C203 9F00
BFD0    0600 9B00 0000 0004    6D61 696E 0500 1600
BFE0    9500 0A04 0400 8500    0461 7267 630A 0406
BFF0    00BE 0304 6172 6776    0704 AEFF 8400 0169
C000    0704 ACFF 8500 016A    0904 B0FF C303 0373
C010    7472 0102 0102 1801    B000 D803 1F01 A800
C020    6B04 0000 0009 5275    6E53 6372 6565 6E05
C030    00B8 00C3 030C 0404    0097 0306 7363 7265
C040    656E 0B04 0600 9403    0570 6172 616D 0B04
C050    F8FF 8500 056B 6272    6573 0C04 FCFF 8400
C060    066B 6273 6361 6E0C    04FE FF84 0006 6B62
C070    4259 5445 0804 F2FF    8500 026E 6E08 04F0
```

```
C080   FF85 0002 6E31 0704   F6FF 8500 0169 0704
C090   FAFF 8500 0173 0804   F4FF 8100 0269 3105
C0A0   0092 024B 0007 04EE   FF80 0001 7001 0205
C0B0   005B 031E 0007 04EE   FF12 0201 7401 0205
C0C0   008C 038F 0008 04DE   FFF2 0302 6E6E 0804
C0D0   EEFF 1202 0266 6801   0201 0201 0216 017C
C0E0   04FB 0350 0173 04B7   0500 0000 0767 6574
C0F0   5F76 616C 0500 8304   4401 0B04 0400 9403
C100   0570 6172 616D 0C04   D6FF FC03 066E 6577
C110   7661 6C0D 051A 05C4   05C3 0305 626C 6E6B
C120   7307 04FA FF84 0001   6907 04FE FF85 0001
C130   7308 04FC FF85 0002   7331 0500 8205 1700
C140   0D04 C2FF 0604 0766   6F72 6D61 7431 0102
C150   0102 0102 2001 CC05   0704 5B00 C305 1206
C160   0000 0011 6275 696C   645F 7061 636B 6574
C170   5F73 7472 7305 00D3   054F 0007 04FE FF84
C180   0001 6907 04FC FF84   0001 6A01 0201 021C
C190   0128 0609 0404 0220   0616 0800 0000 0D62
C1A0   7569 6C64 5F70 6163   6B65 7473 0500 3006
C1B0   F601 0B04 E8FF 8400   0563 6F75 6E74 0E04
C1C0   E2FF 8500 0872 6561   6473 6565 6410 04E4
C1D0   FF0A 040A 7665 725F   7261 6E64 6F6D 0F04
C1E0   EAFF 0B04 0964 756D   625F 696E 666F 0704
C1F0   E6FF 8400 0169 0102   0102 1C01 2C08 1604
C200   CB00 2408 E108 0000   000D 6275 696C 645F
C210   7061 636B 6574 3005   0034 08BD 000B 04FA
C220   FF85 0005 636F 756E   740D 04FC FF85 0007
C230   6368 616E 6E65 6C07   04FE FF85 0001 6901
C240   0201 0218 01F8 081F   046E 00EF 0851 0900
C250   0000 094D 6978 4275   6666 6572 0500 FF08
C260   6200 0D04 0400 A400   0762 7566 5F70 7472
C270   0D04 0600 8500 0762   7566 5F6C 656E 0F04
C280   FEFF A400 096D 6978   5F74 6162 6C65 0F04
C290   F8FF 8500 0969 7465   7261 7469 6F6E 0D04
C2A0   FAFF 8500 0762 7566   5F70 6F73 0E04 FCFF
C2B0   8400 086E 6577 5F63   6861 7201 0201 021C
C2C0   0166 0921 04D3 005E   0923 0A00 0000 0D75
C2D0   7064 6174 655F 7061   7261 6D73 0500 6E09
C2E0   C500 0704 FEFF 8100   0169 0102 0102 1A01
C2F0   3A0A 2204 3201 330A   560B 0000 000B 5265
C300   6164 5061 636B 6574   7305 0043 0A23 0109
C310   04FC FE23 0403 7374   7207 04FE FFA0 0001
C320   7307 04FC FF81 0001   6907 04FA FE81 0001
C330   6A01 0201 0217 016C   0B2B 04B4 0164 0B0A
C340   0D00 0000 0872 7332   5F63 6F6D 6D05 0074
C350   0BA6 0109 0404 0084   0003 636D 6409 04AC
C360   FFC3 0303 7374 720F   04FE FF84 0009 6368
C370   6563 6B5F 7375 6D07   04FC FF84 0001 6901
C380   0201 021D 0120 0D37   0467 0017 0D72 0D00
C390   0000 0E63 6F6D 7075   7465 5F63 686B 7375
C3A0   6D05 0027 0D5B 0007   0404 0084 0001 6208
C3B0   0406 00A4 0002 6172   0C04 0800 8500 066C
C3C0   656E 6774 6807 04FE   FF85 0001 6908 04FC
C3D0   FF85 0002 636B 0102   0102 1601 880D 3904
C3E0   3000 7F0D A30D 0000   0007 506B 7443 6B73
```

```
C3F0   6D05 008F 0D24 0007   04FC FF84 0001 6A0C
C400   0404 00A4 0006 7061   636B 6574 0704 FEFF
C410   8100 0169 0102 0102   1A01 B80D 3A04 5C00
C420   AE0D 000E 0000 000B   5061 696E 7453 6372
C430   6565 6E05 00BE 0D52   0007 04FE FF85 0001
C440   6901 0201 021E 0114   0E3B 046D 0004 0E70
C450   0E00 0000 0F70 7269   6E74 5F66 756E 635F
C460   6C69 6E65 0102 1901   820E 4004 1A01 780E
C470   880F 0000 000A 5072   696E 7450 6172 616D
C480   0500 880E 1001 0B04   0400 9403 0570 6172
C490   616D 0904 0600 8500   036D 6F64 0704 FEFF
C4A0   8500 0169 0C05 7608   C405 C303 0462 6C6E
C4B0   6B01 0201 021B 019C   0F42 0454 0094 0FDA
C4C0   0F00 0000 0C69 6E69   745F 7061 636B 6574
C4D0   7305 00A4 0F46 0007   04FE FF85 0001 6907
C4E0   04FC FF85 0001 6A01   0201 020A 052E 24C4
C4F0   0584 0002 6370 0A05   8128 C405 8400 0270
C500   7009 05B6 05C4 051A   0401 6E11 05B6 06C4
C510   051C 0409 7461 626C   655F 6164 640E 0558
C520   27C4 05AF 0306 7061   636B 6574 1305 2F24
C530   C405 AF03 0B73 656E   645F 7061 636B 6574
C540   1205 B020 C405 B203   0A70 6163 6B65 745F
C550   7374 720C 052C 24C4   0512 0204 7062 6668
C560   0E05 822A C405 8100   0670 625F 6374 7214
C570   01F0 0F78 037E 0006   007A 0000 0000 0557
C580   696E 6974 0500 F60F   7400 0A04 F2FF EA02
C590   0472 6567 7301 0201   0214 016E 107E 032D
C5A0   007E 00AA 0000 0000   0557 7465 726D 0102
C5B0   1401 9C10 8203 5602   B300 FD02 0000 0005
C5C0   576F 7065 6E05 00A3   104A 020C 0414 0084
C5D0   0006 7463 6F6C 6F72   1305 F608 C405 8303
C5E0   0B73 696E 676C 6566   7261 6D65 1305 0209
C5F0   C405 8303 0B64 6F75   626C 6566 7261 6D65
C600   1204 EEFF 8503 0C63   7572 7265 6E74 6672
C610   616D 650F 04F0 FF86   0309 7769 6E64 6F77
C620   7074 720F 04F4 FFC4   0009 7363 7265 656E
C630   7074 720F 04FC FFC4   0009 7769 6E62 7566
C640   7074 720D 04F2 FF84   0007 6C61 7374 726F
C650   770D 04FA FF84 0007   6C61 7374 636F 6C0D
C660   04F8 FF85 0007 6375   7272 726F 7709 0404
C670   0084 0003 726F 7709   0406 0084 0003 636F
C680   6C0A 0408 0084 0004   726F 7773 0A04 0A00
C690   8400 0463 6F6C 730B   040C 0084 0005 636F
C6A0   6C6F 720B 040E 0084   0005 6672 616D 650C
C6B0   0410 0084 0006 6663   6F6C 6F72 0B04 1200
C6C0   A400 0574 6974 6C65   0102 0102 1501 F212
C6D0   9503 8A00 0803 8803   0000 0006 5763 6C6F
C6E0   7365 0500 F812 8000   0F04 F4FF 8603 0977
C6F0   696E 646F 7770 7472   0F04 F6FF C400 0973
C700   6372 6565 6E70 7472   0F04 FCFF C400 0977
C710   696E 6275 6670 7472   0D04 FAFF 8500 0763
C720   7572 7272 6F77 0102   0102 1401 7C13 9A03
C730   7F00 9303 0604 0000   0005 5766 696C 6C05
C740   0083 1373 0009 0404   0084 0003 726F 7709
C750   0406 0084 0003 636F   6C0A 0408 0084 0004
```

```
C760    726F 7773 0A04 0A00    8400 0463 6F6C 730B
C770    040C 0084 0005 636F    6C6F 720E 040E 0084
C780    0008 6669 6C6C 6368    6172 0F04 F8FF C500
C790    0973 6372 6565 6E70    7472 1004 F4FF C500
C7A0    0A63 7572 7265 6E74    7074 720D 04FC FF85
C7B0    0007 6375 7272 726F    770D 04F2 FF85 0007
C7C0    6375 7272 636F 6C0E    04FE FF85 0008 6669
C7D0    6C6C 776F 7264 0102    0102 1301 FC13 9D03
C7E0    7000 1304 7704 0000    0004 5770 7574 0500
C7F0    0314 6400 0F04 F8FF    C400 0973 6372 6565
C800    6E70 7472 1004 F4FF    C400 0A63 7572 7265
C810    6E74 7074 720C 04FC    FFC4 0006 6275 6670
C820    7472 0A04 F2FF 8400    0461 7474 7209 0404
C830    0084 0003 726F 7709    0406 0084 0003 636F
C840    6C0B 0408 0084 0005    636F 6C6F 720C 040A
C850    00C4 0006 6275 6666    6572 0102 0102 1301
C860    6C14 A003 7D01 8304    2306 0000 0004 5767
C870    6574 0500 7314 A001    0904 0400 8400 0372
C880    6F77 0904 0600 8400    0363 6F6C 0B04 0800
C890    8500 0563 6F6C 6F72    0C04 0A00 C400 0662
C8A0    7566 6665 720C 04F6    FF85 0006 6275 6666
C8B0    656E 0C04 FAFF 8500    0662 7566 6F66 660B
C8C0    04FC FF85 0005 6B62    7265 730C 04FE FF84
C8D0    0006 6B62 7363 616E    0C04 F8FF 8400 066B
C8E0    6263 6861 7201 0201    0216 0114 16A5 0360
C8F0    002A 0680 0600 0000    0757 7363 726F 6C6C
C900    0500 1A16 5600 0904    0400 8400 0372 6F77
C910    0904 0600 8400 0363    6F6C 0A04 0800 8400
C920    0472 6F77 730A 040A    0084 0004 636F 6C73
C930    0B04 0C00 8400 0563    6F6C 6F72 0C04 0E00
C940    8100 0673 6372 6F6C    6C0A 04F2 FFEA 0204
C950    7265 6773 0102 0102    1401 7416 A603 2800
C960    8A06 A806 0000 0005    5762 6565 7005 007A
C970    161E 000A 04F2 FFEA    0204 7265 6773 0102
C980    0102 1501 9C16 A803    2A00 AF06 D406 0000
C990    0006 5775 7070 6572    0500 9F16 2500 0904
C9A0    0400 A400 0373 7472    0102 0102 1B01 C616
C9B0    AA03 3400 DC06 0607    0000 000C 4765 7443
C9C0    7572 736F 7250 6F73    0500 CC16 2A00 0904
C9D0    0400 A400 0372 6F77    0904 0600 A400 0363
C9E0    6F6C 0A04 F2FF EA02    0472 6567 7301 0201
C9F0    021B 01FA 16AC 0330    0010 0736 0700 0000
CA00    0C53 6574 4375 7273    6F72 506F 7305 0000
CA10    1726 0009 0404 0084    0003 726F 7709 0406
CA20    0084 0003 636F 6C0A    04F2 FFEA 0204 7265
CA30    6773 0102 0102 1801    2A17 B003 2B00 4007
CA40    6107 0000 0009 7365    7463 7572 736F 7205
CA50    0030 1721 000F 0404    0081 0009 7374 6172
CA60    746C 696E 650D 0406    0081 0007 656E 646C
CA70    696E 6509 04F2 FFEA    0203 7265 6701 0201
CA80    0216 0156 17B1 030F    0066 0774 0700 0000
CA90    0763 7572 736F 6666    0102 1501 6617 B203
CAA0    1100 7607 8607 0000    0006 6375 7273 6F6E
CAB0    0102 1501 7817 B503    6300 8E07 E707 0000
CAC0    0006 576F 7065 6E31    0500 7E17 5900 0904
```

```
CAD0    0400 6A03 0377 6477    1004 FCFF 8400 0A74
CAE0    6578 745F 636F 6C6F    7211 04FA FF84 000B
CAF0    6672 616D 655F 636F    6C6F 7211 04FE FF84
CB00    000B 7469 746C 655F    636F 6C6F 7201 0201
CB10    0216 01DC 17B8 0337    00EF 0721 0800 0000
CB20    0770 7574 5F77 6477    0500 DF17 3200 0904
CB30    0400 6A03 0377 6477    0904 0600 A000 0373
CB40    7472 0102 0102 1701    1418 BB03 3400 2708
CB50    5608 0000 0008 5773    6372 6F6C 6C31 0500
CB60    1718 2F00 0904 0400    6A03 0377 6477 0102
CB70    0102 1C01 4818 BE03    3400 5E08 8808 0000
CB80    000D 4765 7443 7572    736F 7254 7970 6505
CB90    004E 182A 000F 0404    00A4 0009 7374 6172
CBA0    746C 696E 650E 0406    00A4 0008 7374 6F70
CBB0    6C69 6E65 0A04 F2FF    EA02 0472 6567 7301
CBC0    0201 021C 017C 18C0    0330 0092 08B8 0800
CBD0    0000 0D53 6574 4375    7273 6F72 5479 7065
CBE0    0500 8218 2600 0F04    0400 8400 0973 7461
CBF0    7274 6C69 6E65 0E04    0600 8400 0873 746F
CC00    706C 696E 650A 04F2    FFEA 0204 7265 6773
CC10    0102 0102 0E05 301E    C405 4B03 065F 6374
CC20    7970 6510 058E 2AC4    0585 0008 5669 6465
CC30    6F53 6567 0F05 C608    C405 7303 0742 5754
CC40    6162 6C65 0F05 D208    C405 7303 0743 4754
CC50    6162 6C65 1005 902C    C405 A400 0843 6F6C
CC60    6F72 5074 7213 0520    20C4 0574 030B 5769
CC70    6E64 6F77 5374 6163    6B13 055C 20C4 0585
CC80    000B 5769 6E64 6F77    436F 756E 7413 051F
CC90    20C4 0584 000B 4F72    6967 696E 616C 526F
CCA0    7713 051E 20C4 0584    000B 4F72 6967 696E
CCB0    616C 436F 6C11 055F    20C4 0584 0009 7374
CCC0    6172 746C 696E 6510    055E 20C4 0584 0008
CCD0    7374 6F70 6C69 6E65    1405 0C02 6305 8400
CCE0    0C4F 5554 5055 545F    4649 5253 5412 0B9A
CCF0    0400 0D54 5241 4E53    4D49 545F 4259 5445
CD00    1205 0000 4000 8500    0A52 5332 3332 5F42
CD10    4153 4511 050D 0463    0585 0009 554E 4954
CD20    5F42 4153 4512 0500    0040 0085 000A 554E
CD30    4954 315F 4241 5345    1205 0400 6305 8500
CD40    0A49 4E50 5554 5F48    4541 4412 0506 0063
CD50    0585 000A 494E 5055    545F 5441 494C 1305
CD60    1004 6305 8400 0B45    4E41 424C 455F 494E
CD70    5433 1305 0F04 6305    8400 0B45 4E41 424C
CD80    455F 494E 5434 1805    1504 6305 8500 1049
CD90    4E54 4552 5255 5054    5F49 445F 4542 4C13
CDA0    0508 0063 0585 000B    4F55 5450 5554 5F48
CDB0    4541 4414 0512 0463    0584 000C 4449 5341
CDC0    424C 455F 494E 5433    1405 1104 6305 8400
CDD0    0C44 4953 4142 4C45    5F49 4E54 3413 050C
CDE0    0063 0584 000B 494E    5055 545F 4649 5253
CDF0    5413 050A 0063 0585    000B 4F55 5450 5554
CE00    5F54 4149 4C0E 0513    0463 0584 0006 4F4C
CE10    4449 4552 0E05 1404    6305 8400 064F 4C44
CE20    4D43 5215 011D 0400    0032 0000 0032 0000
CE30    0004 065F 494E 5433    3411 0B32 0400 0C44
```

```
CE40   4F5F 494E 5445 5252   5550 540F 0B41 0400
CE50   0A49 4E54 3334 5F45   5849 5401 0226 0159
CE60   0400 0034 0000 0034   0000 0000 175F 5245
CE70   4345 4956 455F 4259   5445 5F49 4E54 4552
CE80   5255 5054 070B 6D04   0002 5231 070B 8804
CE90   0002 5232 110B 8C04   000C 5245 4345 4956
CEA0   455F 4558 4954 0102   2201 9204 0000 2E00
CEB0   0000 2E00 0000 0013   5F43 4845 434B 5F46
CEC0   4F52 5F54 5241 4E53   4D49 5407 0BB7 0400
CED0   0254 3116 0BBB 0400   1154 5241 4E53 4D49
CEE0   545F 414E 445F 4558   4954 120B BF04 000D
CEF0   5452 414E 534D 4954   5F45 5849 5401 0219
CF00   01C0 0400 0073 0000   0073 0000 0004 0A5F
CF10   4F70 656E 5F43 6F6D   6D0A 0406 0085 0004
CF20   554E 4954 130B DD04   000E 554E 4954 5F49
CF30   4E53 5441 4C4C 4544   0E0B 3005 0009 4F50
CF40   454E 5F45 5849 5401   021A 0133 0500 0026
CF50   0000 0026 0000 0004   0B5F 436C 6F73 655F
CF60   436F 6D6D 0A04 0600   8500 0455 4E49 5401
CF70   0219 0159 0500 007B   0000 007B 0000 0004
CF80   0A5F 5075 745F 4279   7465 730A 0406 00C4
CF90   0004 4255 4646 0904   0A00 8500 034E 554D
CFA0   0D0B 6505 0008 5055   545F 4C4F 4F50 070B
CFB0   7505 0002 4F31 070B   8605 0002 4F32 070B
CFC0   A805 0002 4F33 070B   B405 0002 4F34 0102
CFD0   1801 D405 0000 3B00   0000 3B00 0000 0409
CFE0   5F47 6574 5F42 7974   650A 0406 00C4 0004
CFF0   4255 4646 070B 0206   0002 4931 070B 0A06
D000   0002 4932 0102 1A01   AC18 D103 A801 0700
D010   A301 0000 000B 6564   6974 5F70 6163 6B65
D020   7405 00B3 189C 010A   0404 0085 0004 705F
D030   6E6D 0C04 FEFF 8500   066B 6273 6361 6E07
D040   04FA FF85 0001 6915   04FC FF84 000F 6F6C
D050   645F 7061 636B 6574   5F74 7970 6501 0201
D060   021E 0154 1AE5 0332   02B0 01D4 0300 0000
D070   0F45 6469 745F 7665   725F 7061 636B 6574
D080   0500 5C1A 2402 0A04   0400 8500 0470 5F6E
D090   6D07 04FC FF85 0001   6907 04FE FF84 0001
D0A0   7301 0201 0220 0186   1CF6 03EC 00E0 03C2
D0B0   0400 0000 1145 6469   745F 626C 6163 6B5F
D0C0   7061 636B 6574 0500   8C1C E200 0A04 0400
D0D0   8500 0470 5F6E 6D07   04FE FF85 0001 6901
D0E0   0201 021F 0172 1DF8   03EE 01CE 04AE 0600
D0F0   0000 1045 6469 745F   6475 6D62 5F70 6163
D100   6B65 7405 007A 1DE0   010A 0404 0085 0004
D110   705F 6E6D 0704 FCFF   8500 0169 0804 FEFF
D120   8500 0273 3101 0201   0220 0160 1FFA 03D2
D130   00BB 0681 0700 0000   1145 6469 745F 736D
D140   6172 745F 7061 636B   6574 0500 671F C600
D150   0704 FCFF 8500 0169   0804 FEFF 8500 0273
D160   310A 0404 0085 0004   705F 6E6D 0102 0102
D170   2001 3220 FC03 6D00   8C07 EF07 0000 0011
D180   5275 6E4F 6E65 5061   7261 6D53 6372 6565
D190   6E05 0038 2063 000B   0404 0098 0305 7061
D1A0   7261 6D0B 04FA FF85   0005 6B62 7265 730C
```

```
D1B0   04FC FF84 0006 6B62   7363 616E 0C04 FEFF
D1C0   8400 066B 6242 5954   4508 04F8 FF85 0002
D1D0   6E6E 0804 F6FF 8500   026E 3101 0201 0219
D1E0   01A0 20FE 03A1 01FC   078F 0900 0000 0A52
D1F0   756E 5363 7265 656E   3105 00A8 2093 010C
D200   0404 009B 0306 7363   7265 656E 0B04 0600
D210   9803 0570 6172 616D   0B04 F6FF 8500 056B
D220   6272 6573 0C04 FAFF   8400 066B 6273 6361
D230   6E0C 04FC FF84 0006   6B62 4259 5445 0804
D240   F8FF 8400 0263 7008   04FE FF84 0002 7070
D250   0804 F4FF 8500 026E   6E08 04F2 FF85 0002
D260   6E31 0102 0102 1901   4222 0904 4201 9D09
D270   D30A 0000 000A 5275   6E53 6372 6565 6E32
D280   0500 4922 3601 0B04   0600 9803 0570 6172
D290   616D 0B04 F6FF 8500   056B 6272 6573 0C04
D2A0   FAFF 8400 066B 6273   6361 6E0C 04FC FF84
D2B0   0006 6B62 4259 5445   0804 F8FF 8400 0263
D2C0   7008 04FE FF84 0002   7070 0804 F4FF 8500
D2D0   026E 6E08 04F2 FF85   0002 6E31 0C04 0400
D2E0   9B03 0673 6372 6565   6E01 0201 0222 0184
D2F0   230B 04FD 00DE 0AD1   0B00 0000 1347 6574
D300   5F44 756D 625F 6172   6561 5F66 6965 6C64
D310   0500 8A23 F300 0C04   0400 8500 0661 7265
D320   615F 6E07 04FE FF84   0001 7307 04FC FF85
D330   0001 6901 0201 0217   0182 240E 0457 00DD
D340   0B28 0C00 0000 0868   6578 746F 6269 6E05
D350   0089 244B 000A 0404   00A4 0004 6465 7374
D360   0C04 0600 A400 0673   6F75 7263 6509 0408
D370   0085 0003 6C65 6E07   04F8 FF85 0001 6907
D380   04FE FF84 0001 780D   04FA FF0F 0407 6865
D390   7862 7974 6501 0201   0217 01DA 2414 0445
D3A0   0035 0C6E 0C00 0000   0862 696E 746F 6865
D3B0   7805 00E1 2439 000A   0404 00A4 0004 6465
D3C0   7374 0C04 0600 A400   0673 6F75 7263 6509
D3D0   0408 0085 0003 6C65   6E07 04FE FF85 0001
D3E0   6901 0201 020E 0558   27C4 05C2 0306 7061
D3F0   636B 6574 1105 D003   C405 8500 0970 7269
D400   6E74 5F77 6477 1005   1201 C405 A303 0853
D410   6B79 5061 7261 6D13   05CE 03C4 058C 030B
D420   536B 7950 6172 616D   5363 7217 0584 2AC4
D430   05CF 030F 6475 6D62   5F61 7265 615F 6669
D440   656C 640A 052E 24C4   0584 0002 6370 1901
D450   2025 AB03 5200 0600   4E00 0000 000A 696E
D460   6974 5F72 7332 3332   0500 2625 4800 0704
D470   FEFF 8500 0169 0102   0102 1B01 7225 B503
D480   CF00 5900 1C01 0000   000C 5072 696E 7446
D490   756E 4C69 6E65 0500   7925 C300 0804 0C00
D4A0   8000 0263 3108 040E   0080 0002 6332 0F04
D4B0   F6FF C400 0973 6372   6565 6E70 7472 1004
D4C0   F2FF C400 0A63 7572   7265 6E74 7074 720C
D4D0   04FC FFC4 0006 6275   6670 7472 0A04 EEFF
D4E0   B603 0461 7474 7207   04FA FF84 0001 740C
D4F0   05B0 1AC4 05B7 0304   626C 6E6B 0904 0400
D500   8100 0372 6F77 0904   0600 8100 0363 6F6C
D510   0C04 0800 AC00 0662   7566 6665 7208 040A
```

```
D520   0080 0002 6330 0102   0102 1501 4226 BC03
D530   1E00 2501 3E01 0000   0006 6D66 7075 7473
D540   0500 4526 1900 0704   0400 A000 0173 0804
D550   0600 1202 0266 6801   0201 0219 0160 26C2
D560   036E 0047 01A9 0100   0000 0A47 6574 5F6E
D570   756D 6265 7205 0067   2662 0008 0404 00A4
D580   0002 6E6E 0804 FEFF   8500 0263 6801 0201
D590   021C 01CE 26CD 03B5   00B5 015E 0200 0000
D5A0   0D67 6574 5F66 696C   655F 6E61 6D65 0500
D5B0   D526 A900 0A04 0400   A400 0466 696C 6508
D5C0   04AE FF85 0002 6368   0E04 B0FF CE03 0866
D5D0   696C 656E 616D 6501   0201 0218 0184 27D7
D5E0   03CE 006B 022D 0300   0000 0970 7269 6E74
D5F0   5F73 7472 0500 8B27   C200 0C04 0400 A400
D600   0670 726F 6D70 7409   0406 00A4 0003 7374
D610   720E 04FE FF85 0008   7072 745F 7374 7473
D620   0102 0102 1701 5228   E103 9C00 3903 C903
D630   0000 0008 5075 7445   7272 6F72 0500 5928
D640   9000 0904 0400 A400   0373 7472 0904 FEFF
D650   8400 0363 6F6C 0102   0102 1901 EE28 E603
D660   8900 D503 5204 0000   000A 5075 744D 6573
D670   7361 6765 0500 F528   7D00 0904 0400 A400
D680   0373 7472 0904 FEFF   8400 0363 6F6C 0102
D690   0102 1901 7829 ED03   ED00 5F04 4005 0000
D6A0   000A 4765 7443 6F6E   6669 726D 0500 7F29
D6B0   E100 0C04 FCFF 8400   0669 6E73 6361 6E0C
D6C0   04FE FFEE 0306 7072   6F6D 7074 0904 0400
D6D0   A400 0373 7472 0904   FAFF 8400 0363 6F6C
D6E0   0102 0102 1401 662A   F303 AA00 4C05 EC05
D6F0   0000 0005 4765 744B   4205 006C 2AA0 000E
D700   04EC FF85 0008 6B62   645F 7374 7473 1004
D710   FCFF 8500 0A72 7332   3332 5F73 7474 730A
D720   04EE FF84 0004 6461   7461 0904 F0FF F403
D730   0362 6672 0704 FEFF   8400 0162 0102 0102
D740   1301 102B 0004 9900   F605 8506 0000 0004
D750   6865 6C70 0500 162B   8F00 0904 ACFF 0104
D760   0373 7472 0704 FEFF   A400 0163 0804 FCFF
D770   1202 0266 7001 0201   0211 050D 01C4 0584
D780   0009 6461 7461 5F62   6974 7311 050E 01C4
D790   0584 0009 7374 6F70   5F62 6974 730E 050F
D7A0   01C4 0584 0006 7061   7269 7479 0C05 1001
D7B0   C405 8400 0462 6175   640C 0511 01C4 0584
D7C0   0004 706F 7274 1005   C603 C405 6E03 0868
D7D0   656C 705F 7764 770C   05D4 03C4 0585 0004
D7E0   7374 6F70 1005 902C   C405 A400 0843 6F6C
D7F0   6F72 5074 7210 058E   2AC4 0585 0008 5669
D800   6465 6F53 6567 0573   6B79 2E63 5301 0F00
D810   1000 1400 1600 1500   1900 1600 1F00 1700
D820   3600 1800 4600 1900   5A00 1A00 6400 1B00
D830   6700 1C00 7000 1E00   7200 2100 7A00 2200
D840   7D00 2300 8000 2400   8300 2500 8600 2600
D850   8900 2700 9700 2800   9A00 2900 A800 2A00
D860   AB00 3500 B000 3C00   B800 3D00 C000 3E00
D870   C400 4800 FA00 4E00   0A01 5000 0F01 5100
D880   1E01 5300 2501 5400   3901 5600 3C01 5700
```

```
D890   5101 5800  5C01 5900   7801 5B00  8701 4B00
D8A0   8E01 4C00  A301 6400   A601 6500  AC01 6600
D8B0   B201 6700  C301 6800   C901 6D00  D001 6E00
D8C0   D301 7000  D601 7400   E401 7500  F001 7800
D8D0   F201 7900  FE01 7A00   0102 3F00  1702 4000
D8E0   2D02 4100  3302 4200   3902 4300  3F02 4400
D8F0   4502 4500  4A02 7C00   5402 7D00  5A02 7E00
D900   6002 7F00  6D02 8000   7102 8100  8202 8200
D910   8602 8600  9202 8700   A902 8800  AF02 8900
D920   B402 8A00  CB02 8B00   D102 8C00  D702 8F00
D930   DD02 9300  E602 9400   F002 9500  F502 9600
D940   FB02 9700  0503 9800   1B03 9900  3103 9B00
D950   4703 9D00  4A03 9E00   5703 A000  5B03 A100
D960   6C03 A200  7303 A400   7903 A500  7E03 A700
D970   8203 AC00  8C03 AD00   8E03 AE00  9403 AF00
D980   9A03 B000  A403 B100   AA03 B200  BB03 B300
D990   E403 B400  F103 B500   F603 B600  0904 B700
D9A0   1204 B900  1B04 BB00   1E04 BC00  2404 BD00
D9B0   2A04 BE00  3804 C000   3B04 C100  4104 C300
D9C0   7604 CB00  7C04 D100   8304 D200  8604 D300
D9D0   AB04 D400  CB04 D500   EE04 D600  0505 D700
D9E0   0C05 D800  2C05 D900   3405 DA00  3D05 DB00
D9F0   4605 DC00  5305 DD00   6A05 DE00  6F05 E200
DA00   8205 E300  9305 E600   9C05 E800  BF05 E900
DA10   C205 F000  CC05 F300   D305 F400  D705 F500
DA20   DB05 F600  2206 FC00   2806 FF00  3006 0601
DA30   3506 0701  4206 1101   4806 1201  5706 1301
DA40   6106 1401  6806 1501   6F06 1601  7B06 1701
DA50   8906 1801  8F06 1901   9506 3B01  A306 3C01
DA60   BC06 0C01  CA06 0D01   D606 0E01  DD06 0F01
DA70   E906 2001  1607 2101   2707 2201  3107 2301
DA80   3907 2401  4307 2501   5207 2601  5707 2701
DA90   7207 2801  7607 2901   7A07 2A01  8807 2C01
DAA0   9D07 2E01  A007 2F01   AC07 3001  B307 3201
DAB0   BF07 3301  D607 3401   DC07 3501  E107 3601
DAC0   E807 3801  0508 3D01   1E08 3E01  2308 3F01
DAD0   2608 4601  2C08 4901   3408 4A01  4308 4C01
DAE0   4808 4D01  5208 5001   6708 5201  6C08 5601
DAF0   7808 5701  7D08 5801   8008 5901  8608 5A01
DB00   8C08 5B01  9408 5C01   9A08 5D01  AF08 5E01
DB10   B408 5F01  BE08 6001   F108 9201  F808 9501
DB20   FF08 9A01  0409 9B01   0909 9D01  1009 9E01
DB30   3409 9F01  4309 A001   4E09 A101  5809 A201
DB40   6109 A901  6609 AC01   6E09 AD01  7609 AE01
DB50   7E09 AF01  8509 B001   8B09 B101  9309 B201
DB60   9809 B301  A609 BA01   A909 BB01  BD09 BC01
DB70   C409 B501  CC09 B601   DA09 B701  F009 BD01
DB80   000A BE01  140A BF01   1F0A C101  330A C401
DB90   3A0A C701  430A C801   580A C901  5D0A CA01
DBA0   670A CB01  780A CD01   8D0A CE01  A30A CF01
DBB0   B60A D001  BD0A D101   C40A D201  D10A D301
DBC0   D70A D401  DD0A D501   E20A D601  F80A D801
DBD0   100B D901  150B DA01   1B0B DB01  4B0B DC01
DBE0   600B DD01  630B DE01   660B E701  6C0B EB01
DBF0   740B EC01  7B0B ED01   8F0B EF01  9D0B F001
```

```
DC00  A40B F201  B20B F301  BE0B F401  C80B F901
DC10  D60B FA01  DA0B FB01  E10B FC01  E80B FD01
DC20  EB0B FE01  EF0B FF01  F20B 0002  F90B 0102
DC30  0E0C 0202  110C 0502  160C 0602  270C 0702
DC40  3D0C 0802  590C 0902  6A0C 0A02  740C 0B02
DC50  880C 0C02  9F0C 0D02  A60C 0F02  B40C 1002
DC60  C20C 1102  D90C 1202  ED0C 1302  F40C 1502
DC70  020D 1602  100D 1802  1A0D 2202  200D 2502
DC80  270D 2602  2F0D 2702  360D 2802  430D 2A02
DC90  500D 2B02  610D 2C02  680D 2D02  6C0D 2E02
DCA0  730D 2F02  770D 3102  7D0D 3802  880D 3B02
DCB0  8F0D 3C02  930D 3D02  980D 3E02  A30D 3F02
DCC0  AC0D 4902  B80D 4D02  BE0D 4E02  C80D 4F02
DCD0  D20D 5002  DC0D 5202  E60D 5302  EE0D 5402
DCE0  020E 5602  0D0E 5702  100E 6002  140E 6102
DCF0  1B0E 6402  2C0E 6602  4A0E 6702  510E 6A02
DD00  620E 6C02  800E 7902  820E 8002  880E 8102
DD10  910E 8602  B00E 8702  CB0E 8E02  EA0E 8F02
DD20  F60E 8A02  FE0E 8B02  190F 9402  260F 9602
DD30  590F 9002  670F 9102  6C0F 9902  7E0F 9B02
DD40  980F A102  9C0F A402  A40F A502  A90F A702
DD50  D40F A802  E70F A902  EA0F 0577  696F 2E63
DD60  C600 5500  F00F 5800  F60F 5900  0810 5A00
DD70  1110 5B00  1710 5D00  2010 5E00  2610 5F00
DD80  2A10 6000  3C10 6300  4210 6600  4810 6700
DD90  5610 6800  6410 6900  6A10 7100  6E10 7200
DDA0  7010 7300  7A10 7400  8A10 7500  9A10 7C00
DDB0  9C10 8C00  A310 8D00  AE10 9000  B910 9200
DDC0  BD10 9300  CE10 9400  D510 9500  DE10 9600
DDD0  E710 9700  F010 9900  0511 9A00  0B11 9C00
DDE0  1C11 9D00  2811 A000  3011 A100  4A11 A200
DDF0  4F11 A300  5911 A400  6611 A600  8611 A800
DE00  9511 A900  9A11 AB00  9C11 AC00  A111 AE00
DE10  A411 B100  A911 B200  B211 B300  D911 B400
DE20  0012 B500  2712 B700  4E12 B800  6812 B900
DE30  8312 BA00  9E12 BD00  B912 BE00  ED12 C500
DE40  F212 CB00  F812 CD00  0913 CE00  0F13 D000
DE50  2213 D100  2B13 D400  3213 D500  4C13 D600
DE60  5113 D700  5E13 D900  6B13 DA00  7413 DB00
DE70  7813 E200  7C13 ED00  8313 EF00  9A13 F000
DE80  A013 F200  AF13 F500  B613 F600  D013 F700
DE90  D513 F300  E213 F400  EE13 F800  F613 FF00
DEA0  FC13 0701  0314 0901  1114 0A01  1714 0C01
DEB0  2814 0D01  3114 0E01  3D14 0F01  4014 1001
DEC0  5214 1101  5E14 1201  6714 1901  6C14 2301
DED0  7314 2401  7814 2501  7F14 2601  8A14 2801
DEE0  9814 2A01  9D14 2B01  A314 2C01  BD14 2E01
DEF0  D214 2F01  D814 3001  DE14 3201  E414 3801
DF00  0215 3A01  0C15 3B01  1215 3E01  2215 4101
DF10  2B15 4301  2E15 4601  3915 4C01  4E15 4D01
DF20  7315 4E01  7E15 5101  A115 5E01  B215 5F01
DF30  BD15 6001  CC15 6101  E115 5501  EA15 5601
DF40  F315 5901  F615 6C01  1416 7501  1A16 7601
DF50  2016 7701  2616 7801  2C16 7901  3716 7B01
DF60  4216 7C01  4816 7D01  4C16 7F01  5216 8001
```

| | | | | | | | |
|---|---|---|---|---|---|---|---|
| DF70 | 5616 | 8201 | 5E16 | 8301 | 7016 | 8A01 | 7416 | 8D01 |
| DF80 | 7A16 | 8E01 | 7E16 | 8F01 | 8216 | 9001 | 8616 | 9101 |
| DF90 | 9816 | 9801 | 9C16 | 9A01 | 9F16 | 9B01 | C416 | A201 |
| DFA0 | C616 | A701 | CC16 | A801 | D016 | A901 | D416 | AA01 |
| DFB0 | E616 | AB01 | EE16 | AC01 | F616 | B301 | FA16 | B801 |
| DFC0 | 0017 | B901 | 0417 | BA01 | 0A17 | BB01 | 1017 | BC01 |
| DFD0 | 1417 | BD01 | 2617 | C101 | 2A17 | C401 | 3017 | C501 |
| DFE0 | 3417 | C601 | 3F17 | C701 | 5117 | CC01 | 5617 | CE01 |
| DFF0 | 6417 | D301 | 6617 | D401 | 7617 | D701 | 7817 | D901 |
| E000 | 7E17 | DB01 | 9017 | DC01 | 9417 | DD01 | 9817 | DE01 |
| E010 | 9C17 | E001 | 9E17 | E101 | A217 | E201 | A617 | EB01 |
| E020 | AA17 | EC01 | D717 | EF01 | DC17 | F001 | DF17 | F201 |
| E030 | E817 | F301 | 1118 | F601 | 1418 | F701 | 1718 | F801 |
| E040 | 4618 | FB01 | 4818 | FE01 | 4E18 | FF01 | 5218 | 0002 |
| E050 | 5618 | 0102 | 6818 | 0202 | 7018 | 0302 | 7818 | 0602 |
| E060 | 7C18 | 0902 | 8218 | 0A02 | 8618 | 0B02 | 8C18 | 0C02 |
| E070 | 9218 | 0D02 | 9618 | 0F02 | A818 | 0863 | 6F6D | 6D2E |
| E080 | 4153 | 4DD6 | 0059 | 001D | 045A | 001D | 045D | 001E |
| E090 | 045E | 001F | 0460 | 0020 | 0461 | 0021 | 0462 | 0022 |
| E0A0 | 0463 | 0023 | 0464 | 0024 | 0465 | 0025 | 0467 | 0026 |
| E0B0 | 0468 | 0028 | 046B | 002A | 046C | 002E | 046D | 0031 |
| E0C0 | 046F | 0032 | 0470 | 0033 | 0471 | 0035 | 0472 | 0039 |
| E0D0 | 0473 | 003C | 0474 | 003D | 0475 | 003F | 0478 | 0041 |
| E0E0 | 0479 | 0042 | 047A | 0043 | 047B | 0044 | 047C | 0045 |
| E0F0 | 047D | 0046 | 047F | 0047 | 0480 | 0048 | 0481 | 0049 |
| E100 | 0482 | 004B | 0483 | 004D | 0485 | 004E | 048A | 004F |
| E110 | 048D | 004F | 048E | 0052 | 048F | 0053 | 0490 | 0055 |
| E120 | 0491 | 0058 | 0496 | 0059 | 0499 | 0059 | 049A | 005C |
| E130 | 049B | 005D | 049C | 0061 | 049F | 0065 | 04A0 | 0067 |
| E140 | 04A1 | 0069 | 04A3 | 006D | 04A4 | 0070 | 04A5 | 0072 |
| E150 | 04A6 | 0076 | 04A7 | 0078 | 04A8 | 007A | 04A9 | 007B |
| E160 | 04AA | 007C | 04AB | 0080 | 04AC | 0084 | 04AD | 0086 |
| E170 | 04AF | 0088 | 04B2 | 008C | 04B8 | 008D | 04BB | 008D |
| E180 | 04BC | 0090 | 04C1 | 0091 | 04C4 | 0091 | 04CA | 0092 |
| E190 | 04CD | 0092 | 04CE | 0095 | 04CF | 0096 | 04D0 | 0098 |
| E1A0 | 04D2 | 009A | 04D3 | 009E | 04D4 | 00A2 | 04D5 | 00A4 |
| E1B0 | 04D6 | 00A8 | 04D7 | 00A9 | 04D8 | 00AB | 04D9 | 00AF |
| E1C0 | 04DA | 00B3 | 04DB | 00B5 | 04DD | 00B7 | 04E0 | 00BB |
| E1D0 | 04E1 | 00BE | 04E4 | 00BF | 04EC | 00C0 | 04ED | 00C4 |
| E1E0 | 04EE | 00C6 | 04F0 | 00C8 | 04F1 | 00CB | 04F3 | 00CD |
| E1F0 | 04F4 | 00CF | 04F5 | 00D2 | 04F6 | 00D4 | 04F7 | 00D9 |
| E200 | 04F8 | 00DB | 04FA | 00DD | 04FB | 00E2 | 04FC | 00E5 |
| E210 | 04FD | 00E7 | 04FE | 00EA | 04FF | 00EC | 0400 | 01EF |
| E220 | 0402 | 01F1 | 0403 | 01F2 | 0404 | 01F5 | 0405 | 01F8 |
| E230 | 0406 | 01FB | 0408 | 01FE | 0409 | 01FF | 040A | 0103 |
| E240 | 050B | 0106 | 050C | 0107 | 050D | 010A | 050E | 010C |
| E250 | 0510 | 010D | 0511 | 0110 | 0512 | 0111 | 0513 | 0114 |
| E260 | 0514 | 0116 | 0516 | 0117 | 0517 | 011A | 0519 | 011B |
| E270 | 051A | 011E | 051C | 011F | 051D | 0121 | 051E | 0125 |
| E280 | 0520 | 0127 | 0521 | 012A | 0522 | 012B | 0524 | 012C |
| E290 | 0525 | 012D | 0527 | 0130 | 052D | 0133 | 052E | 0136 |
| E2A0 | 052F | 0139 | 0530 | 013B | 0531 | 0140 | 0532 | 0142 |
| E2B0 | 0533 | 0147 | 0534 | 014A | 0535 | 014E | 0537 | 014F |
| E2C0 | 0538 | 0152 | 0539 | 0156 | 053A | 0157 | 0540 | 0159 |
| E2D0 | 0541 | 015F | 0542 | 0162 | 0544 | 0165 | 0545 | 016A |

```
E2E0    0546 016E  0547 0170   0548 0172  054A 0175
E2F0    054B 0176  054C 0178   054D 017D  054E 017F
E300    054F 0181  0550 0183   0552 0186  0553 0188
E310    0554 018A  0555 018D   0556 018E  0557 0190
E320    0558 0192  0559 0195   055A 0197  055B 0199
E330    055C 019B  055D 019D   055F 019E  0560 01A0
E340    0561 01A2  0562 01A4   0563 01A6  0565 01A8
E350    0566 01AA  0567 01AC   0568 01AE  0569 01B0
E360    056A 01B2  056C 01B4   056D 01B6  056F 01B8
E370    0571 01BC  0572 01BD   0573 01C1  0574 01C2
E380    0575 01C5  0576 01C6   0577 01C7  0578 01CA
E390    0579 01CD  057A 01CF   0581 01D4  0582 01DA
E3A0    0584 01DD  0585 01E2   0586 01E4  0587 01E9
E3B0    0588 01EB  0589 01EC   058A 01F0  058B 01F2
E3C0    058D 01F4  058E 01F8   058F 01FC  0590 01FE
E3D0    0592 0102  0693 0107   0695 010A  0606 736B
E3E0    7931 2E63  D900 1200   AC18 1500  B318 1600
E3F0    C418 1700  CA18 1800   D418 1900  EF18 1A00
E400    FD18 1B00  0A19 1C00   0F19 1D00  1219 1E00
E410    1819 1F00  2019 2000   3419 2100  3F19 2200
E420    5319 2500  6519 2700   7C19 2A00  8D19 2B00
E430    AB19 2C00  C919 3200   EB19 3300  EE19 3400
E440    F119 3500  F719 3600   161A 3700  2A1A 3800
E450    351A 3900  491A 3A00   4C1A 3E00  541A 4200
E460    5C1A 4400  741A 4500   7B1A 4600  891A 4700
E470    981A 4800  A71A 4900   B61A 4B00  C51A 4D00
E480    D91A 4E00  E81A 4F00   001B 5100  171B 5200
E490    371B 5300  3C1B 5400   531B 5700  631B 5800
E4A0    6A1B 5900  7E1B 5A00   891B 5B00  9A1B 5F00
E4B0    BE1B 6000  CF1B 6100   DA1B 6200  E51B 6300
E4C0    F01B 6400  FB1B 6700   0A1C 6800  1B1C 6900
E4D0    2A1C 6A00  391C 6B00   3E1C 6C00  681C 6D00
E4E0    801C 7000  861C 7200   8C1C 7300  A41C 7400
E4F0    A91C 7600  DD1C 7700   E41C 7800  F81C 7900
E500    031D 7A00  141D 7C00   191D 7D00  341D 7E00
E510    391D 7F00  6E1D 8300   721D 8600  7A1D 8700
E520    9E1D 8800  B91D 8900   C91D 8A00  DD1D 8C00
E530    FB1D 8D00  0A1E 8F00   191E 9000  361E 9200
E540    531E 9300  5A1E 9400   6E1E 9500  791E 9600
E550    8A1E 9800  9F1E 9900   B11E 9A00  C51E 9B00
E560    D91E 9C00  F11E 9D00   111F 9E00  1E1F 9F00
E570    2D1F A000  341F A100   421F A200  5A1F A500
E580    601F A800  671F A900   7B1F AA00  841F AB00
E590    951F AD00  AD1F AE00   B41F AF00  C81F B000
E5A0    D31F B100  E41F B300   F61F B400  0320 B500
E5B0    1220 B600  1920 B700   2D20 C200  3220 C600
E5C0    3820 C700  3A20 CE00   4C20 D000  5120 D100
E5D0    5A20 D700  6B20 C800   7820 C900  7E20 CA00
E5E0    8420 CB00  8A20 CC00   8F20 D500  9620 E200
E5F0    A020 E700  A820 E900   B020 EA00  C320 EB00
E600    D620 EC00  DC20 ED00   E220 EE00  E820 EF00
E610    EE20 F000  F320 F200   1921 1D01  2721 F500
E620    2A21 F800  3E21 FA00   4321 FB00  5621 FD00
E630    5C21 0001  6D21 0101   9221 0201  A221 0301
E640    BA21 0401  D121 0601   D421 0701  ED21 0901
```

| | | | | | | | |
|---|---|---|---|---|---|---|---|
| E650 | 0222 | 0B01 | 1322 | 0D01 | 1622 | 0E01 | 2822 | 1901 |
| E660 | 3622 | 2001 | 4222 | 2501 | 4922 | 2701 | 5122 | 2801 |
| E670 | 6422 | 2901 | 7722 | 2A01 | 7D22 | 2B01 | 8322 | 2C01 |
| E680 | 8922 | 2D01 | 8F22 | 2E01 | 9422 | 3001 | BA22 | 5001 |
| E690 | C822 | 3301 | CA22 | 3601 | E222 | 3801 | E722 | 3901 |
| E6A0 | F722 | 3B01 | 0923 | 3C01 | 1A23 | 3E01 | 1E23 | 3F01 |
| E6B0 | 3023 | 4001 | 3A23 | 4101 | 5323 | 4601 | 6023 | 4C01 |
| E6C0 | 7A23 | 5401 | 8423 | 5701 | 8A23 | 5801 | 9B23 | 5901 |
| E6D0 | A523 | 5A01 | AF23 | 5B01 | C823 | 5C01 | D723 | 5D01 |
| E6E0 | E623 | 5F01 | FD23 | 6001 | 0424 | 6101 | 1824 | 6201 |
| E6F0 | 2324 | 6301 | 3424 | 6401 | 3724 | 6601 | 5024 | 6701 |
| E700 | 5B24 | 6801 | 6624 | 6901 | 7324 | 6A01 | 7D24 | 6D01 |
| E710 | 8224 | 7101 | 8924 | 7201 | 8D24 | 7301 | 9424 | 7401 |
| E720 | A624 | 7501 | AC24 | 7601 | BE24 | 7701 | C924 | 7801 |
| E730 | D424 | 7B01 | DA24 | 7D01 | E124 | 7E01 | E824 | 7F01 |
| E740 | 0525 | 8001 | 1025 | 8101 | 1A25 | 0673 | 6B79 | 322E |
| E750 | 6377 | 000A | 0C20 | 250C | 0026 | 250D | 004F | 250E |
| E760 | 0060 | 250F | 0C64 | 2510 | 006E | 2513 | 0072 | 251B |
| E770 | 0079 | 251C | 0088 | 251D | 0093 | 251E | 009E | 251F |
| E780 | 00B6 | 2520 | 00BC | 2522 | 00CA | 2523 | 00D3 | 2524 |
| E790 | 00DC | 2525 | 00E0 | 2529 | 00E2 | 252A | 00EB | 252B |
| E7A0 | 00EF | 252C | 00F2 | 252D | 00FE | 252E | 0002 | 2630 |
| E7B0 | 0004 | 2631 | 0010 | 2633 | 0023 | 2634 | 0026 | 2626 |
| E7C0 | 002F | 2627 | 0035 | 2629 | 0039 | 2635 | 003C | 2638 |
| E7D0 | 0042 | 2639 | 0045 | 263A | 0051 | 263B | 005E | 263F |
| E7E0 | 0060 | 2641 | 0067 | 2642 | 0074 | 2643 | 007A | 2644 |
| E7F0 | 0081 | 2645 | 00AB | 2646 | 00C6 | 2647 | 00C9 | 264A |
| E800 | 00CE | 264D | 00D5 | 264E | 00E4 | 264F | 00E8 | 2650 |
| E810 | 0005 | 2751 | 002F | 2752 | 004B | 2753 | 004E | 2754 |
| E820 | 0054 | 2755 | 0073 | 2760 | 0084 | 2762 | 008B | 2763 |
| E830 | 009C | 2764 | 0CA1 | 276C | 00F1 | 276D | 000C | 286F |
| E840 | 001E | 2870 | 003B | 2871 | 004D | 2878 | 0052 | 287C |
| E850 | 0059 | 287D | 0083 | 287E | 009F | 287F | 00B6 | 2880 |
| E860 | 00CD | 2881 | 00D0 | 2882 | 00E6 | 2883 | 00E9 | 288A |
| E870 | 00EE | 288D | 00F5 | 288E | 001F | 298F | 003B | 2990 |
| E880 | 0052 | 2991 | 0069 | 2992 | 006C | 2993 | 006F | 2994 |
| E890 | 0072 | 299C | 0078 | 29A3 | 007F | 29A4 | 00A9 | 29A5 |
| E8A0 | 00C5 | 29A6 | 0CDC | 29A7 | 00F3 | 29A8 | 00F7 | 29AB |
| E8B0 | 00FB | 29AC | 0015 | 2AAD | 001D | 2AAE | 002C | 2AB2 |
| E8C0 | 003A | 2AB3 | 003D | 2AB1 | 005C | 2ABF | 0066 | 2AC3 |
| E8D0 | 006C | 2AC7 | 0070 | 2AC8 | 007D | 2AC9 | 0084 | 2ACA |
| E8E0 | 0094 | 2ACB | 0098 | 2ACC | 00AE | 2ACD | 00C5 | 2ACE |
| E8F0 | 00DC | 2ACF | 0CEB | 2AD1 | 00EE | 2AD4 | 00FA | 2ADC |
| E900 | 0010 | 2BDF | 0016 | 2BE0 | 0020 | 2BE1 | 0031 | 2BE3 |
| E910 | 0034 | 2BE4 | 004E | 2BE5 | 0068 | 2BE6 | 0076 | 2BE7 |
| E920 | 008B | 2BE8 | 009A | 2BE9 | 00A2 | 2BEB | 00A5 | 2B00 |
| E930 | 0A53 | 4C49 | 4243 | 452E | 4C49 | 42A6 | 0001 | 0101 |
| E940 | 0008 | 0000 | 0014 | 0002 | 0101 | 00DE | 0600 | 00E1 |
| E950 | 0203 | 0101 | 0099 | 1700 | 00E0 | 0B04 | 0101 | 006B |
| E960 | 4100 | 00A7 | 0505 | 0101 | 00A9 | 5900 | 0054 | 0501 |
| E970 | 0102 | 001C | 0000 | 0014 | 0002 | 0102 | 00BF | 0900 |
| E980 | 0051 | 0103 | 0102 | 0079 | 2300 | 00C6 | 0904 | 0102 |
| E990 | 0012 | 4700 | 0069 | 0705 | 0102 | 00FD | 5E00 | 0020 |
| E9A0 | 0301 | 0103 | 0030 | 0000 | 0015 | 0002 | 0103 | 0010 |
| E9B0 | 0B00 | 00F4 | 0003 | 0103 | 003F | 2D00 | 000C | 0004 |

```
E9C0   0103 007B 4E00 002E   0305 0103 001D 6200
E9D0   0063 0301 0104 0045   0000 0015 0002 0104
E9E0   0004 0C00 0010 0203   0104 004B 2D00 0081
E9F0   0A04 0104 00A9 5100   0048 0405 0104 0080
EA00   6500 006D 0301 0105   005A 0000 0015 0002
EA10   0105 0014 0E00 00B9   0003 0105 00CC 3700
EA20   009F 0904 0105 00F1   5500 00B8 0305 0105
EA30   00ED 6800 00E5 0101   0106 006F 0000 0019
EA40   0002 0106 00CD 0E00   00B7 0001 0107 0088
EA50   0000 001C 0002 0107   0084 0F00 00C6 0101
EA60   0108 00A4 0000 001C   0002 0108 004A 1100
EA70   0035 0001 0109 00C0   0000 0017 0002 0109
EA80   007F 1100 000F 0001   010A 00D7 0000 0017
EA90   0002 010A 008E 1100   001C 0001 010B 00EE
EAA0   0000 0017 0002 010B   00AA 1100 0012 0001
EAB0   010C 0005 0100 001C   0002 010C 00BC 1100
EAC0   0010 0001 010D 0021   0100 001C 0002 010D
EAD0   00CC 1100 0010 0001   010E 003D 0100 001C
EAE0   0002 010E 00DC 1100   0025 0001 010F 0059
EAF0   0100 001D 0002 010F   0001 1200 0010 0001
EB00   0110 0076 0100 001B   0002 0110 0011 1200
EB10   0044 0001 0111 0091   0100 0015 0002 0111
EB20   0055 1200 000E 0001   0112 00A6 0100 0017
EB30   0002 0112 0063 1200   0010 0001 0113 00BD
EB40   0100 0014 0002 0113   0073 1200 000D 0001
EB50   0114 00D1 0100 0015   0002 0114 0080 1200
EB60   000E 0001 0115 00E6   0100 0015 0002 0115
EB70   008E 1200 000E 0001   0116 00FB 0100 0018
EB80   0002 0116 009C 1200   000F 0001 0117 0013
EB90   0200 0014 0002 0117   00AB 1200 0055 0001
EBA0   0118 0027 0200 0016   0002 0118 0000 1300
EBB0   000F 0001 0119 003D   0200 0016 0002 0119
EBC0   000F 1300 000F 0001   011A 0053 0200 0017
EBD0   0002 011A 001E 1300   0010 0001 011B 006A
EBE0   0200 0016 0002 011B   002E 1300 000F 0001
EBF0   011C 0080 0200 0014   0002 011C 003D 1300
EC00   0011 0001 011D 0094   0200 0016 0002 011D
EC10   004E 1300 001C 0001   011E 00AA 0200 0015
EC20   0002 011E 006A 1300   000E 0001 011F 00BF
EC30   0200 0014 0002 011F   0078 1300 000E 0001
EC40   0120 00D3 0200 0015   0002 0120 0086 1300
EC50   000F 0001 0121 00E8   0200 0015 0002 0121
EC60   0095 1300 0012 0001   0122 00FD 0200 0015
EC70   0002 0122 00A7 1300   000E 0001 0123 0012
EC80   0300 001A 0002 0123   00B5 1300 000D 0001
EC90   0124 002C 0300 001A   0002 0124 00C2 1300
ECA0   000D 0001 0125 0046   0300 0019 0002 0125
ECB0   00CF 1300 0035 0001   0126 005F 0300 0019
ECC0   0002 0126 0004 1400   000C 0001 0127 0078
ECD0   0300 0016 0002 0127   0010 1400 000D 0001
ECE0   0128 008E 0300 0019   0002 0128 001D 1400
ECF0   0012 0001 0129 00A7   0300 0018 0002 0129
ED00   002F 1400 001D 0001   012A 00BF 0300 0018
ED10   0002 012A 004C 1400   0047 0001 012B 00D7
ED20   0300 0018 0002 012B   0093 1400 009C 0001
```

```
ED30   012C  00EF  0300  001B   0002  012C  002F  1500
ED40   000E  0001  012D  000A   0400  0017  0002  012D
ED50   003D  1500  000E  0001   012E  0021  0400  0017
ED60   0002  012E  004B  1500   000E  0001  012F  0038
ED70   0400  0017  0002  012F   0059  1500  000E  0001
ED80   0130  004F  0400  0018   0002  0130  0067  1500
ED90   000F  0001  0131  0067   0400  0018  0002  0131
EDA0   0076  1500  000F  0001   0132  007F  0400  0018
EDB0   0002  0132  0085  1500   000F  0001  0133  0097
EDC0   0400  0015  0002  0133   0094  1500  000C  0001
EDD0   0134  00AC  0400  0015   0002  0134  00A0  1500
EDE0   000E  0001  0135  00C1   0400  0015  0002  0135
EDF0   00AE  1500  000C  0001   0136  00D6  0400  0016
EE00   0002  0136  00BA  1500   000D  0001  0137  00EC
EE10   0400  0016  0002  0137   00C7  1500  000F  0001
EE20   0138  0002  0500  0019   0002  0138  00D6  1500
EE30   0056  0001  0139  001B   0500  0016  0002  0139
EE40   002C  1600  001D  0001   013A  0031  0500  0017
EE50   0002  013A  0049  1600   000E  0001  013B  0048
EE60   0500  001A  0002  013B   0057  1600  0029  0001
EE70   013C  0062  0500  001A   0002  013C  0080  1600
EE80   000D  0001  013D  007C   0500  0014  0002  013D
EE90   008D  1600  000D  0001   013E  0090  0500  0014
EEA0   0002  013E  009A  1600   000D  0001  013F  00A4
EEB0   0500  0016  0002  013F   00A7  1600  000F  0001
EEC0   0140  00BA  0500  0015   0002  0140  00B6  1600
EED0   000E  0001  0141  00CF   0500  0019  0002  0141
EEE0   00C4  1600  0010  0001   0142  00E8  0500  0017
EEF0   0002  0142  00D4  1600   000E  0001  0143  00FF
EF00   0500  0017  0002  0143   00E2  1600  000E  0001
EF10   0144  0016  0600  0017   0002  0144  00F0  1600
EF20   000E  0001  0145  002D   0600  0015  0002  0145
EF30   00FE  1600  001F  0001   0146  0042  0600  001B
EF40   0002  0146  001D  1700   001C  0001  0147  005D
EF50   0600  001D  0002  0147   0039  1700  0014  0001
EF60   0148  007A  0600  001C   0002  0148  004D  1700
EF70   0015  0001  0149  0096   0600  001D  0002  0149
EF80   0062  1700  0017  0001   014A  00B3  0600  0015
EF90   0002  014A  0079  1700   000F  0001  014B  00C8
EFA0   0600  0016  0002  014B   0088  1700  0011  0006
EFB0   0100  00D2  6A00  000C   004E  4230  3064  7100
EFC0   0000  0000  0000  0000   0000  0000  0000  0000
EFD0   0000  0000  0000  0000   0000  0000  0000  0000
EFE0   0000  0000  0000  0000   0000  0000  0000  0000
EFF0   0000  0000  0000  0000   0000  0000  0000  0000
```

ANNEX B

```
:02080A004D5946
:02084A00085450
:10085400F5D5B800F3A0B805FCA018FFA023FB3A0F
:10086400B8F28053C1E7B823A0C50496E5D416F581
:100874009JFDE5B495F59323900481236714T623BF
:1008840000147604891470A81470AD1470147014D4
:1008940070AEF8D353C69F236E0481FDD37096B512
:1008A400FED306C6A8047F1475B8A0BD00BE0624F3
:1008B400EAD302C6BB240BFED310967F1D1475BD6C
:1008C40001BE101470CED30196E6B823F032E623AD
:1008D400FB3AB8A6BA041470CEAD8018DDAD96E626
:1008E400EADA1470E3E6FD967B23FB3AB8F2804315
:1008F40001E5D484F5B8F2805301000000C609B8BC
:10090400230F4302A0047BD306965DFED320C616D3
:1009140004JF1475147023FB3A1470AD1470AEB8D0
:10092400AB806D18807EB823F053F3F6334308A0F0
:100934001470AD53F8979645FD17ADB9AA8167EDCC
:1009440042F0E64A4304A0BE08B8241470A018EE8E
:100954004FBE141470EE57047BD302966EFED3017F
:10096400C668047F147514T0047BD30E9692FED36C
:1009740008C679047F1475B823F0530ED30EBD084E
:10098400960CB824B5E08F0181476EE8A047BD302F1
:10099400960C4FED319C69D047F1475B823F0D30EF4
:1009A400B8ADBE18BD0172C2B8C5BE15BD0432C211
:1009B400B8DABE17BD0252C2B8F1BE01BD1824EAAE
:1009C400D30696F8FED310C6CF047F147523011402
:1009D40076B823F032E4BD0F23001476EDDC047BFB
:1009E400B8A6BE04BD0B23FB3A80147618EEEDFDC9
:1009F40096DC047BD302C6FE440FFED340C6050436
:100A0400T7F1475B86CBD00BE4024EAD3FE962AFE6A
:100A1400D301C61A047F1475B823F053FEA01470D2
:100A2400530140A0047BD302964EFED340C6350446
:100A34007F1475B823F053011246B800BD20BE20C0
:0E0A440024EAB820BD00BE4024EA236B0481E2
:100B000001000000C00000000000000000000000E4
:100B1000000000000000000000000000000000D5
:100B20009ABCF6ADB5762A314795CA03706A8CA790
:100B300003BF27652D2D8FD5D66E49343A63857AABD
:100B4000ED10527D07CA6117C62ECD312E66F027F3
:100B5000D2CAA791A6979289C73EBA775FE73500B8
:100B60001000000000000000000000000000000084
:100B7000000000000000000000000000000000075
:100B8000000000000000000000000000000000065
:100B9000000000000000000000000000000000055
:100BA000A0A1A2A3A400010203049A6FFF97594FCA
:100BB000055522043415244202020484153204558
:100BC00050495245449445535354204945345233
:100BD00054204F4C4420434152449654484953209A
:100BE00043484E4E454C495320424C4F434B45A0
:030BF0004480003E
:00000001FF
```

1

ANNEX C

```
:101200003F436F707972696768742028432920EC4
:1012100065777320446174616F6D2C20313938B8
:101220003959287122CFB7334F2C504C4541534580
:101230000202057414954382057524F4E47204341B0
:1012400052442049532020494E53455254454443876
:1012500002020204C4541534520202494E5345E5
:101260005254202043415244D820594F55522020F7
:101270004341524420495320494E56414C494451
:1012800020D820393920544F4B454E532020205220E
:1012900045D4149444E494E472020D84E4F205028F
:1012A0004F4752414D532020524454D414494EE2
:1012B0004720205849535546464649434945E54C8
:1012C000202020544F4B454E5320202058550553A
:1012D000482020425554544F4E2020544F2020 5631
:1012E00049455720208058205949F55522204341CE
:1012F0005244202049532042204C434B454422058F0
:101300005448495320434348414E454C20495320B0
:1013100042 4C4F434B454420585448495320505267
:101320004F4752414D20495320424C434B454477
:10133000 58205949F555220204341 52442044841C3
:0A1340005320204585049524544FF
:1000160022E510D394015005A2B2B3500D7580F9B4
:1000260075A0FF740A1210A8C322E510B4010FA22E
:10003600AF9213C2AF7580FBA21392AF8006758094
:10004600F975A0FF741E1210A8D322E511D39404EB
:10005600500AA281B34005A2B2B3500B7400F5104A
:100066001200175000C322D284D283D285740112A3
:1000760010A8A2AF9214C2AFE511B40204C28480E4
:1000860010E511B40304C2838007E511B40402C26B
:1000960085E5117004C2828002D282A21492AFD387
:1000A60022E510601EA2AF9213C2AFC287A21392BE
:1000B600AFE5104510F510D287E5104510F510157F
:1000C6001080DE22D287E511701BA2AF9214C2AF58
:1000D600C286D2A0A21492AF74011210A875101491
:1000E6001200A78028E511B40110A2AF9214C2AF86
:1000F600C286C2A0A21492AF8013E511B4030EA269
:10010600AF9214C2AFD286C2A0A21492AF740112EB
:1001160010A822D280A28092A7A2802275110112 75
:100126000000CA2015051 20119B32212 0119500412 32
:10013600 00119 2275110312 00CAD2807404F5111236
:1001460000 0514002C322A2AF9216C2AFC287A216C6
:10015600 92AF743A1210A8D2877401F511120051A9
:1001660 04002C322751101120 0CA120119227 5112B
:10017600011200CA751400E51465136034E51454C1
:10018600077004A812 760 01201 19E433A812 860635
:100196002EFE7401FFEE0F23 03DFFDA812F6751085
:1001A6 000011200A7E5145 407B4 070205120 51480CE
:1001B600C6E514540760147401A8128606FFEE0FF4
:1001C6 002303DFFDA812 F6 051 480E6 22 751400E568
:1001D6 00146 5136 036A812E63 0E0 03D38001C3929B
:1001E600 1512 012 24002C322 7510011200A77401E4
:1001F600A8128606FFEE0F2303DFFDA812F6E5140C
:100206005407B407020512051480C4E514540760A8
:1002160 0147401A8128606FFEE0F2303DFFDA81251
:1002260 0F6 051480E 6 32275110 012 00CA75110175
```

1

```
:100236001200CAE51260068512101200A72220B22B
:100246000B7400F5101200175000C3227401F5104C
:100256001200174002C3227401F511120051400228
:10026600C32275120812022D75121675130112019A
:1002760074E5165401700B7400F510120017500047
:10028600C32275120012022D751500E51564106063
:10029600157512167513081201745166FF6002CF
:1002A600D322051580E57400F5101200175000C31F
:1002B60022A281B34005A2B2B35002C322A2AF92DA
:1002C60013C2AFC286A21392AF74581210A8D28678
:1002D600D322E510D39402500FA281B3400AA28222
:1002E600B34005A2B2B35002C322A2AF9213C2AF6B
:1002F60085A011E510700DE511440CF5118511A0CE
:10030600C287802A20870BE511440CF5118511A0C0
:10031600D287E51154F3F511E510B40108E511444F
:1003260008F5118006E5114404F5118511A0A21304
:10033600092AFD3227526FF756F121213C64002C301
:1003460022E512B43B04D21A8008E512643F60022B
:10035600C322756F131213C64002C322E513540F4E
:10036600C394075002C322751400E51354106019 94
:10037600756F141213C64002C322E5146641160059A
:10038600E514B431028002C322751500E51354202A
:10039600603D756F151213C64002C322E5155440 21
:1003A6006002C322E515541FF515E5157005752 67F
:1003B60000801CE515B4050572601801 2E515B407
:1003C6000F057526038008E515B415037526047513
:1003D6001600E513544 06017756F161213C64002D7
:1003E600C322E516C394055003751608 5166E756A
:1003F6001700751800E513548 06059756F171213AE
:10040600C64002C322E517540F6002C322E5175403
:10041600D06002C322E517542 06039756F181213 95
:10042600C64002C322E51870057526 008026E51829
:10043600B432057 52601801CE518B47D057 52602C3
:10044600 8012E518B49 60057526 038008E518B4D21F
:100456 00037 52604E526D39 4044002C3227 51900C9
:10046600E513540F6 5196 02 6756F1A1213C64002FC
:10047600C322E519B40505E51AB44D0CE519B40611
:100486 0005E51AB459 02 8002C322 051980D2E5197E
:10049600C394075002C322E514B4310A7510021240
:1004A60002D84002C322D32220B2 0B7400F51012E8
:1004B60000017500 0C322 7401F5101200174 00B7488
:1004C600 00F51012001 75000C322 7401F511120036
:1004D600 051400B7400F51 01200175000C322 75101E
:1004E60 001120 2D8400B7400F510120017500 0C319
:1004F600 221202 B7400B7400F510120017500 0C309
:100506 00 22C2AA12 033A400DD2AA7400F51012 00B4
:100516 00175 000 C322D2AAD322A2AF9213C2AF2 091
:100526000F1BA810E654E0FE78B9E654E0D39E50BF
:10053600 0C85106875 69B9756A191210B8A21392FC
:10054600AF22A2AF9213C2AF20 0F23851083 85116D
:10055600 0 82E493 54E0FE78B9E654E0D39E500F85CA
:100566001 068 8511 6975 6AB9756B19 1210 93A21313
:100576 00 092AF22 7510 00E528541 06045E510640 618
:100586 00603CD213751100E51164056022E511FE89
:100596 00E51075F0 05A42429F8EE28F8E51186067D
```

2

```
:1005A6002461F8EE86066E6002C213051180D8300B
:1005B6001308E527543F4440F527051080BE020680
:1005C6008EE5106406700302068ED213A2139214EF
:1005D600075110OE5116405600320140280A1E511E0
:1005E600FEE51075F005A42429F8EE28F8E5118635
:1005F600062461F8EE86066E6021C214E511FEE55A
:10060600107SF005A42429F8EE28F8E511860624CD
:1006160061F8EE8606D39E4002C213051180B4A28D
:10062600139214751100E5116405600320140280OD
:100636004E3511FEE5100475F005A42429F8EE281B
:10064600F8E5118606246IF8EE86066E6022C2146D
:10065600E511FEE5100475F005A42429F8EE28F846
:10066600E511860624E1F8EE8606C39E5002C21383
:10067600051180B2301308E527543F4440F527E5BD
:10068600102402F5100205C7227548EC754920753D
:10069600053207511000E51164050655E1124E1F8D4
:1006A600E6C4540FF512E512D394095008743025A8
:1006B60012F512800674372512F512E511C333249C
:1006C60004AF8A612E5112461F8E6540FF512E51270
:1006D600D39409500874302512F512800674372514
:1006E60012F512E511C333244BF8A612051180A5A5
:1006F600075104812051F228512108531112001657
:10070600227512CE12022D7511011200CA7513FF41
:10071600075140OE5146432601212019500385143.1
:10072600137510011200A705148OE8E51304227750
:1007360068127569817S6A48756B191210931207EC
:1007460007F4042432F515E5157008754A4E754B05
:1007560F8029E51503940950057S4A2080OEE58A
:100766001575F00A84FF7E00EF2430F54AE515750D
:100776F00A84AFF07E00EF2430F54B7510481276
:1007860051F2275126012022D75121675130112BD
:100796000174E516603E12073575126212022DD2FB
:1007A600157516E166409600320150280197593
:1007B600121775130C120174E5177004E518600220
:1007C60O8002C215051680DC3015097510127511E8
:1007D6009A12054822751238120022075150075163
:1007E60000E52954F0C4540F6516700302093975E3
:1007F6001A00751B0075121AE516242FF8E654F038
:10080600C4540F04F513120174751800751900759B
:1008160017F00E516242FF8E654F0C4540F046517A4
:1008260006046E51525I7C4233541F242AF8E51S2527
:100836001754078606FFEE8F011210ED5401FEE5F0
:10084600017S407FFEE8F011210E5FEE517C4235477
:10085600IF2418F8EE86064EFEE517C423541F24FF
:1008660018F8A606051780AAE5152517F515E51645
:10087600242FF8E654087040E516242FF8E65404B1
:100886000701BE51BC39519400CE51BB5190AE51A43
:1008966O00D395185003D38001C392158019E51BD355
:1008A6009519500CE51BB5190AE51AC395184003AE
:1008B60D38001C39215803OE516242FF8E6540440
:1008C6007012E51BB51908E51AB51803D38001C3E4
:1008D60092158014E51B5519B5190AE51A5518B570
:1008E6001803D38001C392152015443E516242FF86B
:1008F600E65403F516E51670097510127511E61221
:10090600054SE516B401097510127511FF12054860
```

```
:10091600E516B40209751013751118120548E51687
:10092600B40309751013751131120548C322051653
:100936000207E7D3221207DB400122D219E53970FC
:1009460007E53A7003020A5C75126212022D751CE5
:10095600000C218E51C64096005A218B34002801C99
:1009660075121E75130C120174E51EB53906E51FC6
:10097600653A60028002D218051C80D7A218B340DF
:1009860009E529540470030A205C20183C751262BA
:1009960012022DD217751C00E51C64096003201788E
:1009A6000028019751217E530C120174E51E70046F
:1009B600E51F60028002C217051C80DC30170A752D
:1009C600101275119A120548222120707F4042432F0
:1009D600F51DE51DC3953C500A7510127511B3122D
:1009E600054822200C0BE529540460032201802800D8
:1009F6005320181EE51C1475F00CA4FFAEF0EF246E
:100A060062F51212022D75123975130C1201D240BD
:100A16000122E51DC3953B5005751D3280097432D0
:100A2600C3951D253BF51D74CE251D14F512120226
:100A36002DD3921512012240012230C03120735E4
:100A4600C20C80127510127511CC120548E5295496
:100A560008700122C219E52854086057568617533F
:100A660069B1756A051210B87512B17513051206CB
:100A7600FD75122812022D7512B37513101201742A
:100A860078B1E66529FE78B3E66EF52978B2E665B3
:100A96002AFE78B4E66EF52A751229775131612062
:100AA600FD7568297569B1756A081210B8D20B30E0
:100AB600190975101275115E12054822C2AA756F3B
:100AC6005312135240030920B9585126F12135240B4
:100AD60003020B95756F0012135240030920B9575B6
:100AE6006F0012135240030920B9585146F121352B6
:100AF60040030920B95756F161213C6403020B9541
:100B0600E516B4600280EEE51654F064606007E511
:100B16001654F0B49026E5166490600280717567E5
:100B2600161213C640028067E5166002806174012E
:100B3600F5111200514002805602AA22851415E5FD
:100B460016651254FE600DE51664FFF516E5156090
:100B560003751501E5165401600BE526F511120023
:100B6600514002802AE5156023A215400C85136FBB
:100B76001213C640028018800BA813866F1213F52F8
:100B860040028000B15151514051380D9020AFBD2F5
:100B9600AA7401F5111200514000E527543F444064
:100BA600F5278000900EC21210F575127475132881
:100BB6000751420D39215120AC2300C107512767471
:100BC60000F513751401D39215120AC2E52854080CC
:100BD60060117512787513B1751408C39215120A4F
:100BE600C2D20B75127A751348751419C39215121271
:100BF600AC275104812051F75127C7513D2751434A
:100C060010C39215120AC222E529542060177512E4
:100C16007E75137175144C0C39215120AC2E52754E6
:100C2600CF4410F527E52954106020CE5275430B43D
:100C36001025E52954046003D3800C1C3E433F51776
:100C46007512807513177751401D39215120AC2E531
:100C56002754CF4420F527E529540870030920D34A4
:100C6600E5275430B420028003020D34E5295404EC
:100C76006003D3800C1C3E433F517E52954C0232369
```

```
:100C86005403F570E51760407568617569B1756A5A
:100C9600061210B87568647569B7756A021210B8DD
:100CA600121488751700E517640460107512B17583
:100CB60013081206FD121497051780EA7568287541
:100CC6006971756A401210B875127175134O120673
:100CD600FD7568717569B1756A081210B87512826A
:100CE600751371751440C39215120AC21214881234
:100CF600149175122875134O1206FD751700E51735
:100D060064O8601EE5172428F8E517860624B1F85E
:100D1600EE86066E6008E527543F4440F527051722
:100D260080DCE52754CF4430F527C20AC20B227572
:100D3600110075120075130020103552754C064A4
:100D4600806007E52754C0B4C0240511E511701E64
:100D560000512E51270180513E513B42011E52754A2
:100D66003F4400F5277400F510120017500080C8A4
:100D760022C2AFC20980009010C81210F530B477B5
:100D8600300E22C20EA2B3B34001227448B5240429
:100D9600E5256002800A759001301102D2108003A9
:100DA6007590008050200F0DD20F7524B178B9E6EA
:100DB600541F78B9F6300B06A8248690801074B9B3
:100DC6000D39524400575905F8004A8248690052459
:100DD60074BAFE78B9E62EB5241BC20FC20BC20840
:100DE600E52754C064806007E52754C0B4C003D328
:100DF6008001C39212805C300F1BC20FC20BC20867
:100E0600E52754C064806007E52754C0B4C003D307
:100E16008001C39212A2B3B34001222OOE0DD20E5E
:100E2600A210B392117524287525007448D3952411
:100E36004O11301104A824A690E5252590F5250536
:100E4600248010E59054016002D20CE59054806035
:100E560002D20DC2B520B30280FB7590FFD2B52237
:100E66007580F97590FF75A0FF75B0FF75A80075C0
:100E760068D2756900756A101210D7A2B29209C2BB
:100E860008C20EC20F7580F97590FF75A0FF75B088
:100E9600FF75A800D288C2B8D2A8D28AC2BAD2AA8E
:100EA600D2B4D2B5D2B312134A78B97600C20BC205
:100EB6000AC20CC210C212752700D2AFE52754C071
:100EC600B440097400F510120017500030083FE5D1
:100ED6002754C0700B75101275114F120548802EDD
:100EE600E52754C0B400D75101275116812054BF7
:100EF600C20B801A200B1730120B75101275113 6A3
:100F0600120548B00975101275112912054BC2107C
:100F1600120D35E52754C0704A30B247120244 50CC
:100F260014E527543F4480F527C20C200905120713
:100F360089D209802E1204AE5021E527543F44C0C1
:100F4600F527C20C2009117512727513D275141O8B
:100F5600D39215120AC2D209020EC2E527543F44A3
:100F660040F527E52754C0B48014200A117512OOF5
:100F7600012022D7512617513281201 74D20AE52723
:100F860054C0B4C014200A117512707513617514 1B
:100F96006C39215120AC2D20A300D1478B9760029
:100FA600C20BC212C20CE52754CF4400F527C20D6E
:100FB600E52854206003D38001C39208E528540431
:100FC60060063O0A0312068FE52854C0704D75106E
:100FD6002A12051FE5285408603473B1A64378B272
:100FE600A64478B3760078B4760078B5760078B6FD
```

```
:100FF600760078B7760078B876007512B175130862
:101006001206FDD20B7510127511E5120548E5277B
:1010160054C0B4C003120C0E020EC2E52854C0B46C
:101026004009300A03120579020EC2E52854C0B4FD
:10103600800FE52754C0B4800512093BC20C020E8E
:10104600C2E52854C0B4C00CE52754C0B4C005128C
:071056000BB0C20C020EC238
:0F10C8007581E275D000748BC0E0740EC0E03209
:10148800E47828F608B868FB227C717D4080067CE9
:10149800B17D088000A870E80303901100F582EC84
:1014A8002D14FCA804E61214D860131215215000E4E
:1014B80079297A3E12153274FF1214F7800EE56707
:1014C8001214F7500779287A401215321CDDD422FD
:1014D80078717928FA7B00752000E68AF0A42BC77A
:1014E800C5F0352025F0FB92000809B8B1EC227848
:1014F800007928FA752000E8938AF0A4C3C797F703
:10150800E5F0352009C3C797F7920008B83FE8E827
:10151800938AF0A4C3C797F722C3780079297A3F42
:10152800E893C797F70809DAF722C37800E89337F2
:06153800F70809DAF822B1
:10110000B1FD912C6DB8B6BE15080DE283B1E80BA8
:101110036B047EAA10A78EAA2E94C84741FE8791
:101120007EEC6745A28984A5EFCD230167452D464D
:10113000ABA9EFCD249302671B4F8195A701000156
:10114000299FC98519B9535392529 05A442DCAD434
:101150000908D3AADF32B009DE40CB88128BFE90BC4
:101160000857CAD9041E77ABA9DEF7E83820D0ACEF1
:101170006477831E1D8026F548A4396EC3010001E3
:101180000D2DC925514AA3858BDCC725400CB861BC
:101190000CF9C121BD3D576D6C712FA4CC93403724
:1011A000DE323965C18D636A49B6E1D0735EDE9C7B
:1011B00012A7C3345E388C73054E63410A010001E7
:1011C000E5205BD556D19BA9A554B78316DE360B17
:1011D000D603581BE00D3672AD6B69DAD99916BC8F
:1011E000CB24F665B445A6BBED533EB0F7B8F5EA9F
:1011F000A6B7AF64EDA2E7FEC257C4D10B01000150
:10134A00C21A756E03D28022E56FF56F7B0FD2AA9F
:10135A0000C2AAE56FAA6E0ABA00028007007 91CC9
:10136A00D9FEDAF97A09A2D0921B201A03B21BF429
:10137A00C38009201A0333800313800030B23192EC
:10138A00807919D9FEDAEC00000000030B222A21BE3
:10139A0092807919D9FE00000000000030B211D302
:1013AA0092807919D9FEA280201A01B35007DB9ED8
:1013BA00D39280C32230B2F8D39280227C0FD2809B
:1013CA00C2A77BA57A067906201A082080103080E9
:1013DA0019800B30800820801180030214 7CD9E820
:1013EA0030B2F8DBE1DADF02147CD2A77B087A009C
:1013FA00007926D9FE30B27AA21AB3740092E1A219
:10140A008092A73400A2803400A2803400A2E1EACC
:10141A00201A03338003138000FA7912D9FEDBD530
:10142A0030B24FA21AB3740092E1A28092A734009C
:10143A00A2803400A2803400A2E1EA20D004401B3A
:10144A008004501780007913D9FE00791ED9FEA9AD
:10145A006FF7D2A7D3D2AA00C2AA227914D9FEA2C0
:10146A001A928079 1FD9FED280D2A7DC02800302A9
```

```
:0E147A0013C8D2A7D39280C3D2AA00C2AA225E
:0510F5007581E2E473C7
:1010E500098002C333D9FC22098002C313D9FC222B
:1010A800600D782B0210B2007830D8FED5E0F82217
:0300030002105D8B
:0300130002107860
:03000000020006F5
:090006007581E275D000020E665E
:10105D00C0E0C0F0C083C082C0D075D008120D773B
:10106D00D0D0D082D083D0F0D0E032C0E0C0F0C07C
:10107D0083C082C0D075D008120D83D0D0D082D05D
:06108D0083D0F0D0E03238
:1010B800E56A600BA868A969FAE6F70809DAFA226E
:10109300E56B6010856982856883A86AFAE493F634
:0510A30008A3DAF922A8
:0E10D700E56A6009FAA868E569F608DAFC2205
:00000001FF
```

Annex D: Protocol For Communication Between Verifier and Data demodulator

The data demodulator and verifier chip are connected by means of a parallel 8 bit link. The data demodulator is the master and the verifier is the slave. The hand-shaking requests 4 control lines:

RWN: read/write output from the data demodulator;

SENDN: output from the data demodulator;

ACKN: output from the verifier chip;

RESET: reset line from the verifier chip.

Writing a byte to the verifier chip:

The timing traces for data from the data demodulator to the verifier are shown on the next page. The verifier is in input mode with its data lines in high impedance. When the data demodulator is ready to send a byte, it sets RWN and SENDN to 0, after having tested if ACKN is high. At the same time, it outputs the data on the bus. After having stored the data, the verifier chip asserts it by setting ACKN to 0. Then the data demodulator sets SENDN to 1 and releases the data bus. To end the transfer, the verifier chip sets ACKN to 1.

The verifier chip has to answer to the SENDN request before a time-out (T4 max). In case the data demodulator does not receive an acknowledge (ACKN = 0) within this time, it releases the data bus and sets SENDN to 1.

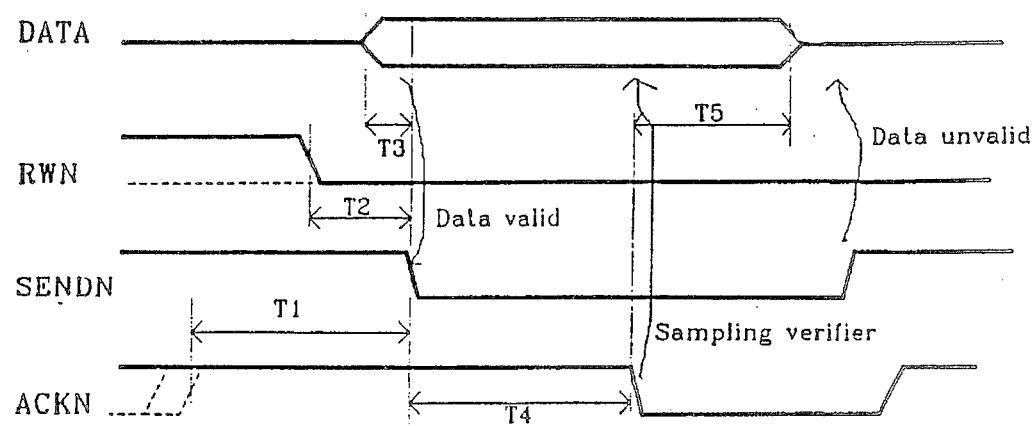

Reading a byte from the verifier chip:

The timing traces for data from the verifier chip to the data demodulator are shown hereinbelow. When the deocder needs data and if ACKN is high, it sets RWN to 1 and SENDN to 0. When the verifier is ready to send, it outputs the data and clears ACKN, in order to infrom that the data is valid. After the data demodulator has stored the data, it sets SENDD to 1. Then the verifier chip releases the data bus to high impedance and sets ACKN to 1 as soon as possible. There is no time-out security provided in this case.

The data demodulator is the master since it is synchronout with the TV lines. The use of the ACKN line allows a slow CPU for the verifier chip.

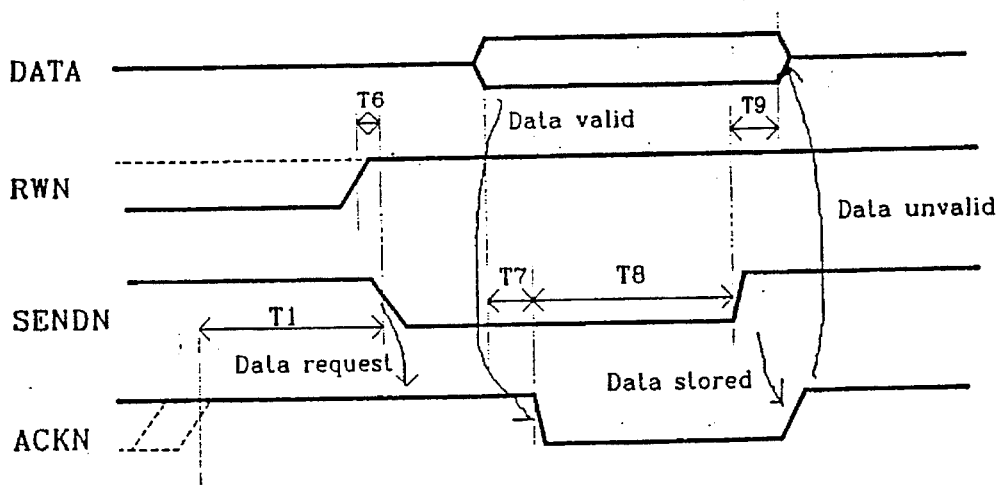

Software Specifications:

Data demodulator to Verifier Chip:

After the acquisition of a packet, the data demodulator transmits it to the verifier chip. The transfer between the two chips is done in the manner shown below.

| DATA PACKET (32 bytes) | INFO |    | ACK|

The DATA PACKET is comprised of 32 corrected bytes dedicated to the verifier chip. This information is received, data demodulator and corrected by the data demodulator.

The INFO byte is one byte long. It contains information from the data demodulator for the verifier and is sent by the data demodulator. Bit 0 is used as a PUSH bit. A value of 1 indicates that a validation push button on the TV was pushed for more than three seconds. The data demodulator sends this information only one time and waits for the key to be depressed. In order to inform the user that his order has been accepted, the state of the displayed information will be changed (e.g. to a blinking mode) after the pushed button has been detected. Bits 1-7 are not currently used.

The ACK byte is sent by the verifier chip after the data demodulator sends the 33 bytes of data packet and INFO to verify that the data was received. If bit 0 is set to 1 then the verifier chip received the 33 bytes. If bit 0 is set to 0, the data demodulator sends the 33 bytes repeatedly until the bit is set to 1. Bits 1-7 are not currently used.

In case a time-out occurs during the packet transfer, the data demodulator attempts to send this byte again until the transfer succeeds. In order to be ready for the loading of a new control word. if there is no sufficient time to complete the packet transfer, the data demodulator will cancel the transfer and RESET the verifier chip before the key changeover occurs.
Verifier chip to data demodulator:

10ms before the control word chages (line 0, 64, 128 or 192), the data demodulator asks for the new control word. Whatever happens, the verifier chip as to answer. Therefore, line SENDN should be connected to an interrupt line from the verifier chip. The data format of the answer is shown below.

| CONTROL WORD (8 bytes)| L | OSD |

The 8 bytes of the CONTROL WORD contain the result of the smart card computation.

The L byte is one byte long indicating the length of an on-screen display. If L is 0, then the data demodulator has to switch off a device (OSD - on screen display inserter) for displaying the on screen display. If L is between 0 and 255, the data demodulator will receive an on screen message whose length is L. If L is 255, the OSD remains in its current state.

The L OSD bytes contain the information to be displayed by the OSD.

The verifier chip pin setup is shown on the next page.

| P0.0 | DATAI/O | P2.0 | C4N |
|------|---------|------|-----|
| P0.1 | CMDVCCN | P2.1 | C8N |
| P0.2 | CMDVPPN | P2.2 | CMD3.5N |
| P0.3 | VPP5N | P2.3 | CMD7N |
| P0.4 | VPP12.5N | P2.4 | |
| P0.5 | VPP21N | P2.5 | |
| P0.6 | RSTN | P2.6 | |
| P0.7 | C3CLK | P2.7 | |
| P1.0 | D0 | P3.0 | |
| P1.1 | D1 | P3.1 | |
| P1.2 | D2 | P3.2 | DETECT |
| P1.3 | D3 | P3.3 | SENDN |
| P1.4 | D4 | P3.4 | RWN |
| P1.5 | D5 | P3.5 | ACKN |
| P1.6 | D6 | P3.6 | |
| P1.7 | D7 | P3.7 | |

The name of the signals which are active low are ended by N.

We claim:

1. A system for controlling access to broadcast transmissions comprising:

a transmitter having a transmission scrambler for scrambling a broadcast and a satellite in geosynchronous orbit for relaying said broadcast;

a security computer coupled to said transmitter; and a multiplicity of subscriber receivers, each comprising:

a groundstation for receiving said broadcast relayed from said satellite and a receiving descrambler for descrambling said broadcast; and a selectable and portable memory means operatively associated with said receiving descrambler, wherein instructions transmitted by said security computer to said receiving descrambler enable said receiving descrambler to employ data stored in said memory means for generating a seed used by said receiving descrambler to descramble said broadcast.

2. A system according to claim 1 and wherein said selectable and portable memory means contains information which indicates programming entitlements to said receiving descrambler.

3. A system according to claim 1 and wherein said receiving descrambler generates displayed messages originating from said broadcast transmissions.

4. A method for controlling access to broadcast transmissions, wherein scrambled programs are transmitted to a plurality of subscriber units, each including a receiver and a receiving descrambler which descrambles programs by using a smart card, the method comprising:

providing a first smart card for enabling descrambling of programs for a first predetermined time period;

transmitting a message from said first smart card to an electronic mailbox in said receiving descrambler when said first predetermined period lapses;

storing said message in said electronic mailbox;

providing a second smart card;

applying said message stored in said electronic mailbox to enable operation of said second smart card for a second predetermined time period; and employing said second smart card for enabling descrambling of programs for said second predetermined time period.

* * * * *

UNITED STATES PATENT AND TRADEMARK OFFICE
CERTIFICATE OF CORRECTION

PATENT NO. : 5,481,609
DATED : January 2, 1996
INVENTOR(S) : Michael Cohen, et al.

It is certified that error appears in the above-identified patent and that said Letters Patent is hereby corrected as shown below: On the title page:

Before item 51 insert -- [30] Foreign Application Priority Data Nov. 14, 1989 Israel 92310 --

Signed and Sealed this

Sixth Day of January, 1998

Attest:

BRUCE LEHMAN

Attesting Officer

Commissioner of Patents and Trademarks